(12) United States Patent
Kobayashi et al.

(10) Patent No.: US 6,623,675 B2
(45) Date of Patent: Sep. 23, 2003

(54) MANUFACTURING METHOD OF A CUSHION MEMBER

(75) Inventors: Tetsuya Kobayashi, Oobu (JP); Masashi Tanaka, Oobu (JP)

(73) Assignee: Tokai Kogyo Kabushiki Kaisha, Obu (JP)

( * ) Notice: Subject to any disclaimer, the term of this patent is extended or adjusted under 35 U.S.C. 154(b) by 80 days.

(21) Appl. No.: 09/925,660

(22) Filed: Aug. 10, 2001

(65) Prior Publication Data
US 2002/0017733 A1 Feb. 14, 2002

(30) Foreign Application Priority Data

Nov. 6, 2000 (JP) ........................................ 2000-337810
Aug. 11, 2000 (JP) ........................................ 2000-245038

(51) Int. Cl.⁷ ............................ B29C 44/06; B29C 44/12
(52) U.S. Cl. ...................................... 264/46.4; 264/45.1
(58) Field of Search ................................ 264/45.1, 46.4

(56) References Cited

U.S. PATENT DOCUMENTS

| | | | |
|---|---|---|---|
| 3,257,149 A | * 6/1966 | Fruchte et al. | 264/46.6 |
| 3,393,258 A | * 7/1968 | Fultz et al. | 264/45.1 |
| 4,608,213 A | * 8/1986 | Kurumizawa et al. | 264/45.1 |
| 4,755,411 A | * 7/1988 | Wing et al. | 428/71 |
| 4,762,654 A | 8/1988 | Fuchigami et al. | |
| 4,804,506 A | 2/1989 | Okamoto et al. | |
| 4,923,746 A | * 5/1990 | Balmisse et al. | 428/309.9 |
| 4,927,575 A | 5/1990 | Brock et al. | |
| 4,975,229 A | * 12/1990 | Kita et al. | 264/45.2 |
| 5,000,515 A | * 3/1991 | Deview | 297/452 |
| 5,244,612 A | * 9/1993 | Iwasawa et al. | 264/46.5 |
| 5,603,874 A | * 2/1997 | Ishii et al. | 264/46.5 |

FOREIGN PATENT DOCUMENTS

| | | |
|---|---|---|
| GB | 2 233 926 | 1/1991 |
| JP | 58-203027 | 11/1983 |
| JP | 63-17011 | 1/1988 |
| JP | 2-140107 | 5/1990 |
| JP | 6-11496 | 2/1994 |
| JP | 10-225943 | 8/1998 |

* cited by examiner

Primary Examiner—Allan R. Kuhns
(74) Attorney, Agent, or Firm—Oblon, Spivak, McClelland, Maier & Neustadt, P.C.

(57) ABSTRACT

A manufacturing method of a cushion member which has a two-layer structure constituted by an obverse layer portion and a reverse layer portion and has no dispersion of thickness between the obverse layer portion and the reverse layer portion. Side cavities, a first cavity and a second cavity are formed in a lower die and side partitions and a front and rear partition are provided therein. A first raw material foams and flows within the first cavity, and a second raw material flows within the first cavity while being limited by a front and rear flow port with respect to a flow amount and a flow direction and covers over the first raw material so as to flow forward in such a manner as to follow the flow of a flow front end portion of the first raw material. Then, an obverse layer portion and a front edge portion made of the first raw material, and a reverse layer portion made of the second raw material are formed in the first cavity.

23 Claims, 33 Drawing Sheets

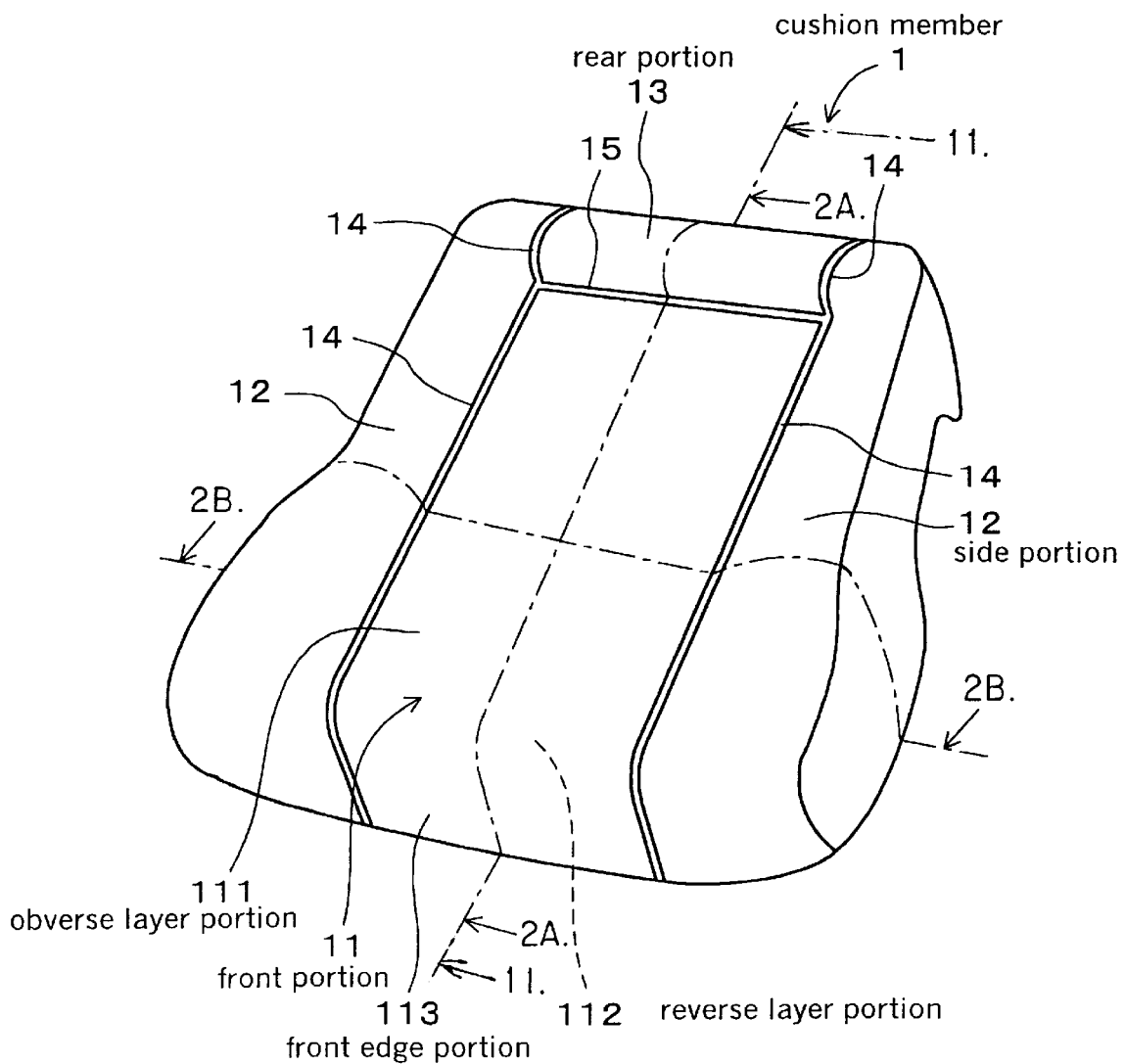

MANUFACTURING METHOD OF A CUSHION MEMBER

CROSS-REFERENCES TO RELATED APPLICATIONS

The present application claims priorities under 35 U.S.C. §119 to Japanese Patent Applications No. 2000-245038, filed Aug. 11, 2000 and Japanese Patent Application No. 2000-337810, filed Nov. 6, 2000, entitled "MANUFACTURING METHOD OF CUSHION MEMBER". The contents of this application are incorporated herein by reference in their entirety.

BACKGROUND OF THE INVENTION

1. Field of the Invention

The present invention relates to a manufacturing method of a cushion member which is used in a seat such as a sofa or the like within a vehicle, an airplane a ship or a room.

2. Description of the Background

Conventionally, a seat portion in a seat of a motor vehicle or the like is constructed such that a cushion member used in an inner portion thereof has a two-layer structure including a soft layer and a hard layer, so that the comfort of a user sitting on the seat is improved thereby.

As a method of manufacturing the cushion member having the two-layer structure mentioned above, for example, there is a method disclosed in Japanese Examined Patent Publication No. 6-11496 (a prior art 1). In accordance with this method, in a molding die for forming the cushion member, there is provided a side partition between a center cavity for forming a first center portion in the seat portion of the seat and a side cavity for forming side portions positioned in both right and left sides. Further, in the center cavity, there is provided a front and rear partition for partitioning between a front portion and a rear portion.

Then, a soft raw material is injected to the front portion mentioned above, thereafter a hard raw material is injected to the other portions, whereby a soft layer is formed below the front portion, that is, in an obverse side in a front portion of the seat portion, and a hard layer is formed above the front portion, that is, in a reverse side in the front portion of the seat portion and side portions and the rear portion of the seat portion, so that the cushion member having the two-layer structure is formed.

However, the conventional manufacturing method of the cushion member mentioned above has the following problem.

That is, in the manufacturing method in accordance with the prior art 1, a flow amount of the hard raw material later injected is not restricted at all at a time of molding by injecting the soft raw material and the hard raw material to the molding die. Accordingly, it is hard to keep a thickness of the soft layer and the hard layer to a predetermined thickness, so that a dispersion is necessarily generated locally or between production lots.

As the other conventional embodiments, for example, there are structures described in Japanese Unexamined Patent Publication No. 10-225943 (a prior art 2) and Japanese Unexamined Patent Publication No. 2-140107 (a prior art 3).

In the prior art 2 mentioned above, an injection hole for injecting a molding material and a closing lid mounted via a hinge portion for closing the injection hole after injecting the molding material are provided in a boundary member. At a time of forming the cushion member, the boundary member is arranged in a molding die for the cushion member, one molding material is injected from the injection hole, and another molding material is injected to an upper portion of the boundary member. Then, one molding material injected from the injection hole rotates the hinge portion by a foaming force thereof, whereby the closing lid closes the injection hole. Accordingly, the cushion member having the two-layer structure gripping the boundary member therebetween is formed.

In the prior art 3 mentioned above, a molding die for the cushion member has a middle frame between an upper die and a lower die, and the boundary member is arranged in the middle frame. Then, one molding material is injected to the lower die. Thereafter the middle frame is closed, next another molding material is injected in an upper portion of the middle frame, thereafter the upper die is closed and a foaming process is executed. Accordingly, the cushion member having the two-layer structure gripping the boundary member therebetween is formed.

However, in the conventional manufacturing method of the cushion member mentioned above, there is the following problem.

That is, in the prior art 2 mentioned above, as mentioned above, it is necessary that the closing lid having the injection hole and the hinge portion are provided in the boundary member, and in the prior art 3, it is necessary that the middle frame is provided in the molding die in the manner mentioned above. In other words, in the prior arts mentioned above, the special structure is required in the boundary member or the molding die at a time of injecting.

In order to improve the above problems, in the prior art 2 mentioned above, there is another forming method in which a flexible partition member is used in the boundary member mentioned above and an injection port for the molding material is provided in the flexible partition member. However, in this forming method, it is impossible to enlarge the injection port enough and it is not easy to inject the molding material.

SUMMARY OF THE INVENTION

According to one aspect of the present invention, there is provided a manufacturing method of a cushion member for executing an expansion molding by using an upper die and a lower die, in which in the lower die, a first cavity for forming a first center portion having an obverse layer portion positioned in an obverse side of the cushion member and a reverse layer portion positioned in a reverse side of the cushion member, and a second cavity for forming a second center portion arranged at the rear of the first center portion are formed, and a front and rear partition is provided between the first cavity and the second cavity. The upper die has a bottom portion forming surface for forming a bottom portion of the cushion member. At a time of executing the expansion molding, a first raw material having a foaming property is injected to the first cavity and a second raw material having a foaming property and forming a foamed product having a different physical property from that of a foamed product formed of the first raw material at a time when the foaming process is completed is injected to the second cavity. Thereafter, the lower die and the upper die are closed so as to form a flow port between the bottom portion forming surface in the upper die and an upper end of the front and rear partition, the second raw material flows within the first cavity while being limited in a flow amount by the flow port and flows forward so as to follow the flow of a flow front end portion of the first raw material while covering over the first raw material so as to restrict an upward foam flow of the first raw material. Finally, the first raw material forms an obverse layer portion below the first cavity, and forms a front edge portion in a forward end portion of the first cavity, and on the other hand, the second raw material forms the reverse layer portion above the first cavity, and forms the second center portion in the second cavity.

A remarkable aspect of the present invention is that the lower die and the upper die are closed so as to form a flow port between the bottom portion forming surface and an upper end of the front and rear partition in the upper die, and the second raw material flows within the first cavity while being limited in a flow amount by the flow port and flows forward so as to follow the flow of a flow front end portion of the first raw material while covering over the first raw material so as to restrict an upward foam flow of the first raw material.

Next, a description will be given of an operation and effect of the present invention.

In the present invention, the first raw material is injected in the first cavity so as to foam and flow within the first cavity. Further, the second raw material is injected in the second cavity so as to ride over the front and rear partition and also foam and flow in the first cavity.

Then, the lower die and the upper die are closed after the injection of the second raw material is completed. At this time, the flow port is formed between the bottom portion forming surface of the upper die and the upper end of the front and rear partition.

Accordingly, it is possible to restrict the flowing direction and the flow amount of the second raw material flowing so as to follow to the flow front end portion of the first raw material. Further, the second raw material foams and flows forward so as to cover over the first raw material, and flows forward while preventing the first raw material from foaming and flowing upward without limitation, due to its weight. Accordingly, it is possible to foam and flow the first and second raw materials with a fixed speed. Therefore, the obverse layer portion made of the first raw material and the reverse layer portion made of the second raw material can be formed without dispersion in their thickness.

Since the flow of the first raw material toward the front portion of the flow front end portion is promoted by the second raw material, the flow front end portion is prevented from further forward flowing when it reaches the forward end portion of the first cavity. On the other hand, the flow front end portion is prevented from backward flowing by the flow of the chasing second raw material and flows toward the upper portion of the front edge portion.

Accordingly, the first raw material can surround an outer side of the second raw material so as to form the front edge portion in the forward end portion of the first cavity.

Accordingly, it is possible to form the cushion member having the two-layer structure including the reverse layer portion and the obverse layer portion, in which almost all the surface of the first center portion and the surface of the front edge portion in the cushion member are formed by the foamed product of the first raw material.

As mentioned above, in accordance with the present invention, it is possible to provide a manufacturing method of the cushion member which has a two-layer structure including an obverse layer portion and a reverse layer portion, and has no dispersion of thickness between the obverse layer portion and the reverse layer portion.

According to another aspect of the present invention, there is provided a manufacturing method of a cushion member for executing an expansion molding by using an upper die and a lower die, in which at a time of executing the expansion molding, a flexible film is arranged in a cavity in the lower die so that an opening portion to which a first raw material having a foaming property flows is formed between an end portion of the flexible film and the cavity. The first raw material flows from the opening portion, and a second raw material having a foaming property and forming a foamed product having a different physical property from that of a foamed product formed of the first raw material at a time when the foaming process is completed is injected from the portion other than the opening portion, and thereafter, the lower die and the upper die are closed so as to integrally expansion mold the first raw material and the second raw material by setting the flexible film to be a boundary layer, thereby forming the cushion member having the two-layer structure including a first foamed product made of the first raw material and a second foamed product made of the second raw material and interposing the flexible film between the two.

A remarkable aspect of the present invention is that the flexible film is arranged in the cavity in the lower die so that the opening portion is formed, the first raw material is flowed from the opening portion, and the second raw material is injected from another portion than the opening portion, thereby forming the cushion member having the two-layer structure gripping the flexible film therebetween.

Next, a description will be given of an operation and effect of the present invention.

In the present invention, the flexible film is arranged at an optional position of the cavity in the lower die while holding the opening portion. The opening portion is formed so as to section a part of the cavity while the cavity is continuously connected.

Next, the first raw material is flowed from the opening portion, and on the other hand, the second raw material is injected from the portion other than the opening portion. Then, the first raw material and the second raw material respectively flow in the lower portion of the flexible film and the upper portion of the flexible film while foaming in a state of being moved apart from each other by the flexible film.

That is, in the cavity in the lower die, at the portion where the flexible film is arranged, the first raw material and the second raw material independently foam and flow while giving no influence to each other. Accordingly, at the portion where the flexible film is arranged, it is possible to prevent the first raw material and the second raw material from being mixed with each other, and it is possible to form the cushion member in which the thickness of the first and second foamed products is stable.

The flexible film has flexibility and can be arranged at an optional position in the cavity of the lower die. That is, in the case that it is intended to change the shape of the two-layer structure of the cushion member, the flexible film can be easily modified by changing the arranging state of the flexible film. Accordingly, it is possible to easily form the cushion member having an optional shape of the two-layer structure.

The flexible film has the opening portion and is structured such that two layers are not completely separated by a boundary member in the same manner as the conventional one. Accordingly, it is not necessary to restrict the order of injection of the molding material such that the second raw material is injected after finishing the injection of the first raw material at a time of forming, and it is also unnecessary to previously form the injection hole in the boundary member in order to avoid the matter. Therefore, it is easy to inject the forming material of the first raw material and the second raw material, it is possible to inject at an optional timing and it is possible to easily form the cushion member.

In the formed cushion member the flexible film is gripped between the first foamed product and the second foamed product. The flexible film is excellent in elastic deformation and hardly influences properties such as an impact reducing property of the cushion member and the like due to a combination of the first foamed product and the second foamed product. Accordingly, it is possible to form a cushion member having excellent properties.

The cushion member is taken out while gripping the flexible film after being formed. Accordingly, it is easy to take out the cushion member.

It is preferable to use a material having an improved adhesive property with respect to the first foamed product and the second foamed product, for the flexible film. In this case, it is possible to improve a general degree of bond in the cushion member after being formed.

As mentioned above, in accordance with the present invention, it is possible to provide a manufacturing method of the cushion member which can easily form the cushion member having an optional shape of a two-layer structure and having excellent properties, and inject the molding material easily and at an optional timing.

BRIEF DESCRIPTION OF THE DRAWINGS

A more complete appreciation of the invention and many of the attendant advantages thereof will become readily apparent with reference to the following detailed description, particularly when considered in conjunction with the companying drawings, in which:

FIG. 1 is a perspective view showing a cushion member in accordance with an embodiment 1;

FIGS. 5A, 5B and 5C are views showing a molding die in a state of injecting the first raw material, in accordance with the embodiment 1, in which FIG. 5A is a cross sectional view along a line 5A—5A in FIG. 4, FIG. 5B is a cross sectional view along a line 5B—5B in FIG. 4 and FIG. 5C is a cross sectional view along a line 5C—5C in FIG. 4;

FIGS. 7A, 7B and 7C are views showing a molding die in a state of injecting a second raw material, in accordance with the embodiment 1, in which FIG. 7A is a cross sectional view along a line 7A—7A in FIG. 6, FIG. 7B is a cross sectional view along a line 7B—7B in FIG. 6 and FIG. 7C is a cross sectional view along a line 7C—7C in FIG. 6;

FIGS. 9A, 9B and 9C are views showing a molding die in a state of closing the upper die and the lower die, in accordance with the embodiment 1, in which FIG. 9A is a cross sectional view along a line 9A—9A in FIG. 8, FIG. 9B is a cross sectional view along a line 9B—9B in FIG. 8 and FIG. 9C is a cross sectional view along a line 9C—9C in FIG. 8;

FIGS. 10A, 10B and 10C are views showing a molding die in a state of closing the upper die and the lower die, in accordance with the embodiment 1, in which FIG. 10A is a cross sectional view along a line 10A—10A in a view corresponding to FIG. 8, FIG. 10B is a cross sectional view along a line 10B—10B in a view corresponding to FIG. 8 and FIG. 9C is a cross sectional view along a line 10C—10C in a view corresponding to FIG. 8;

FIGS. 11A and 11B are views corresponding to the views along the line 11A—11A in FIG. 1, in accordance with the embodiment 1, in which FIG. 11A is a cross sectional view of a cushion member in which a front edge portion is formed with a greater ratio of foamed product made of the first raw material, and FIG. 11B is a cross sectional view of a cushion member in which a front edge portion is formed with a greater ratio of foamed product made of the second raw material;

FIGS. 21A, 21B and 21C are views showing a molding die in a state of injecting the second raw material, in accordance with the embodiment 3, in which FIG. 21A is a cross sectional view along a line 21A—21A in FIG. 20, FIG. 21B is a cross sectional view along a line 21B—21B in FIG. 20 and FIG. 21C is a cross sectional view along a line 21C—21C in FIG. 20;

FIGS. 23A, 23B and 23C are views showing a molding die in a state of injecting the first raw material, in accordance with the embodiment 3, in which FIG. 23A is a cross sectional view along a line 23A—23A in FIG. 22, FIG. 23B is a cross sectional view along a line 23B—23B in FIG. 22 and FIG. 23C is a cross sectional view along a line 23C—23C in FIG. 22;

FIGS. 25A, 25B and 25C are views showing a molding die in a state of closing the upper die and the lower die, in accordance with the embodiment 3, in which FIG. 25A is a cross sectional view along a line 25A—25A in FIG. 24, FIG. 25B is a cross sectional view along a line 25B—25B in FIG. 24 and FIG. 25C is a cross sectional view along a line 25C—25C in FIG. 24;

FIGS. 27A, 27B and 27C are views showing a molding die in a state that the expansion molding is almost executed after closing the upper die and the lower die, in accordance with the embodiment 3, in which FIG. 27A is a cross sectional view along a line 27A—27A in FIG. 26, FIG. 27B is a cross sectional view along a line 27B—27B in FIG. 26 and FIG. 27C is a cross sectional view along a line 27C—27C in FIG. 26;

FIGS. 29A and 29B are views showing a case that the flexible film is arranged so as not to be in parallel to a bottom surface of the lower die, in which FIG. 29A is a cross sectional view corresponding to the view along the line 29A—29A in FIG. 24, and FIG. 29B is a perspective view showing a partition plate;

FIGS. 30A and 30B are views showing another lower die, in accordance with the embodiment 3, in which FIG. 30A is a plan view showing the lower die in the case that a side cavity and a rear cavity are not completely separated by a side partition plate, and FIG. 30B is a plan view showing the lower die in the case that the side cavity is provided so that the side partition plate is linearly arranged in a front side and a rear side;

FIGS. 33A and 33B are views showing the molding die, in accordance with the embodiment 6, in which FIG. 33A is a cross sectional view showing the molding die in a state that a flexible film is fixed to a cavity in a lower die in a loosened state, and FIG. 33B is a cross sectional view showing the molding die in a state that a bag-like cavity formed by the flexible film is expanded at a time of flowing a first raw material from an opening portion.

DESCRIPTION OF THE PREFERRED EMBODIMENTS

Figure 2A:
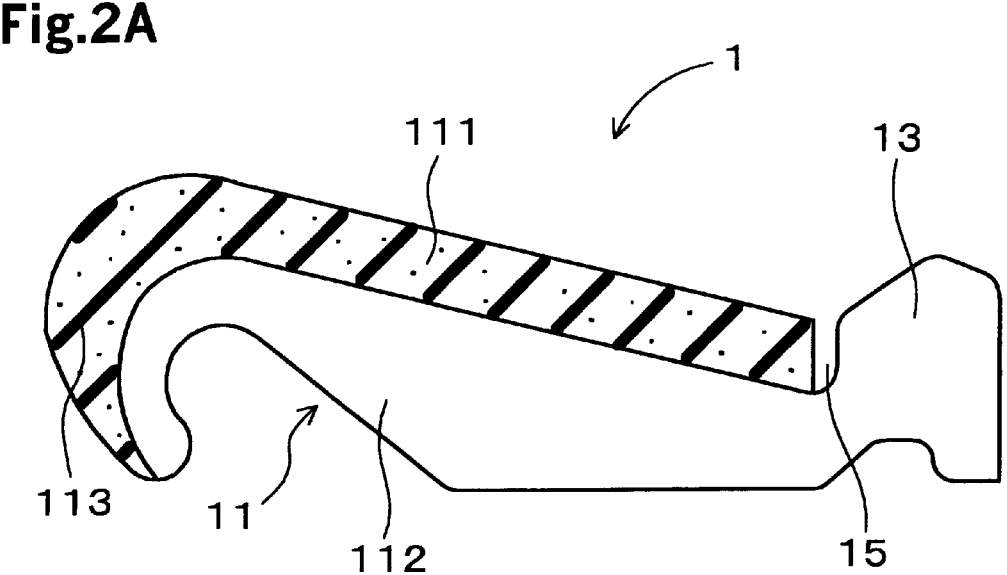
FIG. 2A is a cross sectional view along a line 2A—2A in FIG. 1 in accordance with the embodiment 1.

In the first aspect in accordance with the present invention, the front and rear direction means a direction obtained by setting the side of the first center portion of the cushion member or the side of the first cavity to a front portion, and setting the side of the second center portion of the cushion member or the side of the second cavity to a rear portion. Further, the lateral direction corresponds to a direction perpendicular to the front and rear direction obtained by setting the side of both side portions of the cushion member or the side of side cavities to the right or left. Further, the vertical direction corresponds to a vertical direction of a vehicle body in a state of mounting the cushion member to the vehicle body, or a direction of gravity at a time of manufacturing the cushion member.

It is preferable that the structure is made such that, in the lower die, the side cavities for forming the side portions arranged in both right and left sides of the first center portion are formed, and a side partition having a first side partitions provided between the side cavity and the first cavity and a second side partition provided between the side cavity and the second cavity is formed. The flow port is also formed between the bottom portion forming surface in the upper die and an upper end of the side partitions. The second raw material forms the reverse layer portion above the first cavity, and also forms the second center portion and the side portions in the second cavity and the side cavities respectively.

In accordance with the present invention, the second raw material is injected in the second cavity and can ride over the side partition so as to foam and flow toward the side cavity. Accordingly, the side portions can be formed without directly injecting the second raw material into the side cavities.

It is preferable that the first raw material is injected before injecting the second raw material.

Accordingly, it is possible to easily execute the foam and flow of the first raw material prior to the foam and flow of the second raw material. Therefore, the second raw material can easily cover over the first raw material and flow within the first cavity.

In this case, either of the first raw material and the second raw material may be first injected; that is, there may be a case that the second raw material is injected prior to the first raw material or a case that the first raw material and the second raw material are injected substantially at the same time. Accordingly, it is preferable to determined the order while taking into consideration the speed of foam and flow of the first and second raw materials.

It is preferable that the structure is made such that a height of the second side partition is made lower than a height of the front and rear partition in the vertical direction, and the second raw material rides over the upper end of the second side partition so as to start foaming and flowing within the side cavity before riding over the upper end of the front and rear partition so as to start foaming and flowing in the first cavity.

As mentioned above, at a time of foaming and flowing, the second raw material at first flows in the side cavity and next flows in the first cavity. Accordingly, it is possible to prevent the second raw material from riding over the flow front end portion of the first raw material foaming and flowing within the first cavity.

On the other hand, since the foam and flow of the second raw material to the side cavities does not flow above the first raw material, which is different from the foam and flow to the first cavity, it is not necessary to restrict the flowing speed. Accordingly, there is no trouble if the second raw material is foamed and flows within the side cavities before the second raw material starts foaming and flowing in the first cavity. Accordingly, it is not necessary to inject the second raw material to each of the side cavities, it is possible to reduce a time required for injection and it is possible to reduce a forming time of the cushion member.

It is preferable that the structure may be made such that a capacity of the second cavity surrounded by the front and rear partition and the second side partitions is set to be larger than an injection amount of the second raw material before foaming, whereby a predetermined time is required before the second raw material rides over the upper end of the side partitions or the front and rear partition so as to start foaming and flowing in the side cavities or the first cavity.

Accordingly, it is possible to delay a time at which the second raw material starts flowing in the first cavity.

Next, the structure can be made such that the side partition is provided so that a width of the first cavity becomes larger in the lateral direction in the front portion, that is, the first raw material partly enters into the side cavity.

In the cushion seat using the cushion member formed in the manner mentioned above, the obverse layer portion made of the first raw material can surround the entirety of the thighs of a user when being used as the seat.

Accordingly, it is possible to further improve an operability of a pedal or the like applied by the driver corresponding to the user.

Even if the thighs of the user move in the width direction, the user can be gently supported by the contact portions in the side portions, so that it is possible to reduce fatigue in the case that the user sits on the seat for a long time.

It is preferable that the structure is made such that the first raw material and the second raw material are both a mixed raw material of a polyol group raw material and an isocyanate group raw material, wherein a weight mixing ratio of the polyol group raw material is higher than that of the isocyanate group raw material and a weight mixing ratio of the polyol group raw material of the first raw material is higher than that of the second raw material, and the cushion member is formed so that a hardness of the obverse layer portion made of the first raw material is relatively lower than a hardness of the reverse layer portion, the side portions and the second center portion made of the second raw material or a hardness of the reverse layer portion and the second center portion of the second raw material.

Accordingly, since the obverse layer portion having the low hardness tends to be easily bent when sitting on the seat using the cushion member, it is possible to improve operability, for example, when the driver of the motor vehicle works an accelerator pedal, a brake pedal or a clutch pedal. Further, it is possible to improve a sitting feeling of the user.

In the case of differentiating the hardness of the obverse layer portion from the hardness of the other portions, the mixed raw material between the polyol group raw material and the isocyanate group raw material is employed for both of the first and second raw materials. That is, since the same kind of raw material corresponding to a material for a urethane resin foamed product is inherently employed, the boundary portion between the obverse layer portion and the reverse layer portion and the boundary portion between the obverse layer portion and the side portion can be chemically bonded in the boundary portion at a time of foaming. Accordingly, it is possible to form the cushion member having the two-layer structure including the soft portion and the hard portion and having a firm connection in the boundary portion.

It is preferable to mold so that the first raw material is made by mixing the polyol group raw material having a relatively smaller molecular weight than that of the second raw material with the isocyanate group raw material, whereby an impact resilience of the obverse layer portion made of the first raw material becomes relatively lower than an impact resilience of the reverse layer portion, the side portions and the second center portion made of the second raw material, or an impact resilience of the reverse layer portion and the second center portion made of the second raw material.

In this case, the impact resilience creates a repulsive force tending to go back to an original position at a time of being compressed by an application of an external force. Further, the foamed product having a low impact resilience generally has an excellent vibration absorbing performance.

Accordingly, when sitting on the seat using the cushion member, the seat has a low impact resilience of the obverse layer portion, so that it is possible to achieve a soft contact feeling at a time of sitting. Further, since the impact resilience of the obverse layer portion is low, it is possible to reduce the vibration transmission to the user. Accordingly, for example, it is possible to improve the operability of the driver of the motor vehicle, and it is possible to improve a sitting feeling of the user.

For the purpose of differentiating the hardness of the obverse layer portion from the hardness of the other portions, the mixed raw material between the polyol group raw material and the isocyanate group raw material are employed for both of the first raw material and the second raw material. That is, since the same kind of raw material such as the material for the urethane resin foamed product is originally employed, the boundary portion between the obverse layer portion and the reverse layer portion and the boundary portion between the obverse layer portion and the side portions can be chemically bonded in the boundary portion at a time of foaming. Accordingly, it is possible to form the cushion member having the two-layer structure including the soft portion and the hard portion and having a firm connection in the boundary portion.

In this case, the first raw material employs the polyol group raw material having a relatively smaller molecular weight than the second raw material, however, with respect to the isocyanate group raw material, various kinds of molecular weights can be employed for both of the first raw material and the second raw material.

It is preferable that the first raw material is injected at a weight obtained by multiplying an amount proportional to a rate occupied by the obverse layer portion with respect to a capacity of a whole of the cushion member by a density of the foamed product of the first raw material, and the second raw material is injected at a weight obtained by multiplying an amount proportional to a rate occupied by the reverse layer portion, the side portions and the second center portion with respect to the capacity of the whole of the cushion member or an amount proportional to a rate occupied by the reverse layer portion and the second center portion by a density of the foamed product of the second raw material, respectively.

As mentioned above, since the injection amounts of the first raw material and the second raw material are set to the amounts corresponding to the capacity after they are expanded at a time actually foaming, the raw materials can completely foam within the molding die after the lower die and the upper die are closed. Accordingly, each of the portions in the formed cushion member has no irregularity such as non-foamed portion or the like, and the foamed product made of the first raw material or the second raw material can form the cushion member having a predetermined even density.

It is preferable that the first raw material and the second raw material are constituted by materials respectively showing different colors after finishing foaming.

This can be easily put into practice, for example, by adding a color pigment to at least any one of the first raw material and the second raw material.

Accordingly, since it is easy to visually confirm the two-layer structure of the formed cushion member, it is easy to inspect the product after being foamed.

In the second aspect in accordance with the present invention, it is preferable that a bag-like cavity having the opening portion is formed between the flexible film and the cavity.

Accordingly, the first raw material flowing from the opening portion is concentrically filled in the bag-like cavity, and it is possible to easily form the cushion member having the two-layer structure with a regular shape.

It is preferable that a partition plate provided so as to section a part of the cavity is arranged in the lower die and the flexible film is bridged over at least any one of the cavity and the partition plate, thereby forming a bag-like cavity having the opening portion.

Since the flexible film can be bridged over the partition plate, it is possible to further flexibly determine the position to be arranged.

The cushion member can be formed in an optional shape having a groove-like slit by arranging the partition plate.

It is preferable that the partition plate is at least any one of the front and rear partition plate sectioning the cavity into the front cavity and the rear cavity in a front and rear direction and a pair of side partition plates sectioning the cavity into both right and left side cavities and the center cavity disposed therebetween.

Due to the front and rear partition plate, a groove-like slit can be provided in the front and rear direction in the cushion member, thereby forming a front portion corresponding to the front cavity and a rear portion corresponding to the rear cavity.

Due to the side partition plates, the groove-like slits can be provided in both right and left sides in the cushion member, thereby forming side portions corresponding to the side cavities.

Next, it is preferable that the end portion of the flexible film is fixed to the lower die by a fixing device.

Accordingly, the flexible film can be securely fixed within the lower die.

In this case, the fixing portion may be taken out while being gripped by the cushion member together with the flexible film after finishing the formation of the cushion member, or may be left in the lower die and used plural times.

It is preferable that the flexible film has a plurality of through holes.

Accordingly, during the formation of the cushion member, the first foamed product made of the first raw material and the second foamed product made of the second raw material are bonded through the plurality of through holes, whereby an integral degree of bond in the cushion member can be further improved.

Further, due to the through holes, the flexible film can also employ a structure having a poor adhesive property with the first foamed product made of the first raw material or the second foamed product made of the second raw material.

It is preferable that an area of the opening portion per one of the through holes is between 1 $mm^2$ and 7 $mm^2$. In the case that the area is less than 1 $mm^2$, a size of the through hole is so small that there is a risk that the first raw material and the second raw material cannot chemically bond via the through hole. Further, in the case that the area is more than 7 $mm^2$, the size of the through hole is so large that the first raw material or the second raw material leaks from the through holes during the foaming and flowing process, so that there is a risk that the raw materials are mixed.

It is preferable that the flexible film is constituted by a net body.

Accordingly, the first raw material and the second raw material are bonded through the through holes in the net body during the formation of the cushion member, whereby the integral degree of bond in the cushion member is further improved.

Further, due to the net body, the flexible film can also employ a structure having a poor adhesive property with the first foamed product made of the first raw material or the second foamed product made of the second raw material.

It is preferable that a preferable size of the through hole in the net body is the same as that of the plurality of through holes.

It is preferable that the flexible film is arranged substantially in parallel to a bottom wall surface of the cavity.

Accordingly, it is possible to easily form the cushion member in which the thickness of the first foamed product and the second foamed product is uniform.

It is preferable that the flexible film is arranged in non-parallel to the bottom wall surface of the cavity.

Accordingly, it is possible to form the cushion member having various kinds of shapes of two-layer structure in which the thickness of the first foamed product and the second foamed product is different depending on a desired position.

It is preferable that the flexible film is arranged in a loosened state at a time of being fixed to the cavity of the lower die.

Accordingly, at a time of flowing the first raw material from the opening portion, it is possible to expand the bag-like cavity formed by the flexible film so as to increase the thickness of the first foamed product made of the first raw material. Therefore, it is possible to give an optional change to the thickness of the first foamed product.

Next, it is preferable that the opening portion is opened obliquely upward.

Accordingly, it is possible to easily fill the bag-like cavity positioned at the obliquely downward portion of the opening portion with the first raw material flowing from the opening portion. Therefore, it is possible to prevent an unfilled portion such as a void or the like from being generated in the first foamed product made of the first raw material.

EMBODIMENT

Embodiment 1

A description will be given of a manufacturing method of a cushion member in accordance with an embodiment of the present invention with reference to FIGS. 1 to 12.

As shown in FIG. 1, a cushion member 1 manufactured in accordance with the present embodiment has side portions 12 arranged in both right and left sides in the cushion member 1, a front portion 11 corresponding to a first center portion including an obverse layer portion 111 arranged between the right and left side portions 12 and positioned in an obverse side in the cushion member 1 and a reverse layer portion 112 positioned in a reverse side thereof, and a rear portion 13 corresponding to a second center portion arranged at the rear of the front portion 11. Further, the cushion member 1 is expansion molded by using a lower die 2 and an upper die 3.

Figure 4:
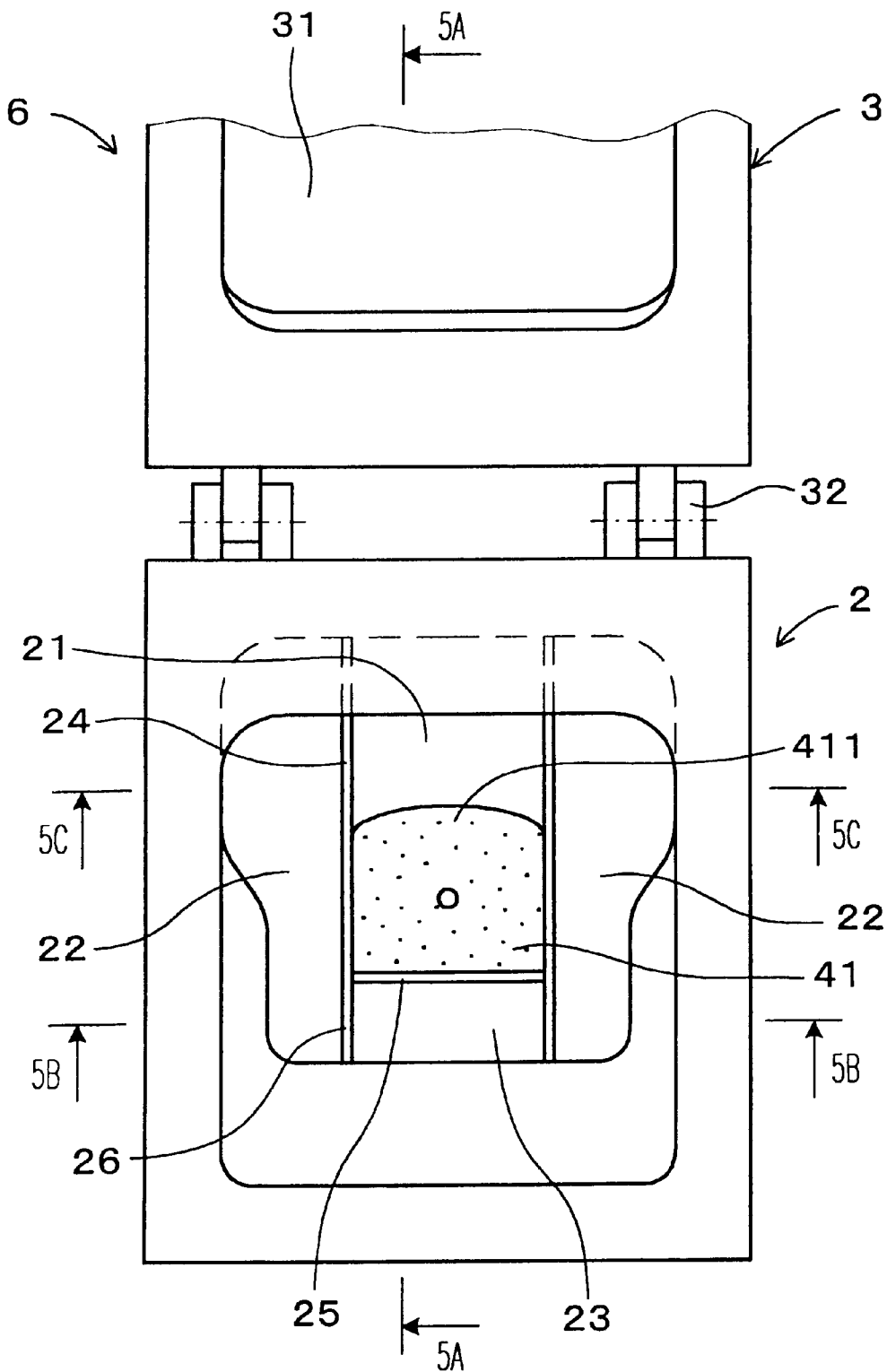
FIG. 4 is a plan view showing a molding die in a state of injecting a first raw material, in accordance with the embodiment 1.
Figure 5A:
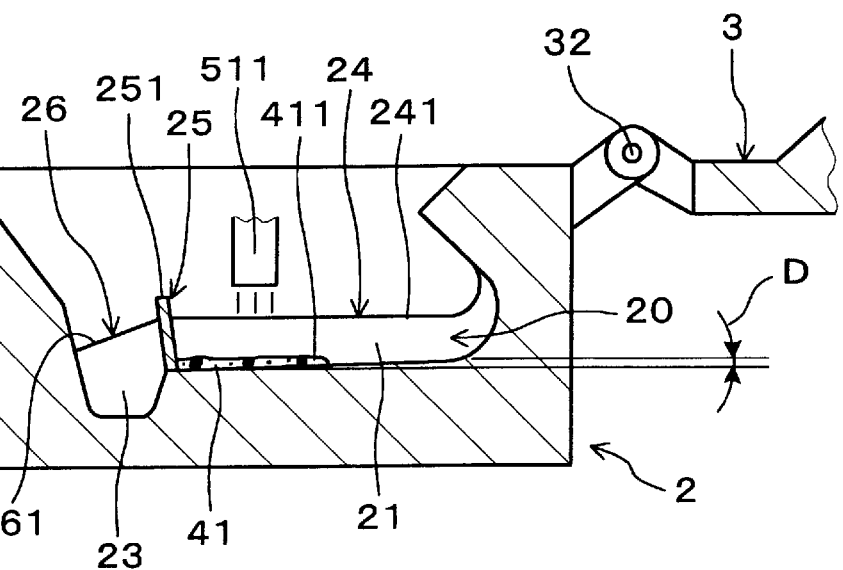
Figure 5B:
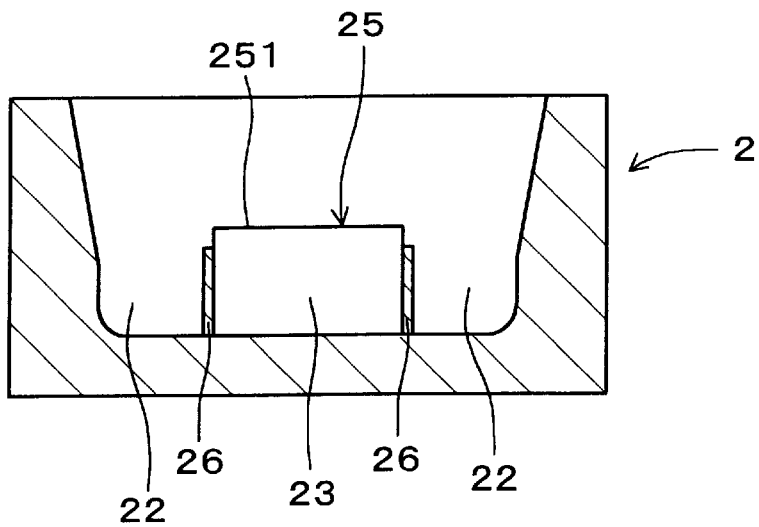
Figure 5C:
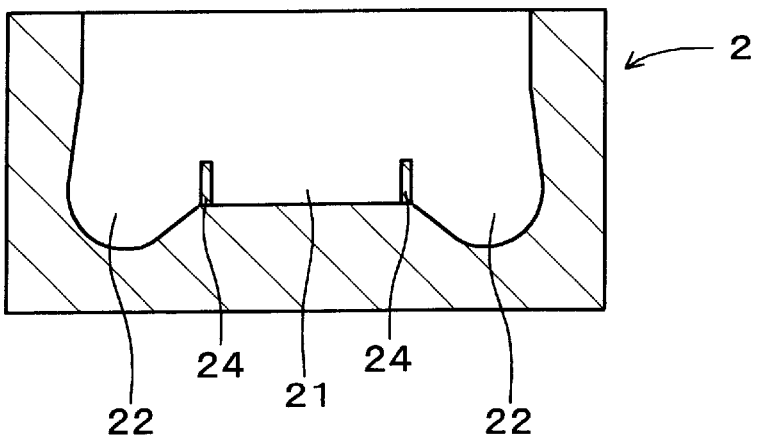

As shown in FIGS. 4 and 5, in the lower die 2, there are formed side cavities 22 for forming the right and left side portions 12, a front cavity 21 corresponding to a first cavity for forming the front portion 11 and a rear cavity 23 corresponding to a second cavity for forming the rear portion 13. Further, there is formed a side partition 20 in which front partitions 24 corresponding to a first side partition are provided between the side cavities 22 and the first cavity 21, and rear partitions 26 corresponding to a second side partition are provided between the side cavities 22 and the second cavity 23. Further, a front and rear partition 25 is provided between the front cavity 21 and the rear cavity 23.

Figure 3:
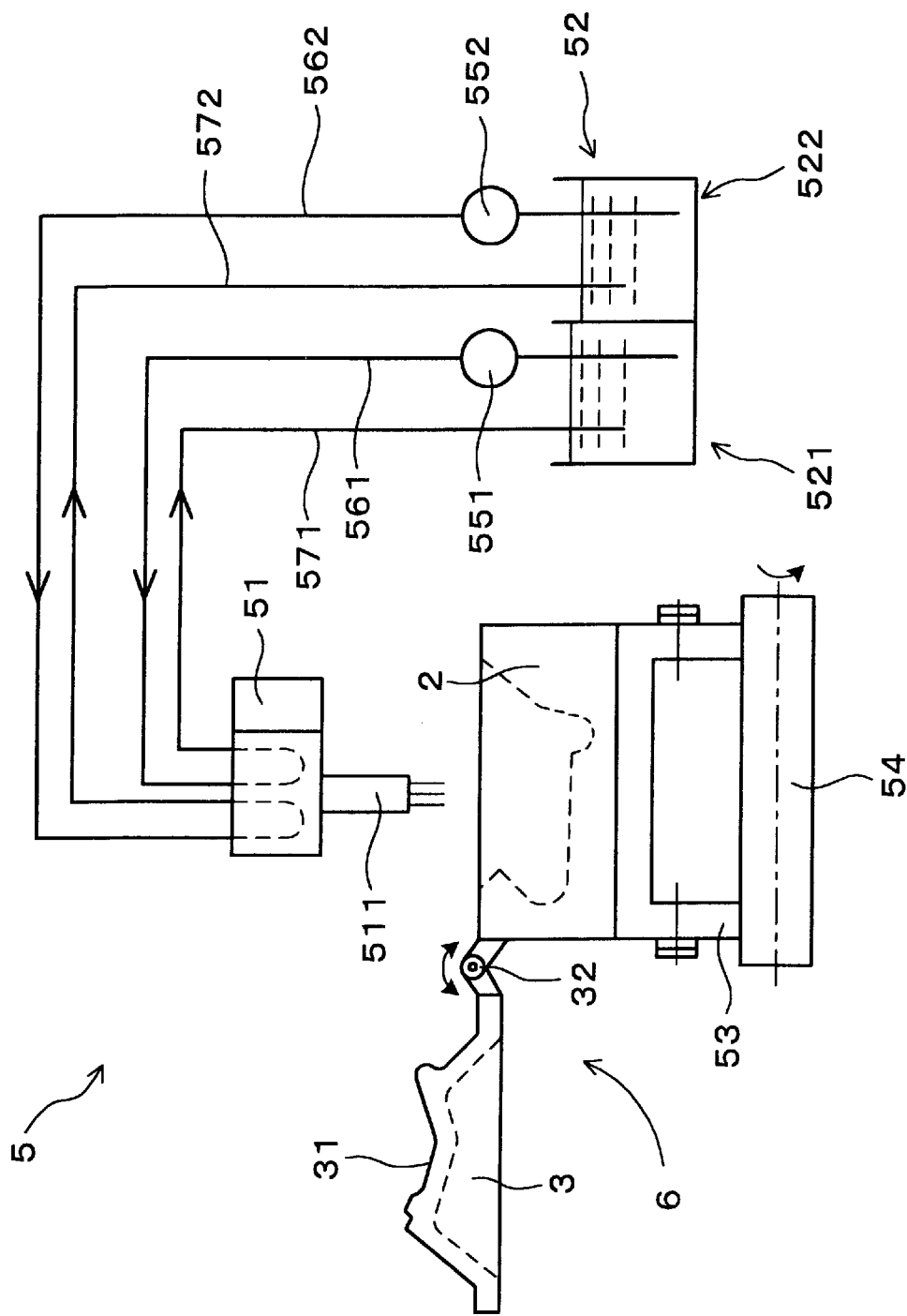
FIG. 3 is a schematic view showing a manufacturing apparatus in accordance with the embodiment 1.

On the other hand, as shown in FIG. 3, the upper die 3 has a bottom portion forming surface 31 for forming a bottom portion of the cushion member 1.

Figure 6:
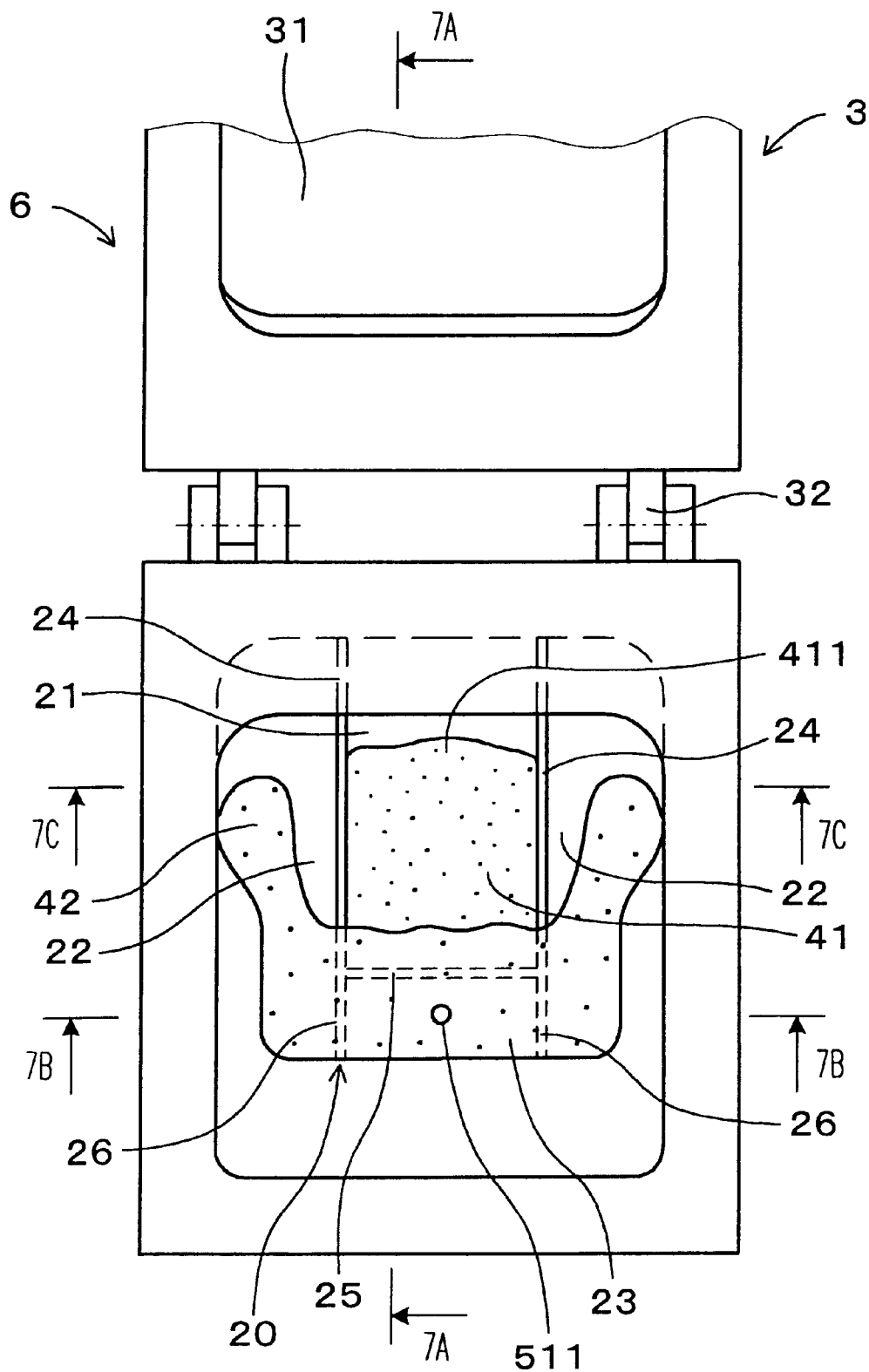
FIG. 6 is a plan view showing a molding die in a state of injecting a second raw material, in accordance with the embodiment 1.
Figure 7A:
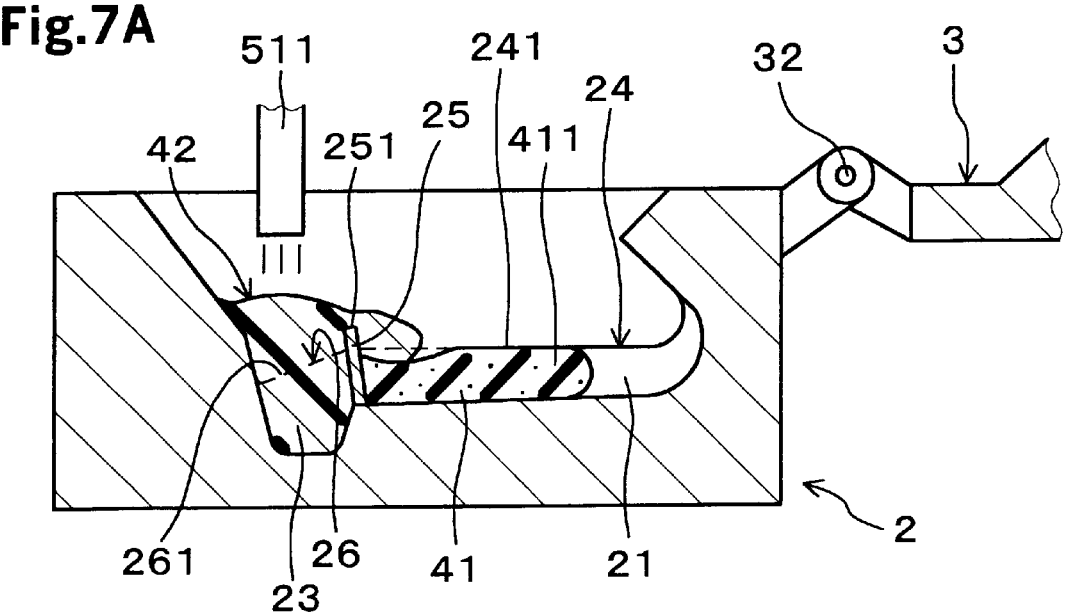
Figure 7B:
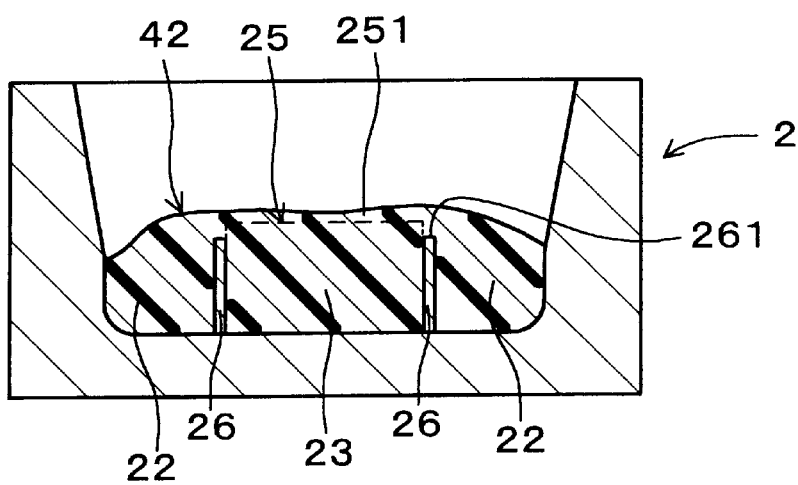
Figure 7C:
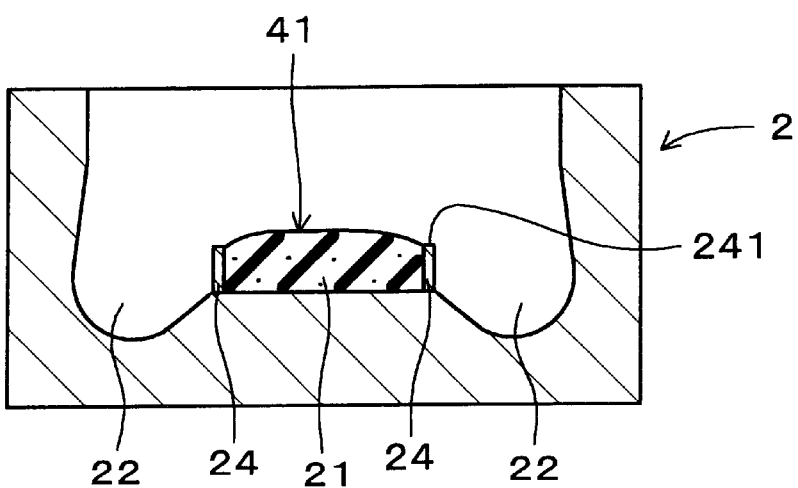

As shown in FIGS. 4 and 5, at a time of executing the foaming process, a first raw material 41 having an expandable property is injected to the front cavity 21, and as shown in FIGS. 6 and 7, a second raw material 42 having an expandable property and forming a foamed product having a different physical property from that of a foamed product made of the first raw material 41 at a time of finishing a foaming process is injected to the rear cavity 23.

Figure 8:
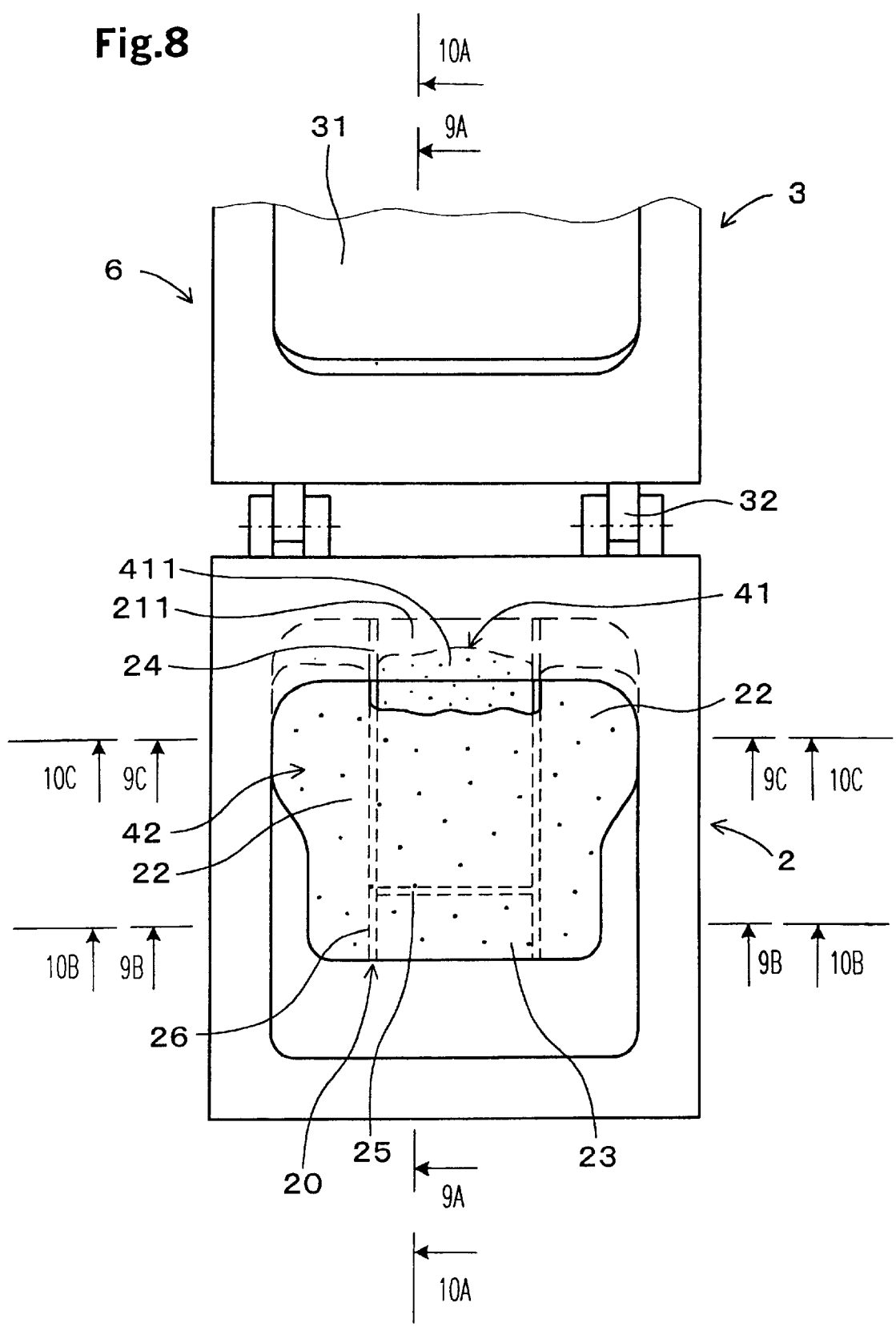
FIG. 8 is a plan view showing a molding die in a state of closing an upper die and a lower die, in accordance with the embodiment 1.
Figure 9A:
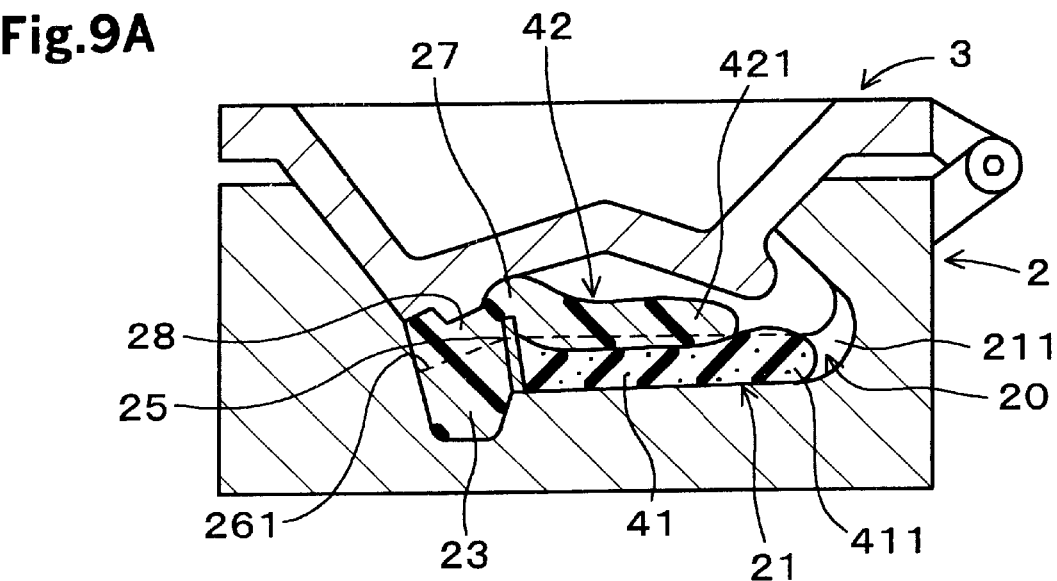
Figure 9B:
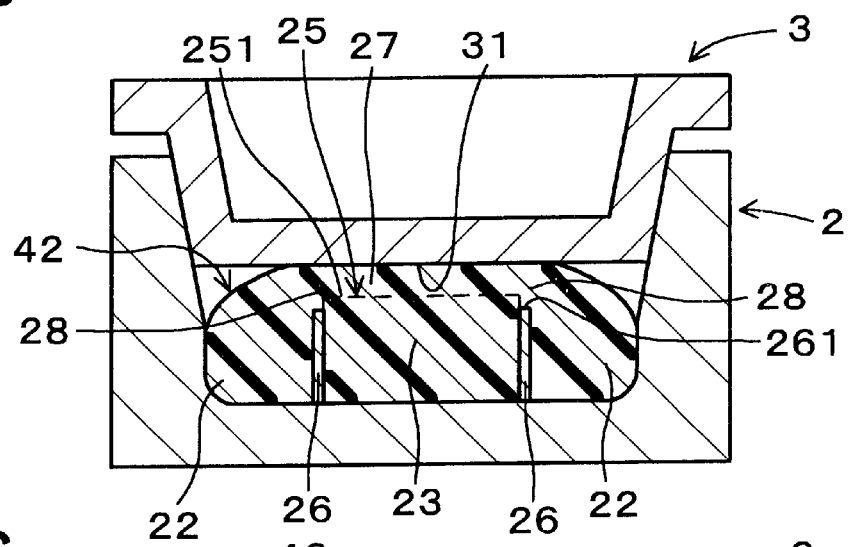
Figure 9C:
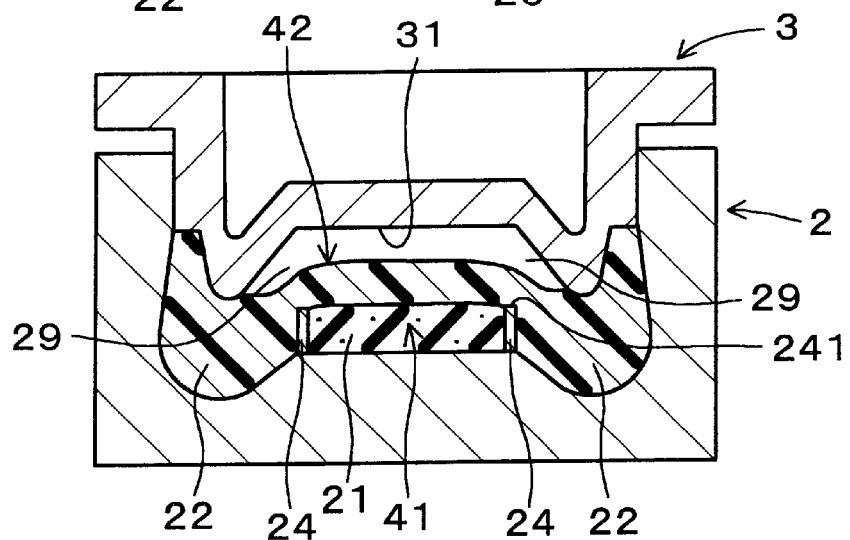

Then, as shown in FIGS. 8 and 9, the lower die 2 and the upper die 3 are closed until the first raw material 41 foams and flows within the front cavity 21, and the second raw material 42 starts foaming and flowing toward the side cavities 22 and the front cavity 21 from the rear cavity 23. As mentioned above, when the lower die 2 and the upper die 3 are closed, a front and rear flow port 27 is formed between the bottom portion forming surface 31 of the upper die 3 and an upper end 251 of the front and rear partition 25, a front flow port 29 is formed between the bottom portion forming surface 31 of the upper die 3 and an upper end 241 of the front partition 24, and a rear flow port 28 is formed between the bottom portion forming surface 31 and an upper end 261 of the rear partition 26, respectively.

In this case, it is preferable that the lower die 2 and the upper die 3 are closed immediately after injecting the first raw material 41 and the second raw material 42.

Thereafter, the second raw material 42 flows within the front cavity 21 while being restricted in a flow amount and a flow direction for the flow from the front and rear flow port 27, that is, in a state of being prevented from freely foaming and flowing upward over the bottom portion forming surface 31 of the upper die 3, and also covers over the first raw material 41 so as to flow forward in such a manner as to follow a flow of a flow front end portion 411 of the first raw material 41 while restricting the upward foam and flow of the first raw material due to its weight.

Figure 10A:
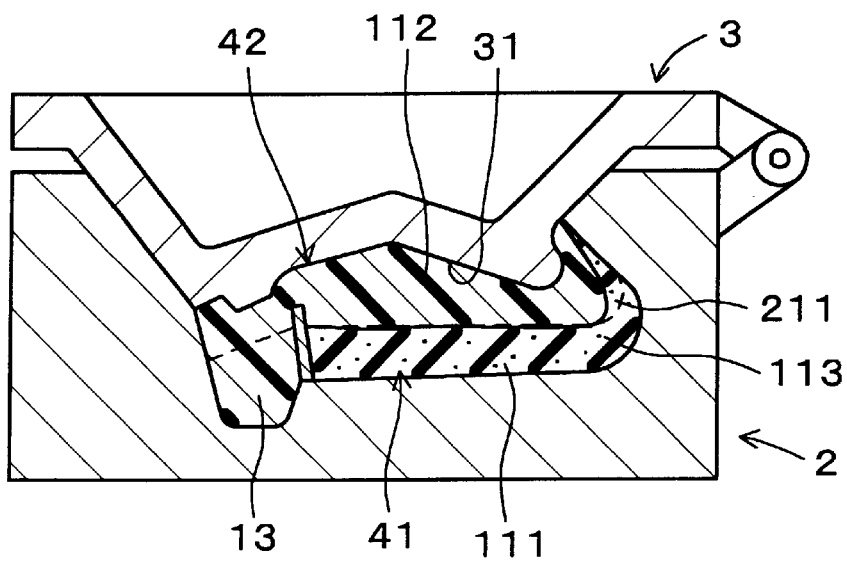
Figure 10B:
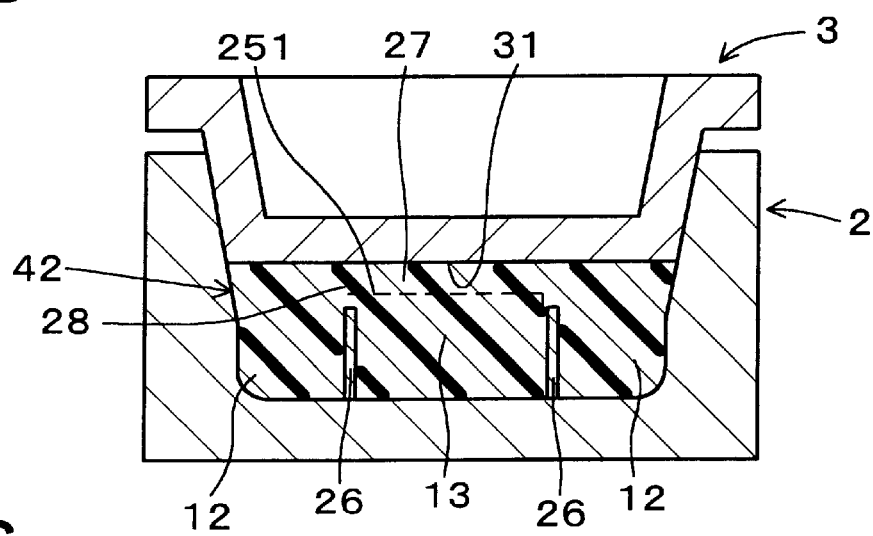
Figure 10C:
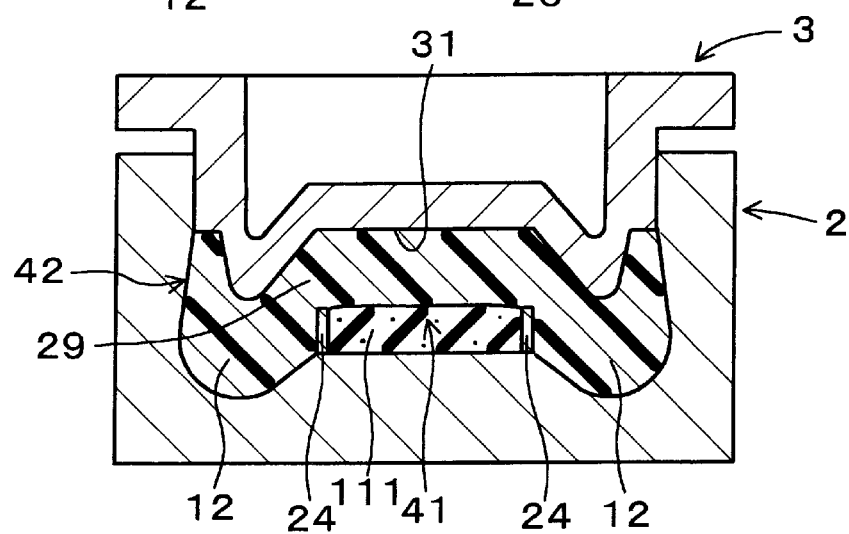

Then, as shown in FIG. 10, finally, the first raw material 41 forms an obverse layer portion 111 below the front cavity 21, and forms a front edge portion 113 in a forward end portion 211 of the front cavity 21. On the other hand, the second raw material 42 forms the reverse layer portion 112 above the front cavity 21 and forms the side portions 12 and the rear portion 13 in the side cavities 22 and the rear cavity 23, respectively.

A description will be in detail given below of the above.

The cushion member 1 manufactured in accordance with the present embodiment is used in a seat portion of a seat in a motor vehicle.

As shown in FIG. 1, side grooves 14 are formed between the front portion 11 and the side portions 12 in both of right and left sides of the cushion member 1. Further, a front and rear groove 15 is formed between the front portion 11 and the rear portion 13 of the cushion member 1.

As shown in FIG. 2A, the front edge portion 113 made of the foamed product formed of the same first raw material 41 as that of the obverse layer portion 111 is formed in the forward end portion 211 of the front portion 11. The front edge portion 113 is formed so as to surround an obverse side of the reverse layer portion 112.

Figure 2B:
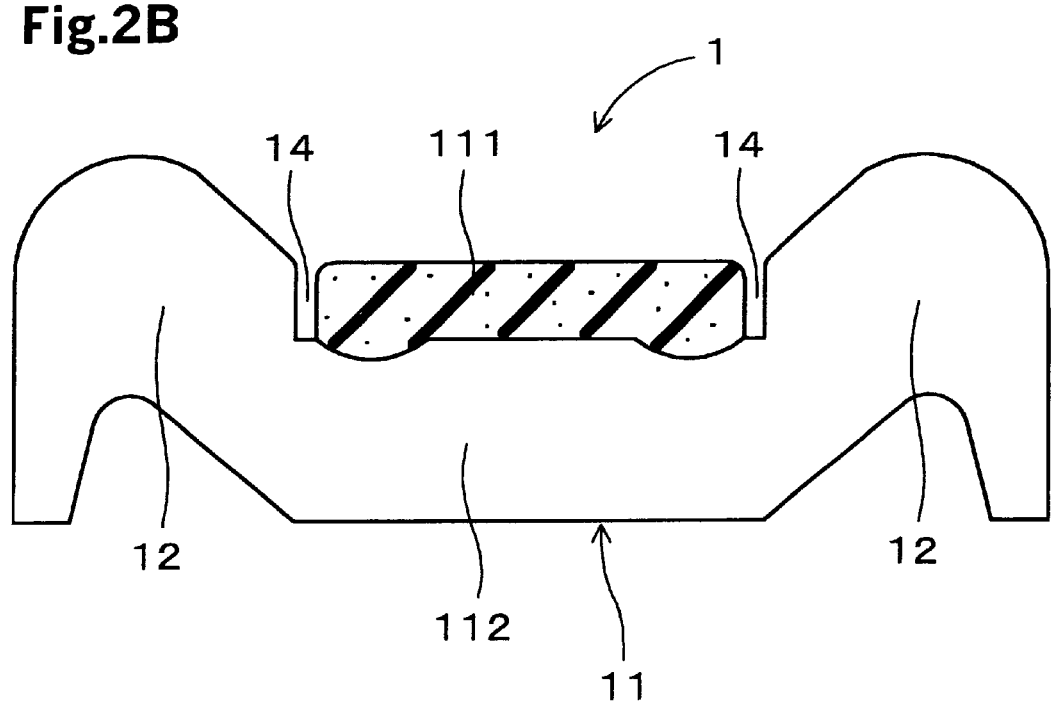
FIG. 2B is a cross sectional view along a line 2B—2B in FIG. 1 in accordance with the embodiment 1.

As shown in FIGS. 2A and 2B, the reverse layer portion 112 of the front portion 11, the side portions 12 and the rear portion 13 are integrally formed of the second raw material 42. Further, as described below, the obverse layer portion 111 is formed of a urethane resin foamed product having a lower hardness than that of the reverse layer portion 112, the side portions 12 and the rear portion 13. Further, the cushion member 1 is covered with a cover such as a cloth or the like on the surface thereof and constitutes the seat portion of the seat.

Since the obverse layer portion 111 is separated in a peripheral portion from the side portions 12 and the rear portion 13 of a peripheral hard foamed product made of the second raw material 42, by the side grooves 14 and the front and rear groove 15, the obverse layer portion 111 is not pulled by the side portions 12 and the rear portion 13 when the obverse layer portion 111 is compression deformed, whereby it is possible to sufficiently achieve an advantage of the soft foamed product.

Since the reverse layer portion 112 of the hard foamed product exists below the obverse layer portion 111, it is possible to restrict a significantly deep sinking when the user sits on the seat, so that it is possible to make a sitting feeling of the user comfortable.

In the cushion member 1, it is preferable that a compression load, when the cushion member 1 is 25% compressed with respect to a thickness of a whole by pressing a disc having a diameter 20 cm (this is called as 25% hardness), is within a range between 98 and 147 N (between 10 and 15 kgf) in the obverse layer portion 111, and within a range between 176 and 245 N (between 18 and 25 kgf) in the reverse layer portion 112, the side portions 12 and the rear portion 13.

Accordingly, it is possible to form an improved cushion member 1 so as to satisfy a characteristic evaluation test mentioned below. Here, in the case that a value of the obverse layer portion 111 is less than 98 N (10 kgf), when the user sits on the seat using the cushion member 1, there is a risk that an impact caused when the seat is brought into contact with a hip of the user at an initial sitting period may not be absorbed. On the other hand, in the case that the value of the obverse layer portion 111 is more than 147 N (15 kgf), there is a risk that a soft contact feeling cannot be obtained at the initial sitting period when the user sits on the seat.

In the case that the values of the reverse layer portion 112, the side portions 12 and the rear portion 13 are less than 176 N (18 kgf), a permanent strain feeling at a time of sitting in the seat using the cushion member 1 is increased and a side supporting property is reduced, so that there is a risk that stability at a time of sitting is deteriorated. On the other hand, in the case that the value of the reverse layer portion 112, the side portions 12 and the rear portion 13 are more than 245 N (25 kgf), a repulsion force of the cushion member 1 when an impact or the like during the vehicle travel is applied on the cushion member 1 while the user sits on the seat becomes too strong, so that there is a risk that a sitting feeling of the user is deteriorated.

It is preferable that a thickness of the obverse layer portion 111 of the cushion member 1 is within a range between 20 and 40 mm, and more preferably it is within a range between 25 and 35 mm.

Accordingly, when the user sits on the seat using the cushion member 1, it is possible to sufficiently absorb the impact at a time when the hip of the user is brought into contact therewith at a sitting initial period, and it is possible to improve an impact absorption at a time when the user sits on the seat.

Here, in the case that the thickness of the obverse layer portion 111 is less than 20 mm, there is a risk that a soft contact feeling can not be obtained at a sitting initial period when the user sits on the seat. On the other hand, in the case that the thickness of the obverse layer portion 111 is more than 40 mm, a proportion occupied by the soft material becomes larger than a proportion occupied by the hard material, in the front portion 11 of the cushion member 1, so that a bottom attaching feeling at a time of sitting is increased, whereby there is a risk that the sitting feeling is deteriorated.

It is preferable that an error of the thickness of the obverse layer portion 111 is within a range of about ±5 mm with respect to the value mentioned above. Accordingly, the cushion member 1 can achieve a uniform sitting feeling.

Further, it is preferable that a shape of the front edge portion 113 of the obverse layer portion 111 is formed in a round substantially hook shape, and it is preferable that the thickness of the front edge portion 113 is set to be larger than the thickness of portions other than the front edge portion 113 of the obverse layer portion 111. Accordingly, even in the case of applying a strong compression force to the front edge portion 113, for example, when the driver of the motor vehicle works an accelerator pedal, a brake pedal or a clutch pedal, a compression property of the cushion member 1 is good and an operability of the pedals can be further improved.

In this case, in accordance with the manufacturing method of the present embodiment, the seat portion of the seat is formed, however a backrest portion of the seat may be formed on the basis of the same manufacturing method.

A description will be given of the raw material employed in the cushion member 1.

Both of the first raw material 41 and the second raw material 42 are a mixed raw material of a polyol group raw material and an isocyanate group raw material. Further, a weight mixing ratio of the polyol group raw material is higher than that of the isocyanate group raw material, and a weight mixture ratio of said polyol group raw material of the first raw material 41 is higher than that of the second raw material 42. By increasing the weight mixture ratio of the polyol group raw material, a harness of the foamed product becomes low and the foamed product becomes soft at a time of expanding molding the raw material.

Accordingly, in the cushion member 1, the hardness of the obverse layer portion 111 made of the first raw material 41 relatively becomes low in comparison with the hardness of the reverse layer portion 112, the side portions 12 and the rear portion 13 made of the second raw material 42.

In this case, in particular, the first raw material 41 is structured such that the weight mixture ratio of the isocyanate group raw material is 33.2 in the case that the weight mixture ratio of the polyol group raw material is 100.

Further, the second raw material 42 is structured such that the weight mixture ratio of the isocyanate group raw material is 40.6 in the case that the weight mixture ratio of the polyol group raw material is 100.

As mentioned above, since the obverse layer portion 111 is formed of the soft foamed product in comparison with the other portions, the obverse layer portion 111 is largely compressed in comparison with the other portions when the user sits on the seat using the cushion member 1, so that for example, when the driver of the motor vehicle works the accelerator pedal, the brake pedal or the clutch pedal, it is possible to improve an operability and it is possible to improve a sitting feeling of the user.

The weight mixture ratio is adjusted as mentioned above, and the first raw material 41 is made by mixing the polyol group raw material having a relatively smaller molecular weight than that used in the second raw material 42 with the isocyanate group raw material. Further, the second raw material 42 is made by mixing the polyol group raw material having a relatively larger molecular weight than that used in the first raw material 41 with the isocyanate group raw material.

That is, generally, when using the polyol group raw material having a small molecular weight, the repulsion force of the foamed product made after foaming becomes low. Accordingly, the impact resilience of the obverse layer portion 111 becomes relatively lower than the impact resilience of the reverse layer portion 112, the side portions 12 and the rear portion 13.

Accordingly, since the repulsion force of the obverse layer portion 111 is lower than the repulsion force of the other portions when the user sits on the seat using the cushion member 1, it is possible to give a soft feeling to the user, and it is possible to improve the operability of the driver of the motor vehicle. On the other hand, since the repulsion force intending to return to the original position against the compression largely acts in the other portions, and a proper cushioning property can be kept, it is possible to improve the sitting feeling of the user.

Further, the mixed raw material of the polyol group raw material and the isocyanate group raw material is employed in both of the first raw material 41 and the second raw material 42. That is, since the first raw material 41 and the second raw material 42 are the same kind of raw material corresponding to the material for the urethane resin foamed product, the boundary portion between the obverse layer portion 111 and the reverse layer portion 112 and between the obverse layer portion 111 and the side portions 12 can be chemically bonded in the boundary portion at a time of being foamed. Accordingly, it is possible to form the cushion member 1 having the two-layer structure including the soft portion and the hard portion and having the firm connection in the boundary portion.

Since the first raw material 41 and the second raw material 42, which are different materials, are made from two kinds of the polyol group raw material and the isocyanate group raw material, it is easy to control the product for forming the cushion member 1 and it is possible to make the structure of the manufacturing apparatus simple.

The polyol group raw material is called a resin premix raw material and is made by mixing the polyol, a water, a silicone, an assyn group catalyst and a cross linking agent. A mixture of TDI (tolylene diisocyanate) and MDI (diphenylmethane di4,4 diisocyanate) or the like can be employed for the isocyanate group raw material.

The first raw material 41 and the second raw material 42 are constituted by materials showing different colors after the foaming process is completed. This can be easily put into practice, for example, by adding a color pigment to at least any one of the first raw material 41 and the second raw material 42.

Accordingly, it is possible to easily visually confirm that the cushion member 1 after being formed becomes the two-layer structure. Therefore, it is easy to inspect the product after being expanding molded, that is, to inspect whether or not the foamed product formed of the first raw material 41 and the second raw material 42 is formed at a predetermined position and in a predetermined shape.

Next, a description will be given of the molding die 6 corresponding to the lower die 2 and the upper die 3.

As shown in FIG. 3, the lower die 2 is formed so as to make the obverse side of the cushion member 1 downward and have the shape of the obverse side. On the other hand, the upper die 3 is rotatably connected to the lower die 2 by a hinge portion 32 so as to be freely opened and closed.

The rear partition 26 is structured such that a height of an upper end 261 is made lower than a height of an upper end 251 of the front and rear partition 25 in the vertical direction. Accordingly, the second raw material 42 is structured such as to ride over the upper end 261 of the rear partition 26 so as to start foaming and flowing within the side cavities 22 before riding over the upper end 251 of the front and rear partition 25 so as to start foaming and flowing in the front cavity 21. Therefore, there can be obtained an advantage that it is unnecessary to inject the second raw material 42 particularly to the side cavities 22; it is only necessary to inject the second raw material 42 to the rear cavity 23.

In the case that the capacity of the side cavities 22 is different between the right and left, the structure is made such that the height of the upper end 261 of the rear partition 26 positioned in the side of the side cavity 22 having the larger capacity is made low and a lot of second raw material 42 flows to the side cavity 22 having the larger capacity.

The capacity of the rear cavity 23 surrounded by the front and rear partition 25 and the rear partition 26 is made larger than the volume of the injected second raw material 42 before starting the foaming process. Accordingly, an elapse of a predetermined time is required for the injected second raw material 42 to ride over the upper end 251 of the front and rear partition 25 and start foaming and flowing in the front cavity 21. Therefore, it is possible to prevent the second raw material 42 from passing over a flow front end portion 411 of the expanding flow of the first raw material 41 injected to the front cavity 21.

As shown in FIG. 5A, it is preferable that the lower die 2 is formed so that the bottom portion of the front cavity 21 has an angle of incline D between 1 and 5 degrees with respect to the horizontal surface of the front portion of the front cavity 21, that is, a side of a front edge portion 113 is higher. The angle of incline D can be put into practice by designing the lower die 2 and the upper die 3 on the assumption of arranging the cushion member 1 in an inclined state at 1 to 5 degrees and forming the shape of the lower die 2 and the upper die 3.

Accordingly, the first raw material 41 injected into the lower die 2 from an injection head 51 mentioned below first expands toward the rear cavity 23 and the side cavities 22 due to its weight. That is, since the first raw material 41 first flows to the rear portion in the front cavity 21 and thereafter flows forward due to a capacity expansion together with the foaming, the first raw material 41 can uniformly flow to a whole of the front cavity 21, and a void is not generated in the foamed product.

The second raw material 42 is prevented by the front and rear partition 25 from flowing to the front cavity 21, and can at first ride over the upper end 261 of the rear partition 26 and first starts flowing to the side cavities 22, so that a sufficient amount of raw material for forming the side portions 12 is supplied.

In accordance with the present embodiment, the area of the bottom surface of the front cavity 21 is larger than that of the rear cavity 23. Accordingly, the first raw material 41 injected to the front cavity 21 mainly flows in a direction of a flat surface in comparison with the flow in an upward direction, and the second raw material 42 injected to the rear cavity 23 mainly flows in the upward direction.

As shown in FIG. 5A, the upper end 261 of the rear partition 26 is lower than the upper end 241 of the front partition 24, and the upper end 241 of the front partition 24 is lower than the upper end 251 of the front and rear partition 25.

Next, a description will be given of a whole of an apparatus for manufacturing the cushion member 1.

As shown in FIG. 3, the cushion member 1 is formed by a manufacturing apparatus 5. The manufacturing apparatus 5 has the molding die 6 corresponding to the lower die 2 and the upper die 3, the injection head 51, a raw material tank 52 and metering pumps 551 and 552. Further, the molding die 6 is mounted on a truck 53 mounted on a conveyor 54.

A liquid-state polyol group raw material constituting the first raw material 41 and the second raw material 42 is held in a holding chamber 521 in the raw material tank 52 and is fed to the injection head 51 by the metering pump 551. The polyol group raw material can circulate between the injection head 51 and the holding chamber 521 by the metering pump 551. Further, the polyol group raw material is conveyed to the injection head 51 from the holding chamber 521 through a supply pipe 561, and can be recovered to the holding chamber 521 through a recovery pipe 571 from the injection head 51 if the material is not injected from the injection head 51 to the lower die 2.

On the other hand, a liquid-state isocyanate group raw material constituting the first raw material 41 and the second raw material 42 is held in a holding chamber 522 in the raw material tank 52 and is fed to the injection head 51 by the metering pump 552. The isocyanate group raw material can also circulate between the injection head 51 and the holding chamber 522 by the metering pump 552. Further, the isocyanate group raw material is conveyed to the injection head 51 from the holding chamber 522 through a supply pipe 562, and can be recovered to the holding chamber 522 through a recovery pipe 572 from the injection head 51 if the material is not injected from the injection head 51 to the lower die 2.

The structure is made such that the polyol group raw material and the isocyanate group raw material fed from the raw material tank 52 can be mixed within the injection head 51. Further, an injection nozzle 511 is provided in the injection head 51, and the injection nozzle 511 can be opened and closed by an actuator such as a hydraulic cylinder (not shown in FIG. 3) or the like. Further, the structure is made such that the first raw material 41 and the second raw material 42 can be injected by opening the injection nozzle 511 for a predetermined time.

The injection head 51 can move so as to inject the first raw material 41 or the second raw material 42 to the front cavity 21 and the rear cavity 23 in the lower die 2.

The metering pumps 551 and 552 are measuring pumps and can respectively change a circulating amount of the polyol group raw material and the isocyanate group raw material due to a change of a rotational number so as to increase and reduce a supply amount to the injection head 51.

That is, the structure is made such that the weight mixture ratio of the polyol group raw material and the isocyanate group raw material can be changed by changing the rotational numbers of the respective metering pumps 551 and 552. Further, the first raw material 41 and the second raw material 42 can be made by mixing the raw materials at a predetermined weight mixture ratio.

The molding die 6 is mounted on the truck 53, and is conveyed while mounted on the truck 53 when being conveyed by the conveyor 54.

A plurality of molding dies 6 can be mounted on the conveyor 54, and the structure is made such that the molding die 6 to which the first raw material 41 and the second raw material 42 are injected by the injection head 51 can be sequentially fed. As mentioned above, by arranging a plurality of molding dies 6 on the conveyor 54, it is possible to efficiently form a plurality of cushion members 1.

The upper die 3 is opened when the first raw material 41 and the second raw material 42 are supplied to the lower die 2 from the injection head 51.

In this case, the structure may be made such that the injection head 51 is attached to a front end of an articulated robot or the like, and the first raw material 41 and the second raw material 42 are injected to a plurality of molding dies 6 on the basis of a movement of the robot, whereby a plurality of cushion member 1 may be molded.

Further, the injection head 51 may be, of course, independently prepared for the first raw material 41 and the second raw material 42. This is particularly effective in the case that the first raw material 41 or the second raw material 42 is colored or different polyol group raw materials having different molecular weights are employed, in order to easily judge whether or not the cushion member 1 after being formed is good.

Next, a description will be given for a manufacturing method of the cushion member 1 mentioned above.

As shown in FIGS. 4 and 5A, at first, the liquid-state first raw material 41 is injected to the rear position rather than the center position in the front and rear direction of the front cavity 21 in the lower die 2 from the injection nozzle 511 of the injection head 51. After this injection, or at the time of this injection, the first raw material 41 first flows and expands to the side portion and the rear portion due to its weight and due to the angle of incline D in the front cavity.

That is, the portion of the first raw material 41 flowing to the side of the side cavity 22 is brought into contact with the front partition 24 and is prevented by the front partition 24 from entering to the side cavity 22. On the other hand, the portion of the first raw material 41 flowing to the side of the rear cavity 23 is brought into contact with the front and rear partition 25 and is prevented by the front and rear partition 25 from entering to the rear cavity 23. Further, the first raw material 41 flows forward within the front cavity 21 with the flow front end portion 411 positioned at the head.

Next, as shown in FIGS. 6 and 7A to 7C, the liquid-state second raw material 42 is injected into substantially the center position in the front and rear direction and the lateral direction of the rear cavity 23 in the lower die 2 from the injection nozzle 511 of the injection head 51.

In this case, at this moment, it is preferable that the lower die 2 and the upper die 3 are closed; however in an actual mass-production step, the lower die 2 and the upper die 3 may be closed at a time when a little capacity expansion is started after the first raw material 41 and the second raw material 42 starts foaming.

The second raw material 42, after being injected, fills the rear cavity 23 due to the capacity expansion when the foaming is started. When the upper portion of the second raw material 42 reaches the position higher than the upper end 261 of the rear partition 26, the second raw material 42 rides over the upper end 261 and enters into the side cavities 22. Subsequently, the second raw material 42 rides over the upper end 251 of the front and rear partition 25 and enters into the front cavity 21.

Then, the second raw material 42 entering into the side cavities 22 foams and flows forward while charging the rear portion of the sides cavities 22.

The first raw material 41 flows toward the forward portion of the front cavity 21 while executing the foaming process, without riding over the front partition 24 while the second raw material 42 is injected.

At this time, in the front cavity 21, the flow front end portion 421 of the second raw material 42 foams and flows while following the flow front end portion 411 of the first raw material 41.

As mentioned above, as shown in FIGS. 8, 9A, 9B and 9C, the upper die 3 is closed to the lower die 2 when the injection of the second raw material 42 is completed.

At this time, the front and rear flow port 27 is formed between the bottom portion forming surface 31 of the upper die 3 and the upper end 251 of the front and rear partition 25, the front flow port 29 is formed between the bottom portion forming surface 31 of the upper die 3 and the upper end 241 of the front partition 24, and the rear flow port 28 is formed between the bottom portion forming surface 31 and the upper end 261 of the rear partition 26.

The second raw material 42 is prevented by the front and rear flow port 27 from freely foaming and flowing upward, whereby it is possible to adjust a flow amount of flow following the flow front end portion 411 of the first raw material 41. Further, the second raw material 42 covers over the first raw material 41 and flows in the same direction as that of the flow front end portion 411 of the first raw material 41 while preventing the first raw material 41 from foaming and flowing upward due to its weight.

Then, as shown in FIG. 10, when the flow front end portion 411 reaches the forward end portion 211 of the front cavity 21, it is possible to prevent the flow front end portion 411 from flowing forward more, and to prevent the flow front end portion 411 by the flow front end portion 421 of the following second raw material 42 from flowing rearward, so that the forward end portion 211 flows upward. Accordingly, the first raw material 41 goes around the outer side of the second raw material 42 so as to form the front edge portion 113 in the forward end portion 211 of the front cavity 21.

On the other hand, the second raw material 42 continues to flow to the side cavities 22 from the rear flow port 28, fills the side cavities 22 and thereafter foams and flows toward the front cavity 21.

In the manner mentioned above, the second raw material 42 foams and flows and finally flows together above the front partition 24 between the front cavity 21 and the right and left side cavities 22 so as to be chemically combined and integrally form the reverse layer portion 112, the side portions 12 and the rear portion 13.

In the present embodiment, due to the front and rear flow port 27, it is possible to restrict the flow direction and the flow amount of the second raw material 42 flowing following the flow front end portion 411 of the first raw material 41. Further, the second raw material 42 foams and flows forward so as to cover over the first raw material 41 and flows forward while preventing the first raw material 41 from foaming and flowing upward without limitation due to its weight. Accordingly, it is possible to foam and flow the first raw material 41 and the second raw material 42 at a fixed speed.

Accordingly, the obverse layer portion 111 made of the first raw material 41 and the reverse layer portion 112 made of the second raw material 42 can be formed respectively without dispersion in thickness.

The forward flow of the flow front end portion 411 of the first raw material 41 is promoted by the second raw material 42, and when the flow front end portion 411 reaches the forward end portion 211 of the front cavity 21, the flow front end portion 411 is prevented from flowing forward more, and is prevented by the flow of the following second raw material 42 from flowing rearward, thereby flowing toward the upper portion of the front edge portion 113.

Therefore, the first raw material 41 goes around the outer side of the second raw material 42 and can form the front edge portion 113 in the forward end portion 211 of the front cavity 21.

Accordingly, it is possible to form the cushion member 1 having the two-layer structure including the reverse layer portion 112 and the obverse layer portion 111, in which the substantially whole of the front portion 11 and the front surface of the front edge portion 113 are constituted by the foamed product made of the first raw material 41.

In accordance with the manufacturing method of the present embodiment, as mentioned above, it is possible to restrict the flow direction and the flow amount of the second raw material 42 by the front and rear flow port 27. Accordingly, it is possible to form the cushion member 1 having various kinds of front edge portions 113.

Figure 11A:
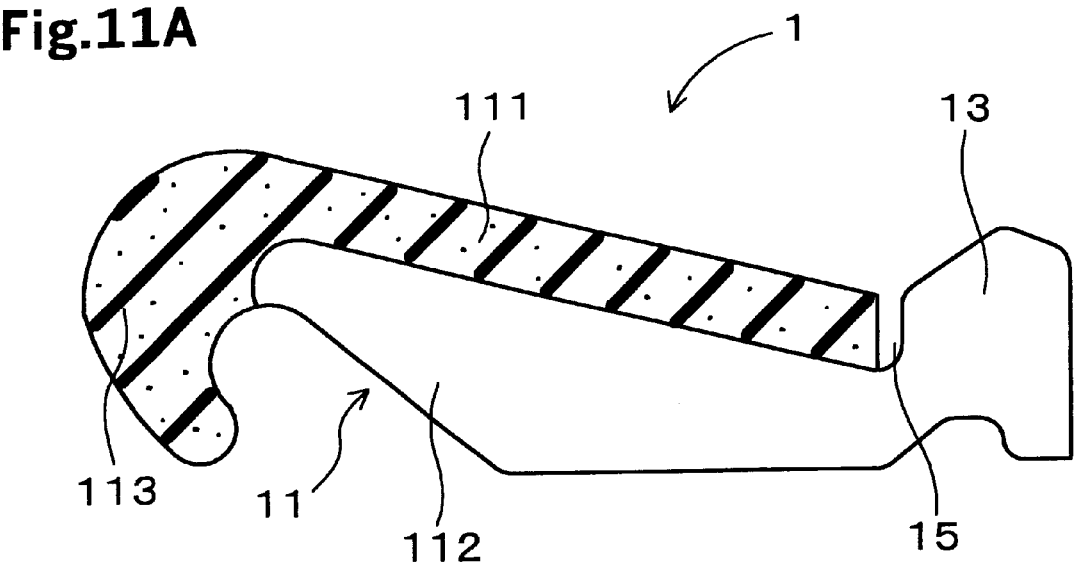
Figure 11B:
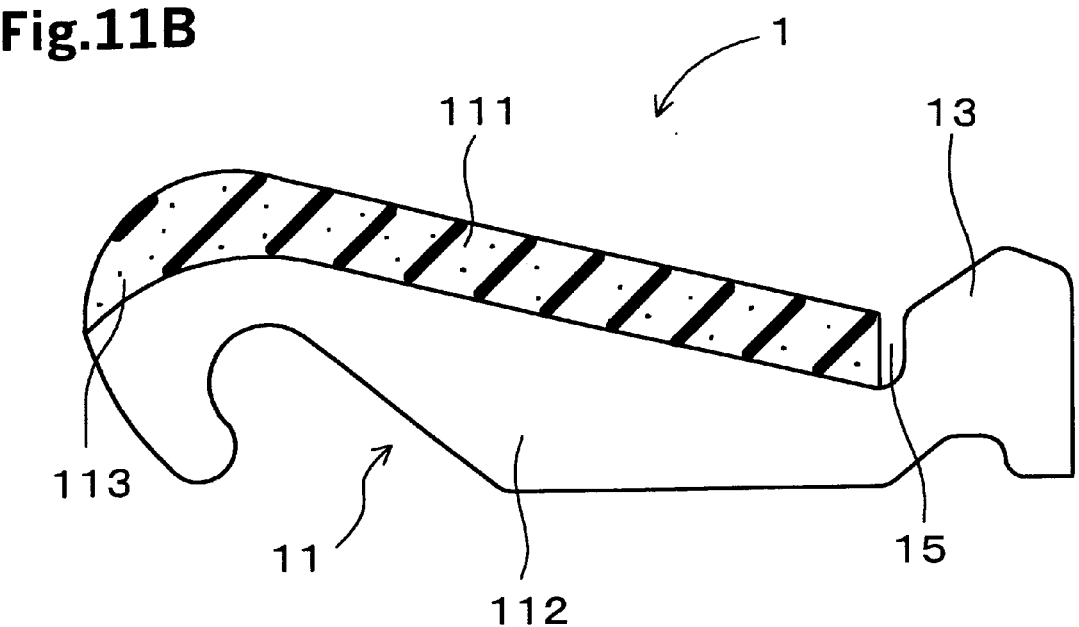

For example, as shown in FIG. 11A, it is possible to foam and flow a lot of first raw material 41 in the forward end portion 211 of the front cavity 21 so as to form the cushion member 1 in which the front edge portion 113 includes a high ratio of foamed product made of the first raw material 41. Further, as shown in FIG. 11B, it is possible to foam and flow a lot of the second raw material 42 in the forward end portion 211 of the front cavity 21 so as to form the cushion member 1 in which the front edge portion 113 includes a high ratio of foamed product made of the second raw material 42.

In this case, the molding die 6 is previously heated to a temperature between 50 and 60 degrees before injecting the first raw material 41 and the second raw material 42. Accordingly, it is possible to effectively foam and flow the injected first raw material 41 and second raw material 42. Further, after closing the upper die 3 toward the lower die 2, the foamed first raw material 41 and second raw material 42 are hardened by passing within the heating furnace having a temperature between 90 and 100° C. for 5 to 6 minutes.

Further, it is considered that the flow front end portion 411 of the first raw material 41 can foam and flow upward in the manner mentioned above for the reason of an assistance of the following effect.

That is, it is considered that the second raw material 42 effectively prevents the first raw material 41 from foaming and flowing upward by the portion covering over the first raw material 41, and allows the first raw material 41 to flow in the direction not being covered by the second raw material 42 so as to foam and flow over the forward end portion 211.

The obverse layer portion 111 and the reverse layer portion 112, and the obverse layer portion 111 and the side portions 12 form the boundary portions, and chemically bonded, whereby the cushion member 1 is formed.

In accordance with the forming method mentioned above, it is possible to form the cushion member 1 having the two-layer structure including the reverse layer portion 112 and the obverse layer portion 111 without forming the boundary portion as in the conventional art on the front surface of the front edge portion 113 of the cushion member 1.

In this case, the first raw material 41 and the second raw material 42 are respectively injected by calculating densities required for the respective cushion bodies on the basis of an amount proportional to the rate occupied by the obverse layer portion 111 with respect to the whole capacity of the cushion member 1 and on the basis of an amount proportional to the rate occupied by the reverse layer portion 112, the side portions 12 and the rear portion 13 with respect to the whole capacity of the cushion member 1.

Accordingly, since each amount of the injected first raw material 41 and the injected second raw material 42 is an amount of the capacity of expanding of each when they are actually expanded, the first raw material 41 and the second raw material 42 can completely foam within the molding die 6 after the lower die 2 and the upper die 3 are closed. Therefore, there is not an irregularity such as a non-foamed portion or the like in either of the portions in the formed cushion member 1 after forming, and it is possible to form the cushion member 1 having a predetermined density.

As mentioned above, it is preferable that the injection position of the first raw material 41 is set to a position closer to the rear portion than the front portion 11 in the front and rear direction of the front cavity 21. Accordingly, it is possible to easily foam and flow the first raw material 41 forward.

It is preferable that the injection position of the second raw material 42 is set to the center portion in the front and rear direction and the lateral direction of the rear cavity 23. Accordingly, it is possible to fill the rear cavity 23 with the second raw material 42 without deviation, and it is easy to easily foam and flow in the side cavities 22 and the front cavity 21.

The height of the front and rear partition 25 determining the front and rear flow port 27 is determined so that the speed at which the second raw material 42 flows following the first raw material 41 from the front and rear flow port 27 becomes optimum with respect to the speed at which the first raw material 41 foams and flows forward.

It is preferable that the upper die 3 is closed at a moment after the first raw material 41 and the second raw material 42 are injected and before the second raw material 42 foams to the height in contact with the bottom portion forming surface 31 of the upper die 3 when closing the upper die 3. Accordingly, since the second raw material 42 during foaming contacting the bottom portion forming surface 31 of the upper die 3 hardly occurs, whereby the bottom portion forming surface 31 pushes away the second raw material 42 to the side or crushes downward, it is possible to perform foaming evenly.

During forming the cushion member 1, the temperature of the molding die 6 is set to be about 55 to 60° C. Accordingly, it is possible to make the first raw material 41 and the second raw material 42 foam and flow well.

In accordance with the present embodiment, the second raw material 42 is concentrically injected to one portion in the rear cavity 23. On the other hand, the second raw material 42 may be injected to a plurality of portions in the rear cavity 23 or may be injected in a band-like area extending in the lateral direction of the rear cavity 23, that is, the direction of both of the side cavities.

A characteristic evaluation test shown below is applied to the cushion member 1 manufactured in the manner mentioned above.

In this characteristic evaluation test, there are executed a compression load test measuring what repulsion force is applied when compressing the cushion member 1 and a vibration test measuring what degree of vibration is transmitted when applying the vibration to the cushion member 1.

At first, a description will be given of the compression load test.

In this compression load test, it is measured what compression load is generated in the cushion member 1 when pressing a pressing body having substantially the same profile as a human body to the cushion member 1 so as to compress at a predetermined displacement.

When the cushion member 1 formed in accordance with the present embodiment is set to that of the invention, in order to compare the invention with a conventional product, the same measurement is executed by setting the cushion member 1 having the same 25% hardness as that of the invention and having a one-layer structure including one kind of material to (comparative product).

In this case, the 25% hardness is a measure for showing the hardness of the cushion member, and is indicated by a compression load when pressing a disc having a diameter of 20 cm to the cushion member and the cushion member is 25% compressed with respect to the whole thickness.

Figure 12:
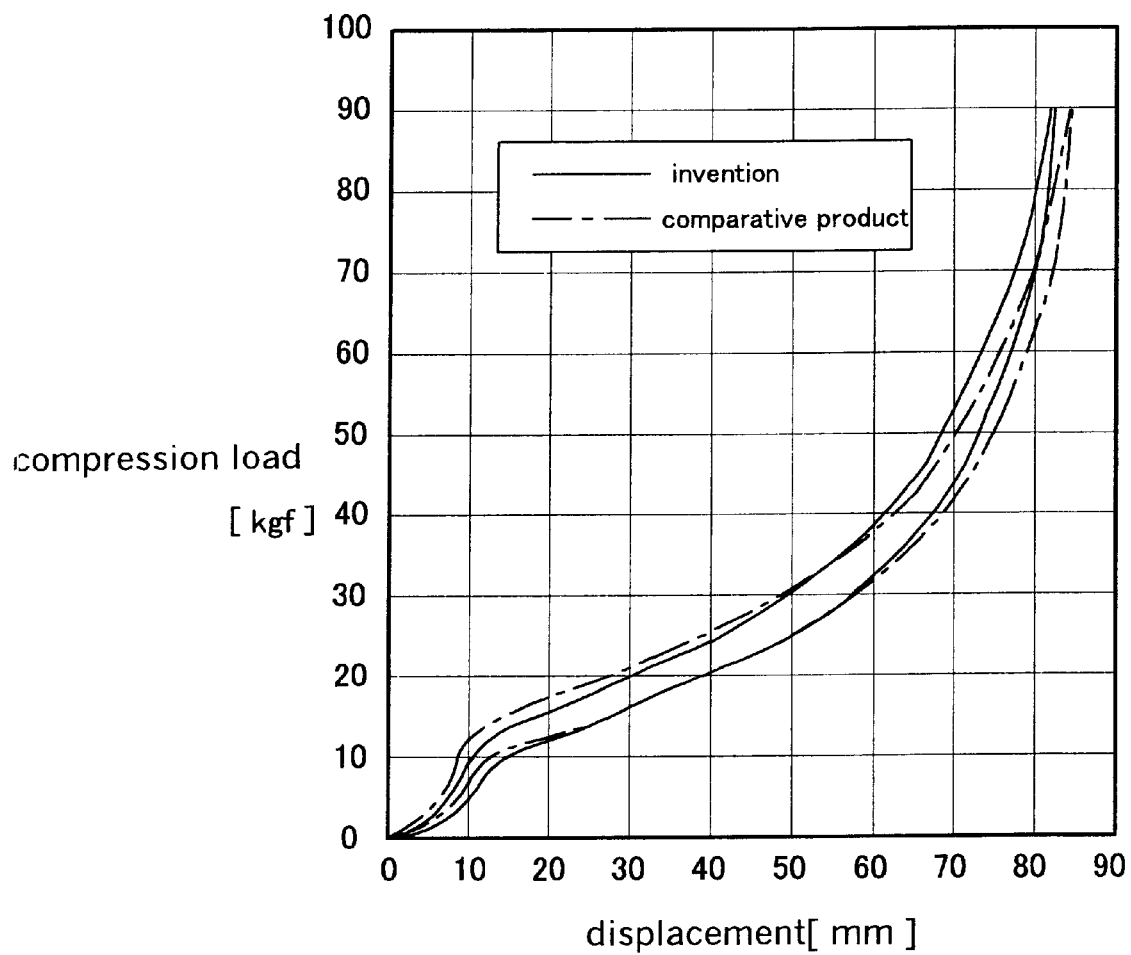
FIG. 12 is a graph showing a displacement-compression load curve, in the embodiment 1.

Results of the compression load test are shown as a displacement-compression load curve in FIG. 12.

In FIG. 12, two lines indicate the invention and the comparative product, respectively, because the test is applied to each of the cushion members 1 having different sizes.

Here, it is understood that when the displacement of the cushion member 1 is small, that is, within the range between 0 and about 50 mm, the compression load against the displacement of the invention is smaller than that of the comparative product, and on the other hand, when the displacement is large, that is, within the range more than about 50 mm, the compression load against the displacement of the invention is larger than that of the comparative product.

That is, since the compression load is small when the displacement is small in the invention, the seat and the hip of the user can be brought into soft contact with each other when the user sits on the seat using the cushion member 1.

Since the compression load is large when the displacement is large, in the invention, for example, even when the large compression load is generated while the motor vehicle travels on a bad road, it is possible to sufficiently absorb the impact with small displacement, and it is possible to reduce the vibration due to the impact.

Next, a description of the vibration test mentioned above will be given.

In this vibration test, a vibration having a frequency distribution is applied to the cushion member 1, and it is measured what degree of the vibration in each of the frequencies is transmitted.

When the cushion member 1 formed in accordance with the present embodiment is set to according to the invention, in order to compare the invention with a conventional product, the same measurement is executed for a structure obtained by forming the cushion member 1 only of the soft material constituting the obverse layer portion 111 (comparative product 1) and a structure obtained by forming the cushion member 1 only of the hard material constituting the reverse layer portion 112, the side portions 12 and the rear portion 13 (comparative product 2).

Figure 13:
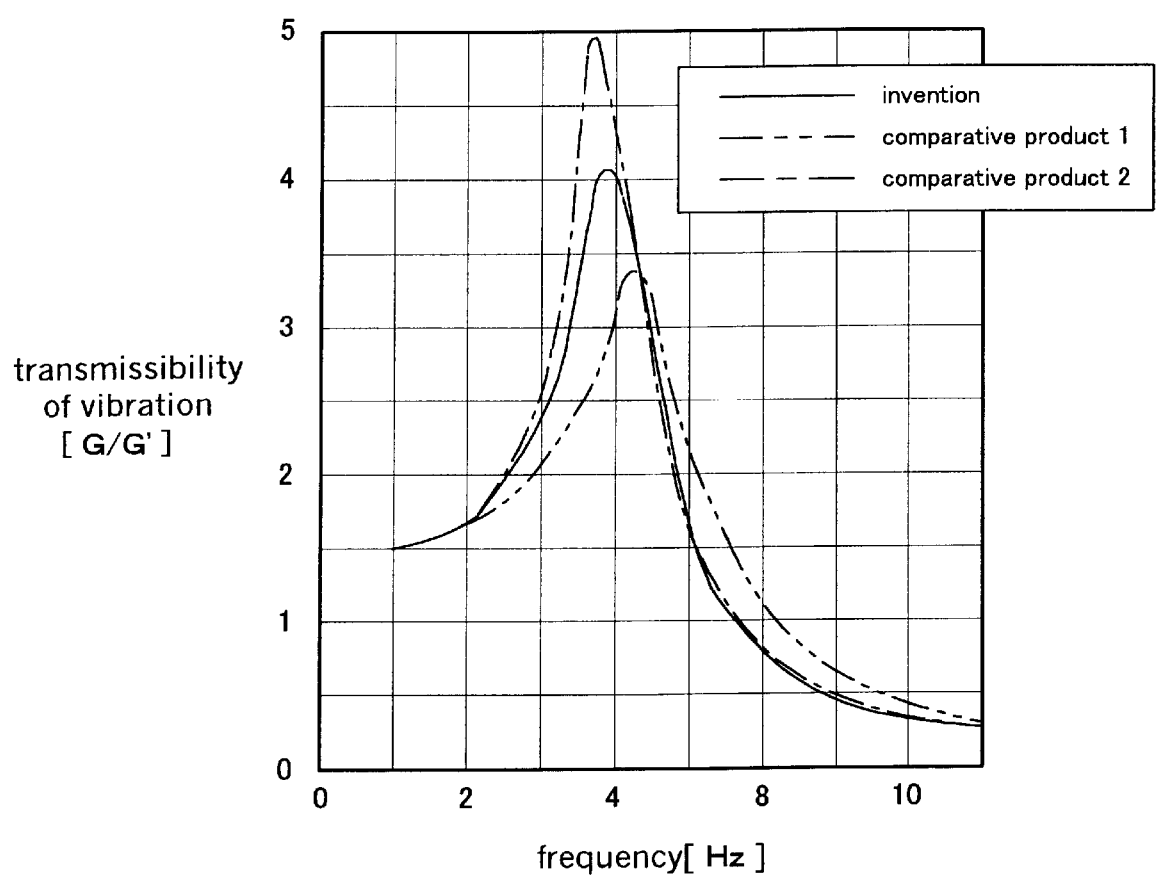
FIG. 13 is a graph showing a frequency-transmissibility of vibration curve, in the embodiment 1.

Results of the vibration test are shown as a frequency-transmissibility of vibration curve in FIG. 13.

As is understood from FIG. 13, in the comparative product 2, the transmissibility of vibration is large at low frequencies in comparison with the comparative product 1, and a peak value becomes greater in comparison with the comparative product 1. Further, the invention has a middle characteristic between the comparative product 1 and the comparative product 2, and has the advantages of the soft material and the hard material, and is excellent in an impact absorbing property at time of sifting on the seat.

Embodiment 2

Figure 14:
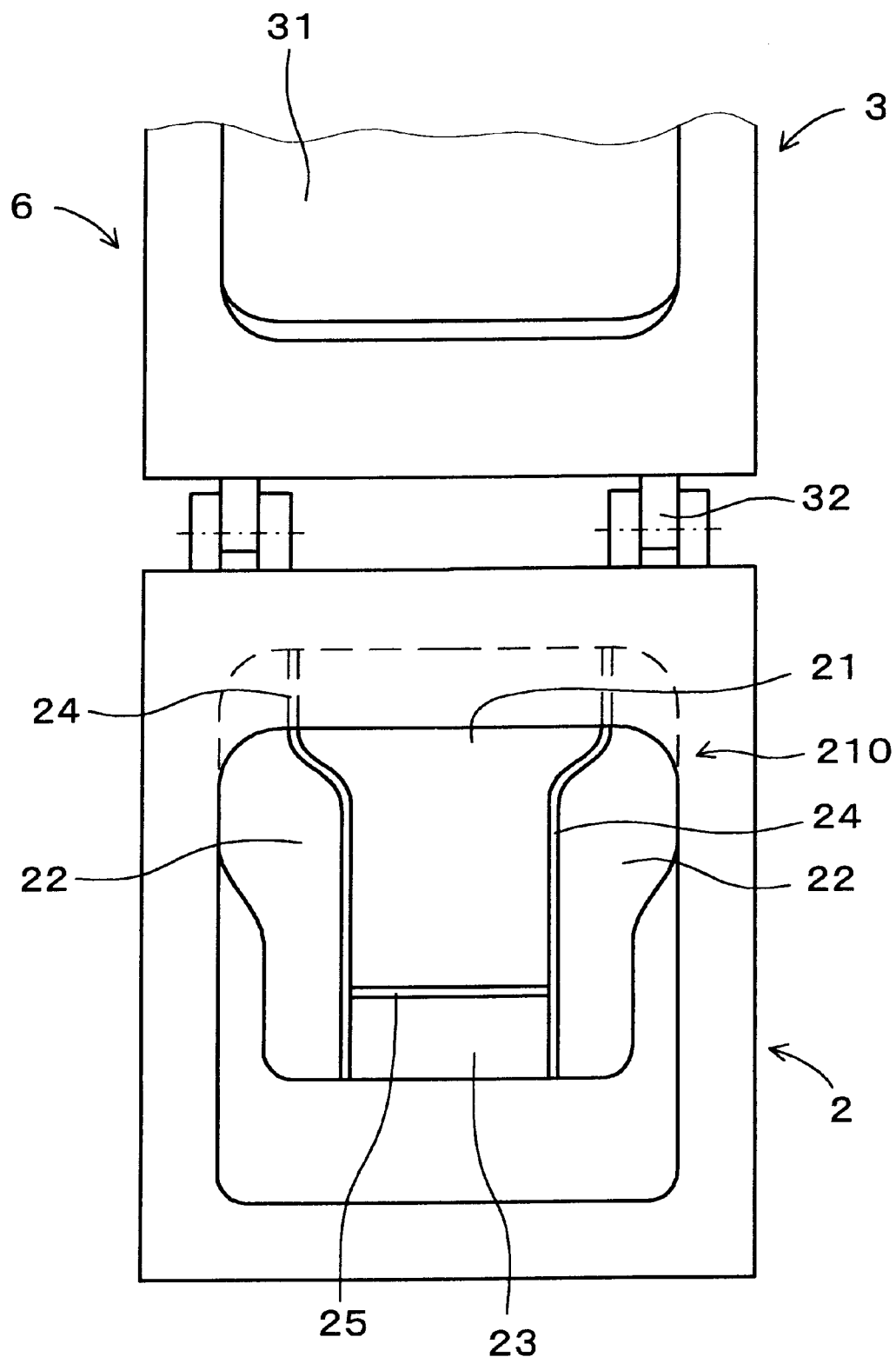
FIG. 14 is a plan view showing a molding die in accordance with an embodiment 2.

In the present embodiment 2, as shown in FIG. 14, the front partition 24 is provided so that the width of the front cavity 21 expands in the lateral direction in a forward portion 210, that is, so as to partly enter into the side cavities 22. Further, as shown in FIGS. 15 and 16, at a time of forming in the cushion member 1, a guide portion 121 having a two-layer structure including the soft material and the hard material is formed in a part of the forward portion in the side portions 12.

Figure 15:
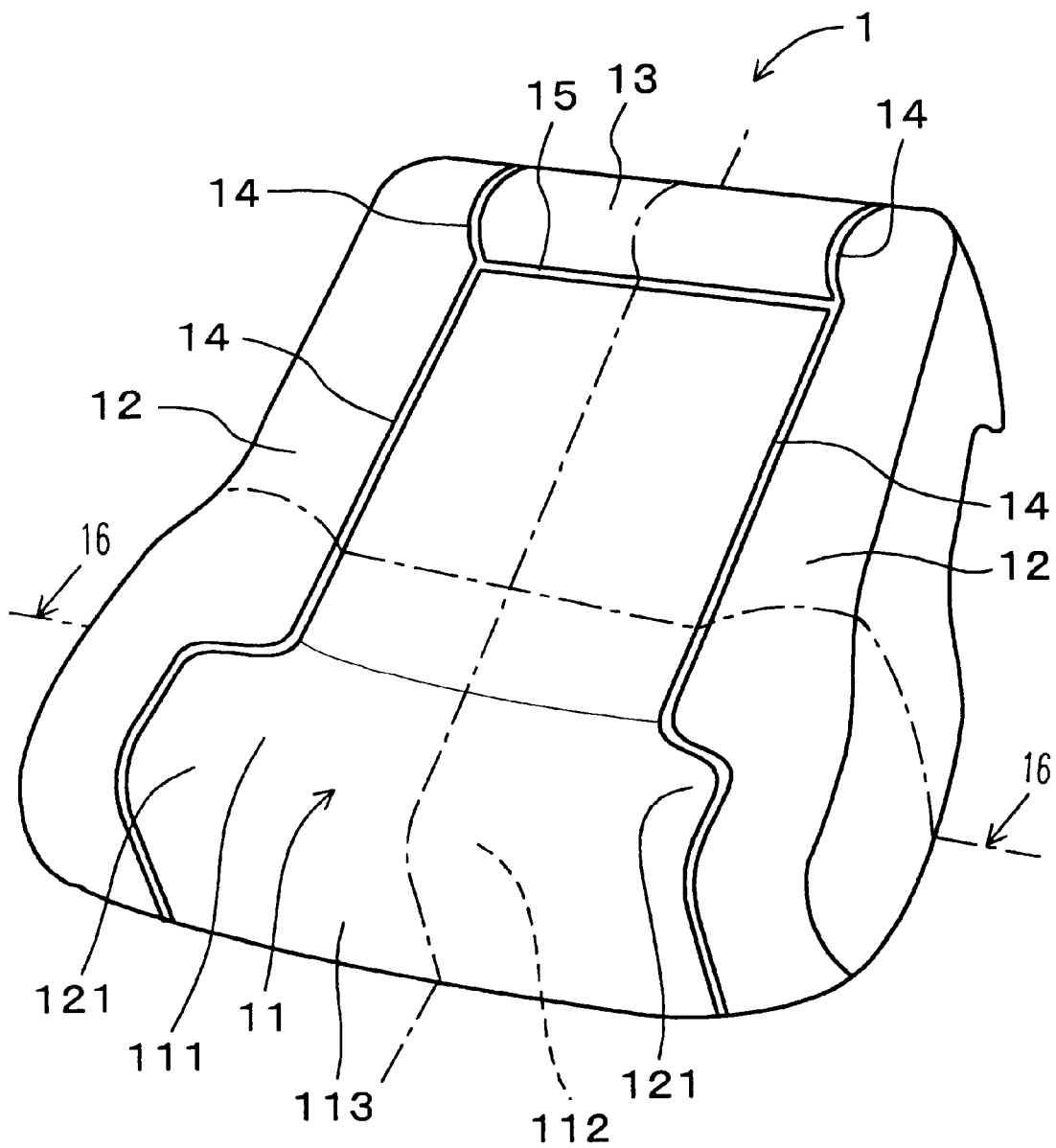
FIG. 15 is a perspective view showing a cushion member, in accordance with the embodiment 2.
Figure 16:
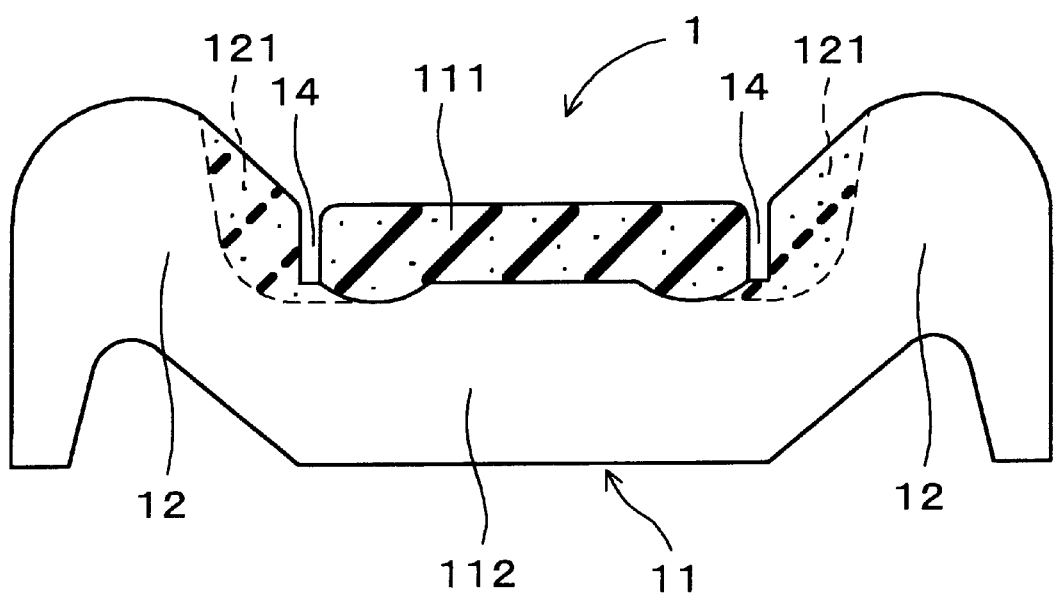
FIG. 16 is a cross sectional view along a line 16—16 in FIG. 15, in the embodiment 2.

In this case, a cross sectional view along a line 16—16 in FIG. 15 is shown in FIG. 16.

The other structures are the same as those of the embodiment 1.

In the present embodiment, when the cushion member 1 is used as the seat, the obverse layer portion 111 made of the first raw material 41 can surround the whole of the thigh of the user. Accordingly, it is possible to further improve an operability of the pedal or the like by the driver corresponding to the user.

Further, since the user is gently supported by the contact portions of the side portions even when the thigh of the user moves in the width direction, it is possible to reduce the fatigue in the case that the user sits on the seat for a long time.

In addition, the same operations and effects as those of the embodiment 1 mentioned above can be obtained.

Embodiment 3

A description will be given of a manufacturing method of a cushion member in accordance with another embodiment of the present invention with reference to FIGS. 17 to 30. In this case, reference numerals used in the description of embodiments 3 to 6 have no relation to the reference numerals used in the description of the embodiments 1 and 2.

In the manufacturing method of the cushion member 1 in accordance with the present embodiment, a foaming process is executed by using the lower die 2 and the upper die 3. At a time of executing the foaming process, at first a flexible film 7 is arranged in a cavity 20 in the lower die 2 so that an opening portion 72 to which a first raw material 41 having an expandable property flows is formed between an end portion 71 of the flexible film 7 and the cavity 20.

Next, the first raw material 41 is flowed from the opening portion 72, and on the other hand, the second raw material 42 having an expandable property and forming a foamed product having a different physical property from that of a foamed product made of the first raw material 41 at a time when the foaming process is completed is injected from the portion other than the opening portion 72.

Then, the lower die 2 and the upper die 3 are closed, and the first raw material 41 and the second raw material 42 are integrally foamed by setting the flexible film 7 to be a boundary layer.

In the manner mentioned above, there is formed the cushion member 1 having the two-layer structure including the first foamed product made of the first raw material 41 and the second foamed product made of the second raw material 42 and having the flexible film 7 interposed between the both.

Here, in the present embodiment, a front and rear direction means a direction by setting a side of a front portion 11 or a side of a front cavity 21 in the cushion member 1 to be a forward portion, and a side of a rear portion 13 or a side of a rear cavity 23 in the cushion member 1 to be a rearward portion. Further, a lateral direction means a direction transversely crossing the front and rear direction by setting sides of both side portions 12 or sides of side cavities 22 in the cushion member 1 to be right and left sides. Further, a vertical direction means a direction of gravity at a time of manufacturing the cushion member 1 to a lower portion and an opposite direction to an upper portion.

A detailed description will be given below.

At first, a description of the cushion member 1 manufactured in accordance with the manufacturing method of the present embodiment will be given.

Figure 17:
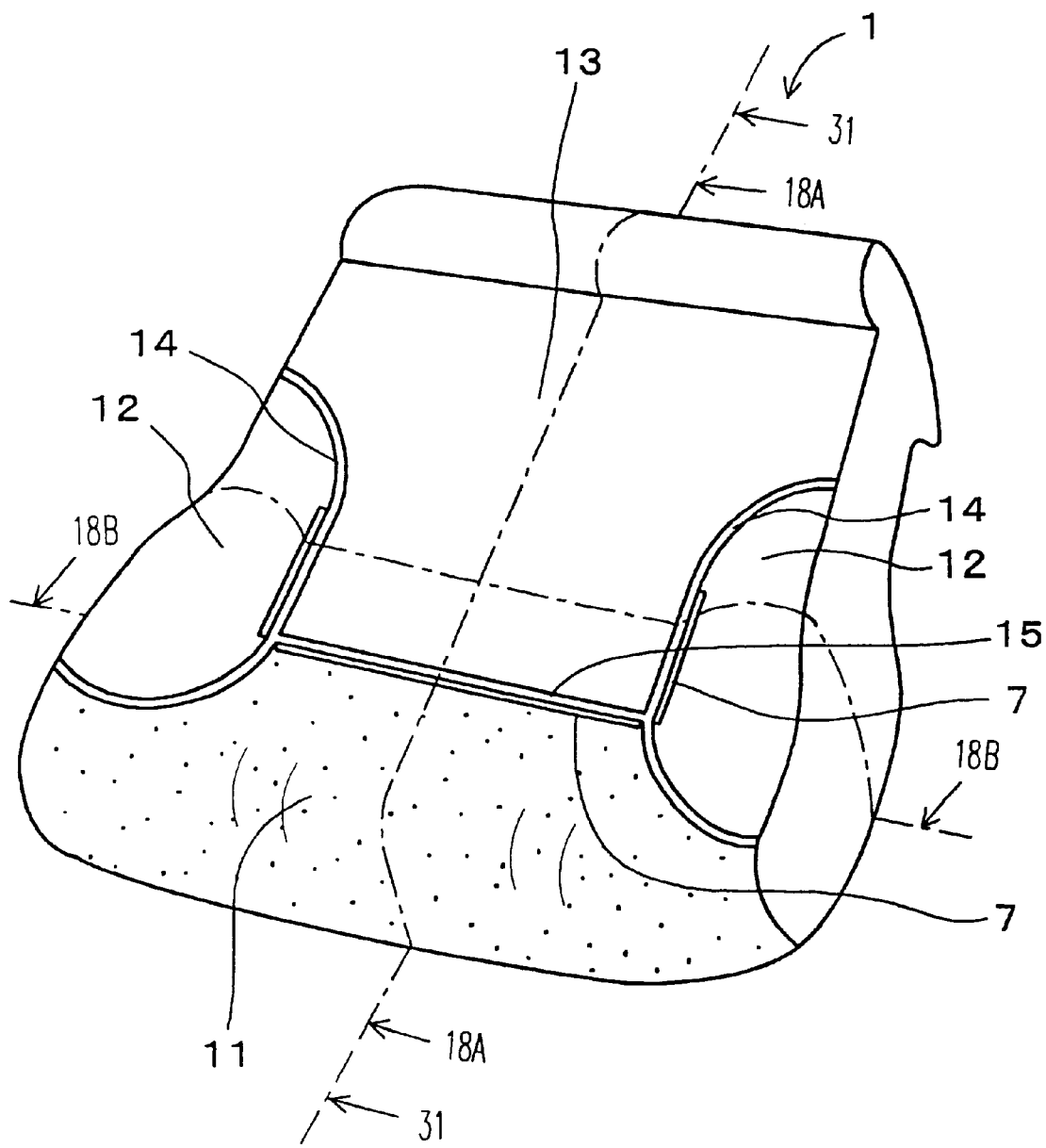
FIG. 17 is a perspective view showing a cushion member, in accordance with an embodiment 3.

As shown in FIG. 17, the cushion member 1 manufactured in accordance with the present embodiment has the side portions 12 arranged in both right and left sides in the cushion member 1, the front portion 11 positioned in a forward side in the cushion member 1 and the rear portion 13 positioned in a rear side thereof.

Side slits 14 of groove-like slits are formed between the front portion 11 and the side portions 12 in both right and left sides in the cushion member 1. Further, a front and rear slit 15 of a groove-like slit is formed between the front portion 11 and the rear portion 13 in the cushion member 1.

Figure 18A:
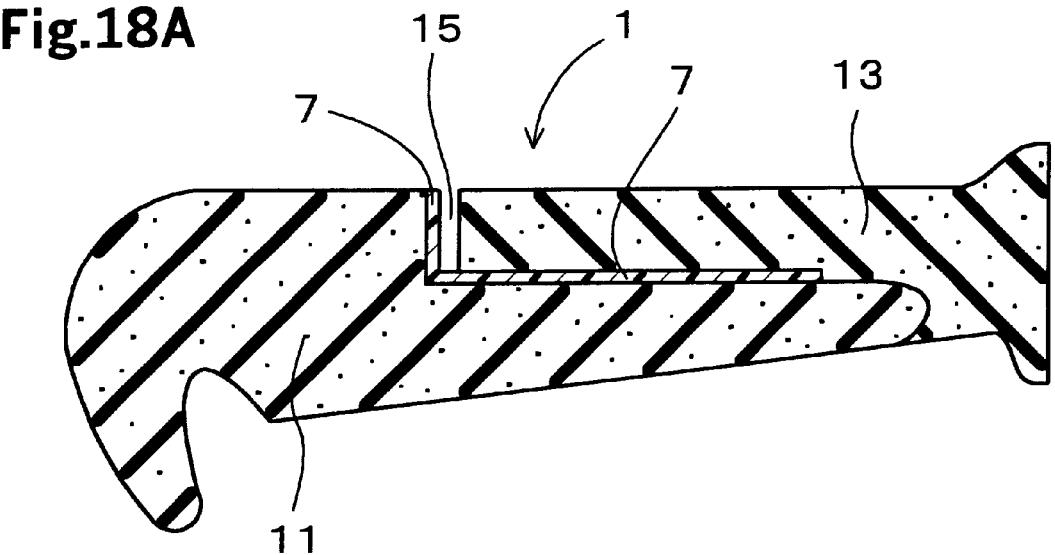
FIG. 18A is a cross sectional view along a line 18A—18A in FIG. 17, in accordance with the embodiment 3.
Figure 18B:
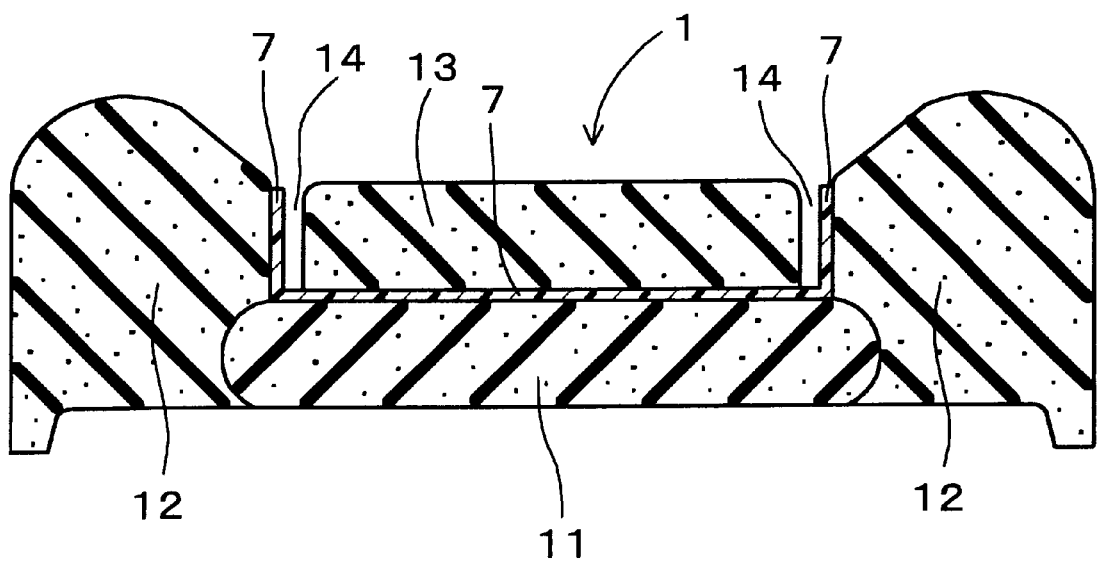
FIG. 18B is a cross sectional view along a line 18B—18B in FIG. 17, in accordance with the embodiment 3.

As shown in FIGS. 18A and 18B, the side portions 12 and the rear portion 13 corresponding to a first foamed product made of the first raw material 41, and the front portion 11 corresponding to a second foamed product made of the second raw material are chemically bonded so as to be integrally formed. Further, the first foamed product and the second foamed product, and the flexible film 7 have a good adhesion property, and are integrally bonded.

The cushion member 1 is covered with a cover such as a cloth or the like on the surface thereof, and constitutes a seat portion of a seat in a motor vehicle.

Since a periphery of the front portion 11 is separated from the side portions 12 and the rear portion 13 made of the first foamed product by the side slits 14 and the front and rear slit 15, the front portion 11 is not pulled by the side portions 12 and the rear portion 13 when the front portion 11 is compression deformed and can sufficiently achieve an advantage of the second foamed product.

In a center portion in the front and rear direction of the cushion member 1, the second foamed product going around from the front portion 11 and the first foamed product are vertically overlapped with each other, whereby characteristics such as a hardness, a ride quality and the like can be balanced by the first foamed product and the second foamed product.

Next, a description of the first raw material 41 and the second raw material 42 corresponding to the molding material used in the cushion member 1 will be given.

Both of the first raw material 41 and the second raw material 42 are mixed raw materials of the polyol group raw material and the isocyanate group raw material. Further, the polyol group raw material mainly contains a polypropylene glycol (PPG) and a polymer graft polymerized polyol (POP).

In the cushion member 1 having the two-layer structure, the first foamed product and the second foamed product having different physical properties are formed by using the first raw material 41 and the second raw material 42 having different components, respectively.

A hardness of the foamed product which is one of the physical properties can be changed by changing a mixing ratio of the PPG and the POP in the polyol group raw material. That is, it is possible to form the foamed product having a high hardness by increasing the mixing ratio of the POP to the PPG.

Further, it is possible to obtain a foamed product having a high hardness by increasing the mixing ratio of the isocyanate group raw material to the polyol group raw material. This can be easily put into practice by changing rotational numbers of metering pumps 551 and 552 in a manufacturing apparatus 5 mentioned below.

It is also possible to obtain a foamed product having a different physical property by using a polyol group raw material having a small molecular weight. When using the polyol group raw material having a small molecular weight, it is possible to reduce an impact resilience of the obtained foamed product.

The hardness of the first foamed product made of the first raw material 41 according to the present embodiment is made higher than that of the second foamed product made of the second raw material 42 by increasing the mixing ratio of the POP to the PPG in the polyol group raw material, increasing the mixing ratio of the isocyanate group raw material to the polyol group raw material and the like.

Next, a description of the flexible film 7 will be given.

The flexible film 7 is a polyurethane film having a thickness of 5 to 100 $\mu$m. In the case that the thickness is smaller than 5 $\mu$m, since the strength of the flexible film 7 is reduced due to an excessive thinness, the flexible film 7 cannot stand against the pressure generated by the foaming and flowing of the first raw material 41 and the second raw material 42 at a time of foaming, so that there is a risk that the flexible film 7 is broken. Further, when the thickness is more than 100 $\mu$m, a rigidity of the flexible film 7 becomes too high due to an excessive thickness, so that it is difficult to arrange the flexible film 7 in the lower die 2 and there is a risk that the characteristics of the cushion member 1 after being formed is affected.

In this case, taking the view mentioned above into consideration, it is further preferable that the thickness of the flexible film 7 is set to be 20 to 50 $\mu$m.

Next, a description of a molding die 6 constituted by the lower die 2 and the upper die 3 will be given.

As shown in FIGS. 20, 21A, 21B and 21C, side cavities 22 for forming the right and left side portions 12, a front cavity 21 for forming the front portion 11 and a rear cavity 23 for forming the rear portion 13 are formed in the lower die 2.

In the lower die 2, a front and rear partition plate 25 is arranged between the front cavity 21 and the rear cavity 23, and side partition plates 24 are arranged between the side a cavity 22 and the front cavity 21, and the side cavity 22 and the rear cavity 23, respectively.

In the lower die 2, the cavity 20 is formed by setting the obverse side of the cushion member 1 downward. The cavity 20 has an inner wall surface 200 constituted by a bottom wall surface 203 corresponding to a front surface forming surface forming the obverse side, and a side wall surface 204 forming the front side, the rear side and the side surface sides of the cushion member 1.

The bottom wall surface 203 is formed so as to be inclined at about 10 degrees in the front and rear direction by setting the forward portion downward.

Further, the opening portion 72 formed by the flexible film 7 is open in a direction substantially parallel to the bottom wall surface 203.

Figure 19:
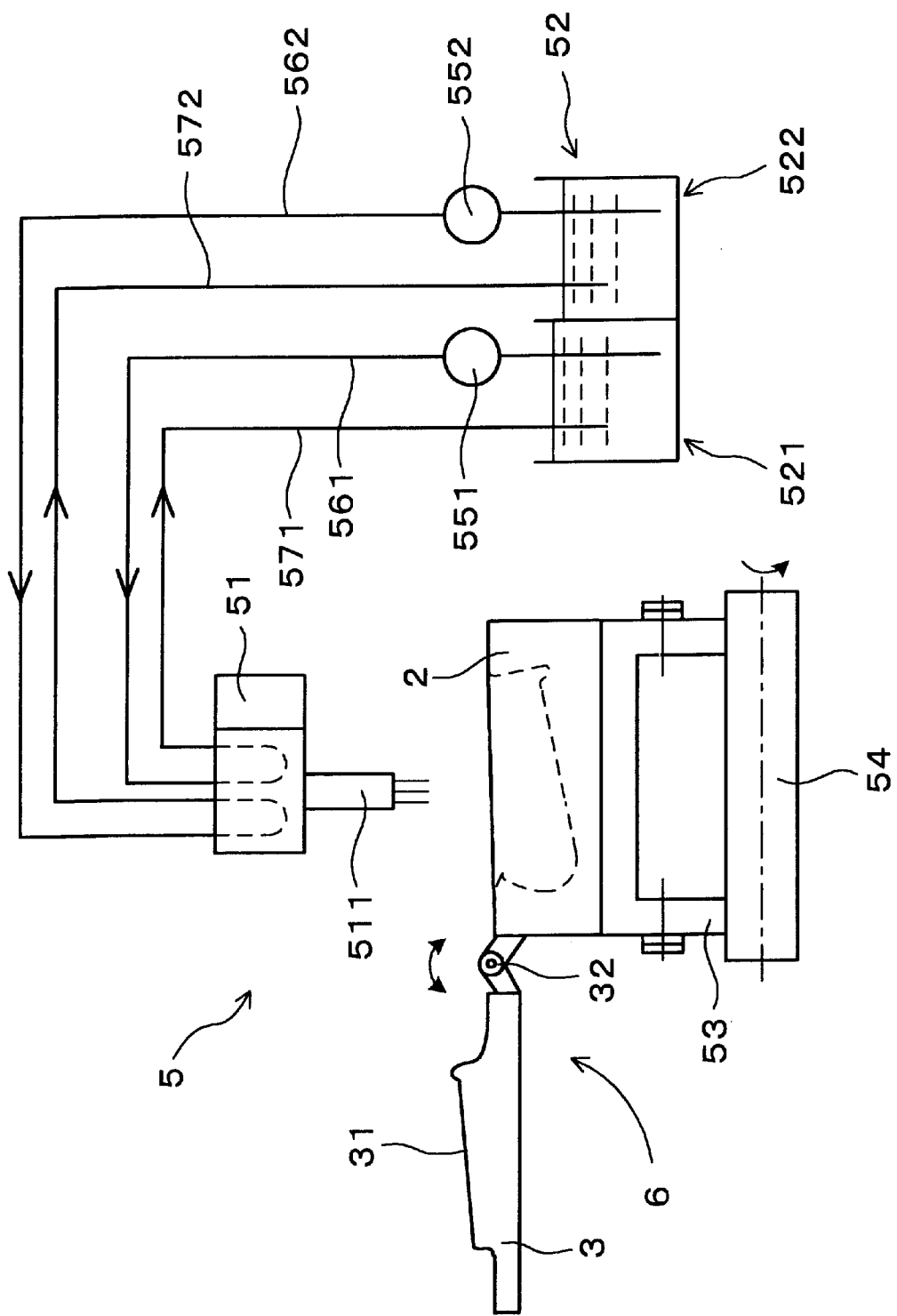
FIG. 19 is a schematic view showing a manufacturing apparatus in accordance with the embodiment 3.
Figure 20:
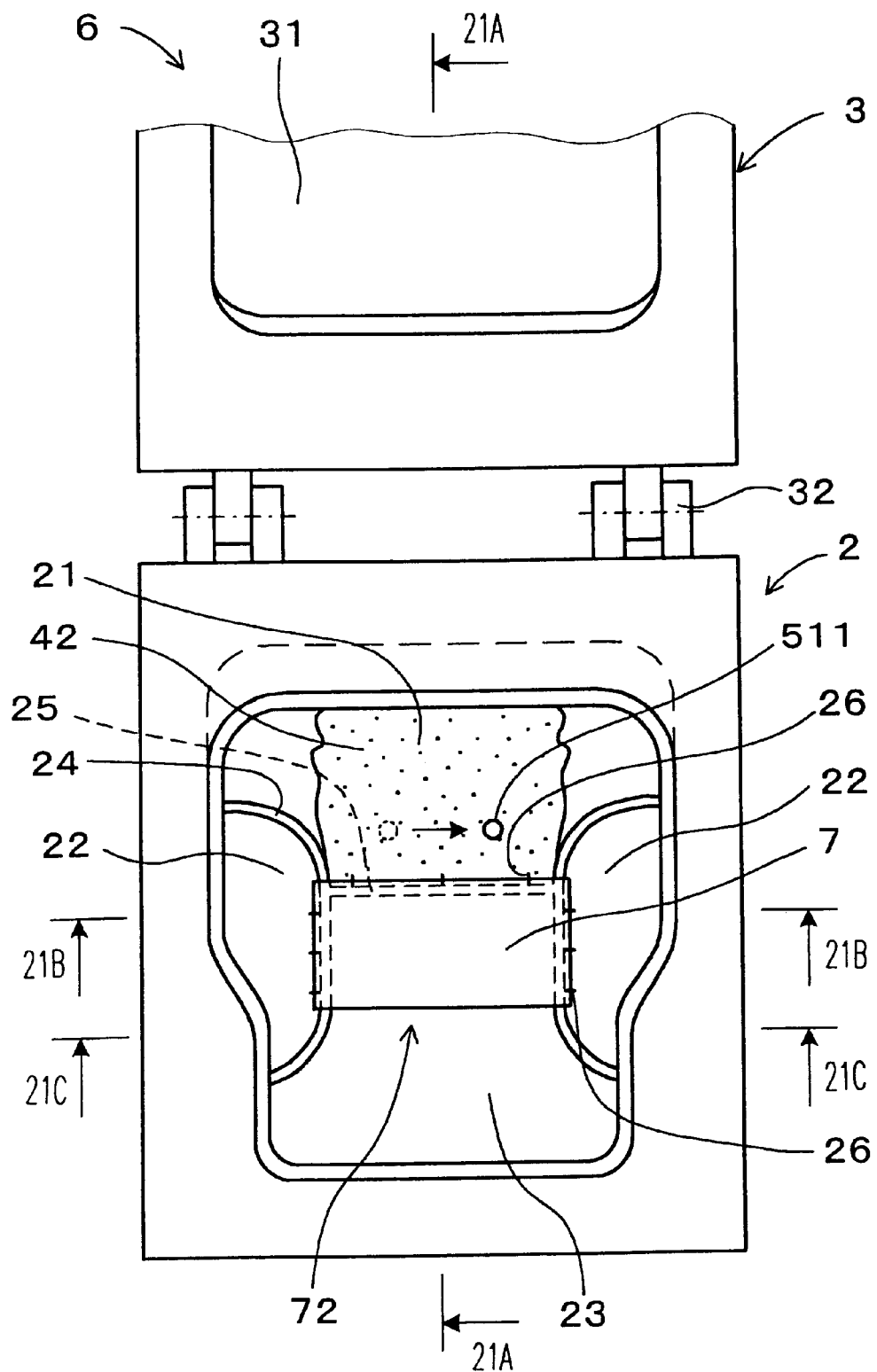
FIG. 20 is a plan view showing a molding die in a state of injecting a second raw material, in accordance with the embodiment 3.

On the other hand, as shown in FIG. 19, the upper die 3 has a back surface forming surface 31 for forming the reverse side of the cushion member 1. Further, the upper die 3 is rotatably connected to the lower die 2 by a hinge portion 32 so as to be freely opened and closed.

A partition plate 201 provided so as to partition a part of the cavity 20 is arranged in the lower die 2. The partition plate 201 includes a front and rear partition plate 25 for partitioning the cavity 20 into front and rear portions, and a pair of side partition plates 24 for partitioning the cavity 20 into the right and left side cavities 22, the front cavity 21 and the rear cavity 23 disposed therebetween.

The front and rear slit 15 is formed in the front and rear partition plate 25, and the side partition plates 24 form the side slits 14.

Figure 28A:
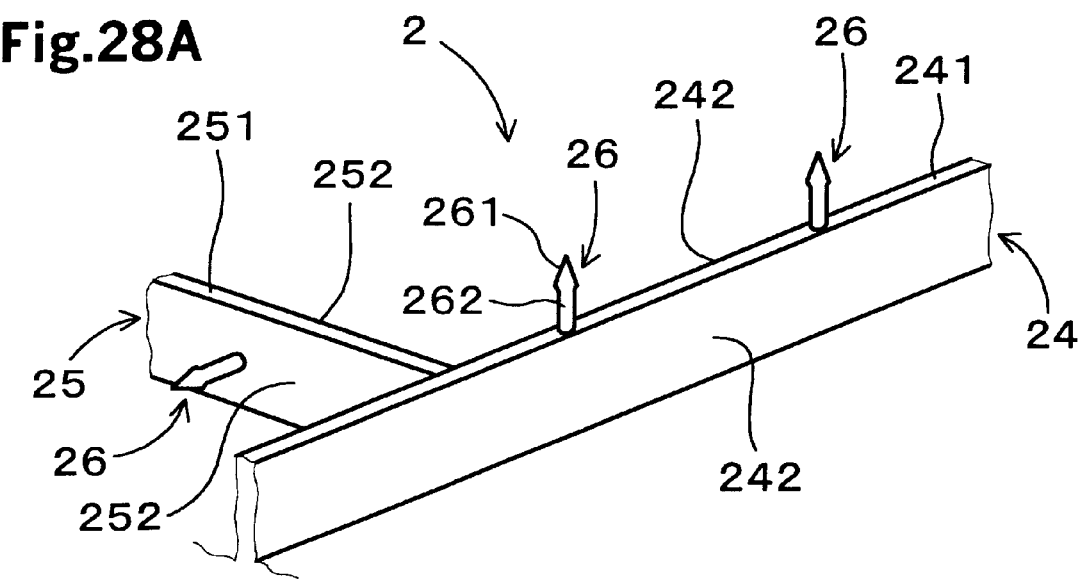
FIG. 28A is a perspective view showing a state that a fixing device is provided in a partition plate, in accordance with the embodiment 3.

As shown in FIG. 28A, a fixing device 26 having a sharp front end for fixing the flexible film 7 to the lower die 2 is provided in the front and rear partition plate 25 and the side partition plates 24.

The fixing device 26 is structured such that a general portion 262 becomes slightly narrower than an inclined portion 261 having a sharp front end, and the flexible film 7 does not come off from the fixing device 26 when the flexible film 7 is stuck into the fixing device 26 so as to be arranged in the lower die 2.

The fixing device 26 may be provided in any of upper ends 241 and 251 or side surfaces 242 and 252 in the side partition plates 24 and the front and rear partition plate 25.

Next, a description of a whole of the apparatus for manufacturing the cushion member 1 will be given.

As shown in FIG. 19, the cushion member 1 is manufactured by the manufacturing apparatus 5. The manufacturing apparatus 5 has the molding die 6 constituted by the lower die 2 and the upper die 3, an injection head 51, a raw material tank 52 and metering pumps 551 and 552. Further, the molding die 6 is mounted on a truck 53 mounted on a conveyor 54.

A liquid-state polyol group raw material constituting the first raw material 41 and the second raw material 42 is held in a holding chamber 521 in the raw material tank 52 and is fed to the injection head 51 by the metering pump 551. The polyol group raw material can circulate between the injection head 51 and the holding chamber 521 by the metering pump 551. Further, the polyol group raw material is conveyed to the injection head 51 from the holding chamber 521 through a supply pipe 561, and can be recovered to the holding chamber 521 through a recovery pipe 571 from the injection head 51 when the material is not injected to the lower die 2 from the injection head 51.

On the other hand, a liquid-state isocyanate group raw material constituting the first raw material 41 and the second raw material 42 is held in a holding chamber 522 in the raw material tank 52 and is fed to the injection head 51 by the metering pump 552. The isocyanate group raw material can also circulate between the injection head 51 and the holding chamber 522 by the metering pump 552. Further, the isocyanate group raw material is conveyed to the injection head 51 from the holding chamber 522 through a supply pipe 562, and can be recovered to the holding chamber 522 through a recovery pipe 572 from the injection head 51 when the material is not injected to the lower die 2 from the injection head 51.

The structure is made such that the polyol group raw material and the isocyanate group raw material fed from the raw material tank 52 can be mixed within the injection head 51. An injection nozzle 511 is provided in the injection head 51, and the injection nozzle 511 can be opened and closed by a control valve such as a hydraulic cylinder (not shown in FIG. 19) or the like. The structure is made such that the first raw material 41 and the second raw material 42 can be injected by opening the injection nozzle 511 for a predetermined time.

The injection head 51 can move so as to inject the first raw material 41 and the second raw material 42 to the front cavity 21 and the rear cavity 23 in the lower die 2.

The metering pumps 551 and 552 which are measuring pumps and can respectively change a circulating amount of the polyol group raw material and the isocyanate group raw material due to a change of a rotational number so as to increase and reduce a supply amount to the injection head 51.

That is, the structure is made such that the weight mixture ratio of the polyol group raw material and the isocyanate group raw material can be changed by changing the rotational numbers of the respective metering pumps 551 and 552. Further, the first raw material 41 and the second raw material 42 can be made by mixing the raw materials at a predetermined weight mixture ratio.

In this case, the number of the injection head 51, the raw material tank 52, the metering pumps 551 and 552 and the like in the manufacturing apparatus 5 may be plural in correspondence to the difference of the used forming material.

The molding die 6 is mounted on the truck 53, and is conveyed in a state of being mounted on the truck 53 when being conveyed by the conveyor 54.

A plurality of molding dies 6 mounted on the truck 53 can be mounted on the conveyor 54, and the structure is made such that the molding die 6 to which the first raw material 41 and the second raw material 42 are injected by the injection head 51 can be sequentially fed. As mentioned above, by arranging a plurality of molding dies 6 on the conveyor 54, it is possible to efficiently form a plurality of cushion members 1.

The upper die 3 is open when the first raw material 41 and the second raw material 42 are supplied to the lower die 2 from the injection head 51.

Next, a description of a manufacturing method of the cushion member 1 will be given.

Figure 21A:
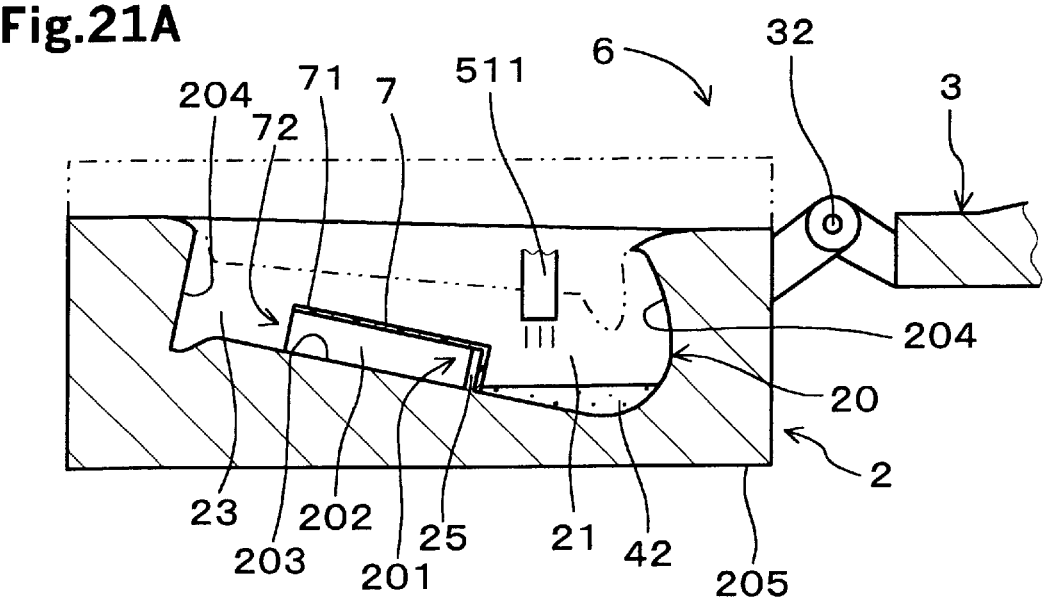
Figure 21B:
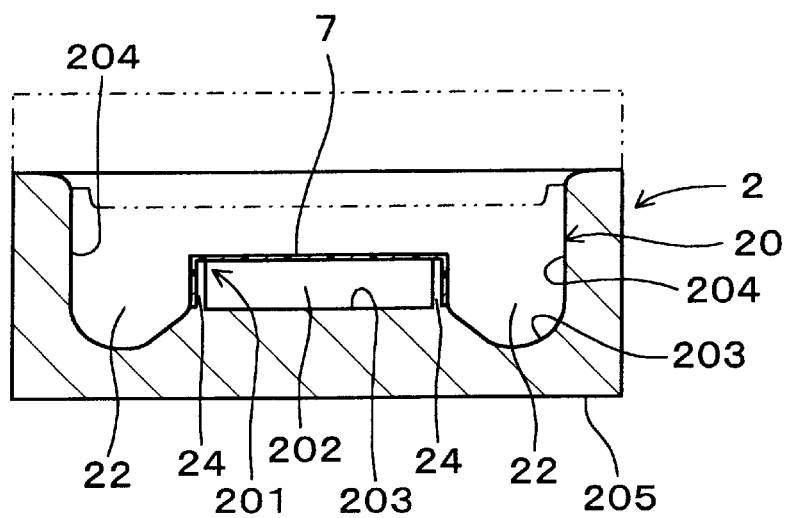
Figure 21C:
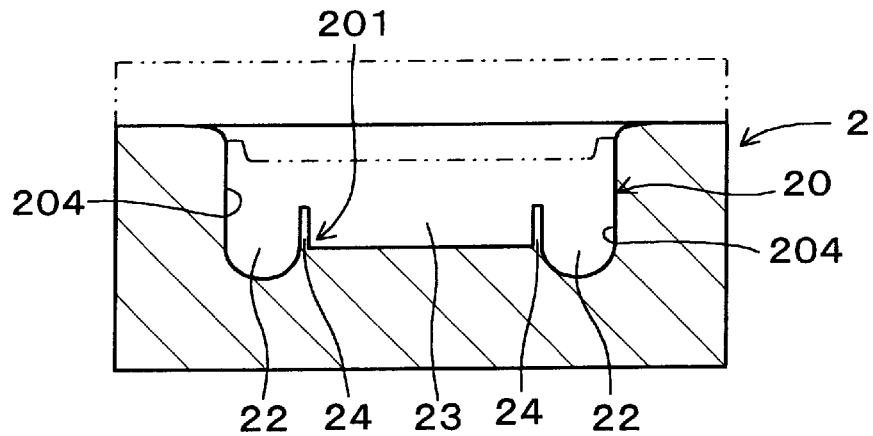
Figure 22:
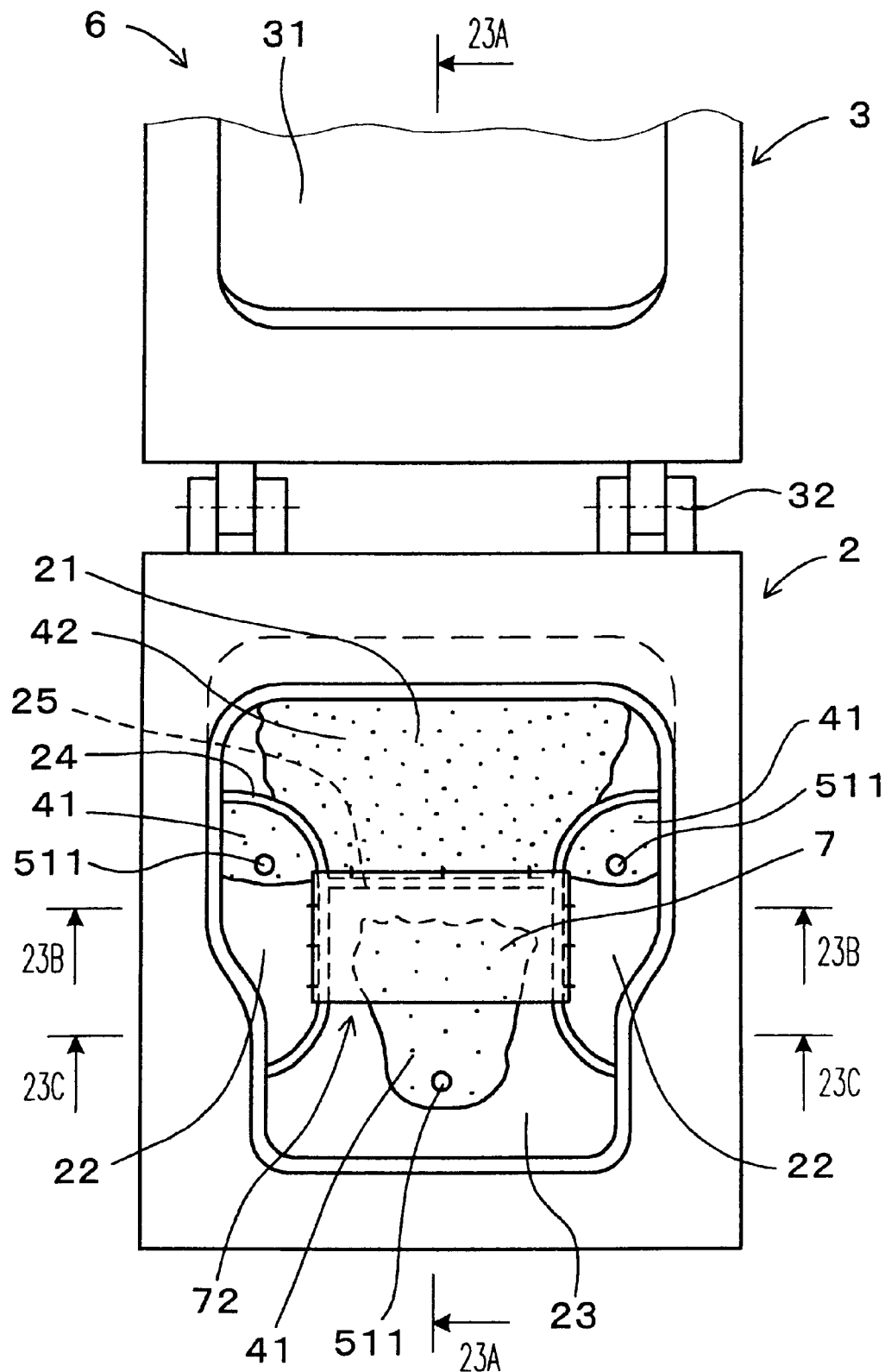
FIG. 22 is a plan view showing a molding die in a state of injecting the first raw material, in accordance with the embodiment 3.
Figure 23A:
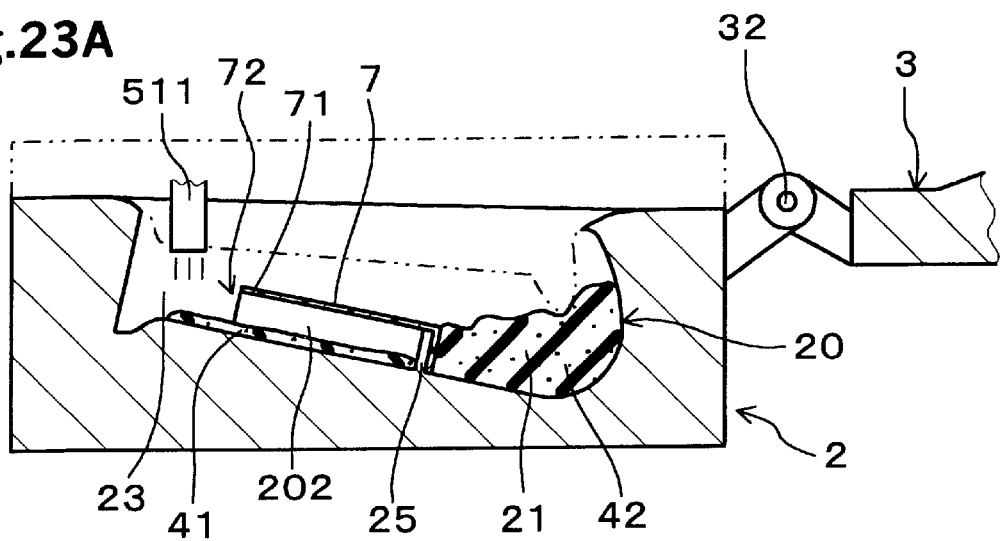
Figure 23B:
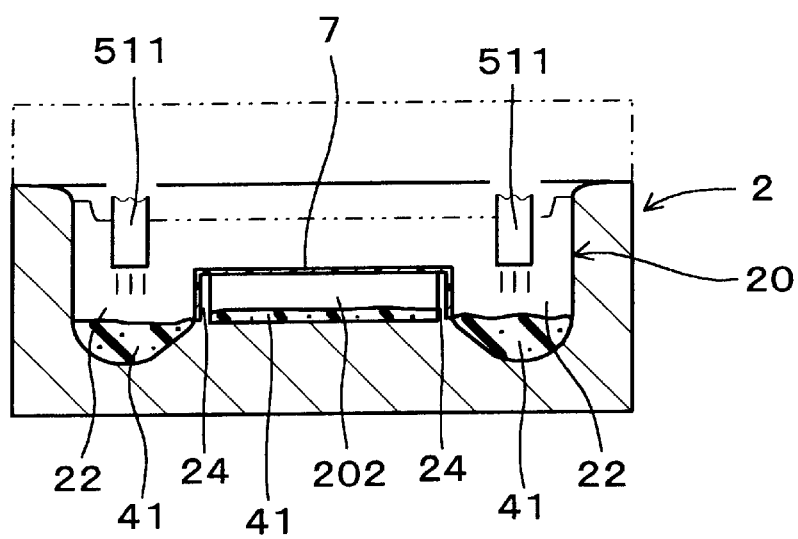
Figure 23C:
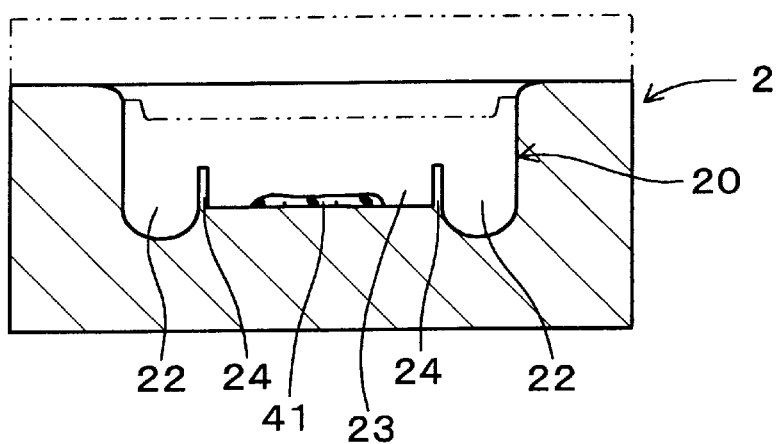
Figure 24:
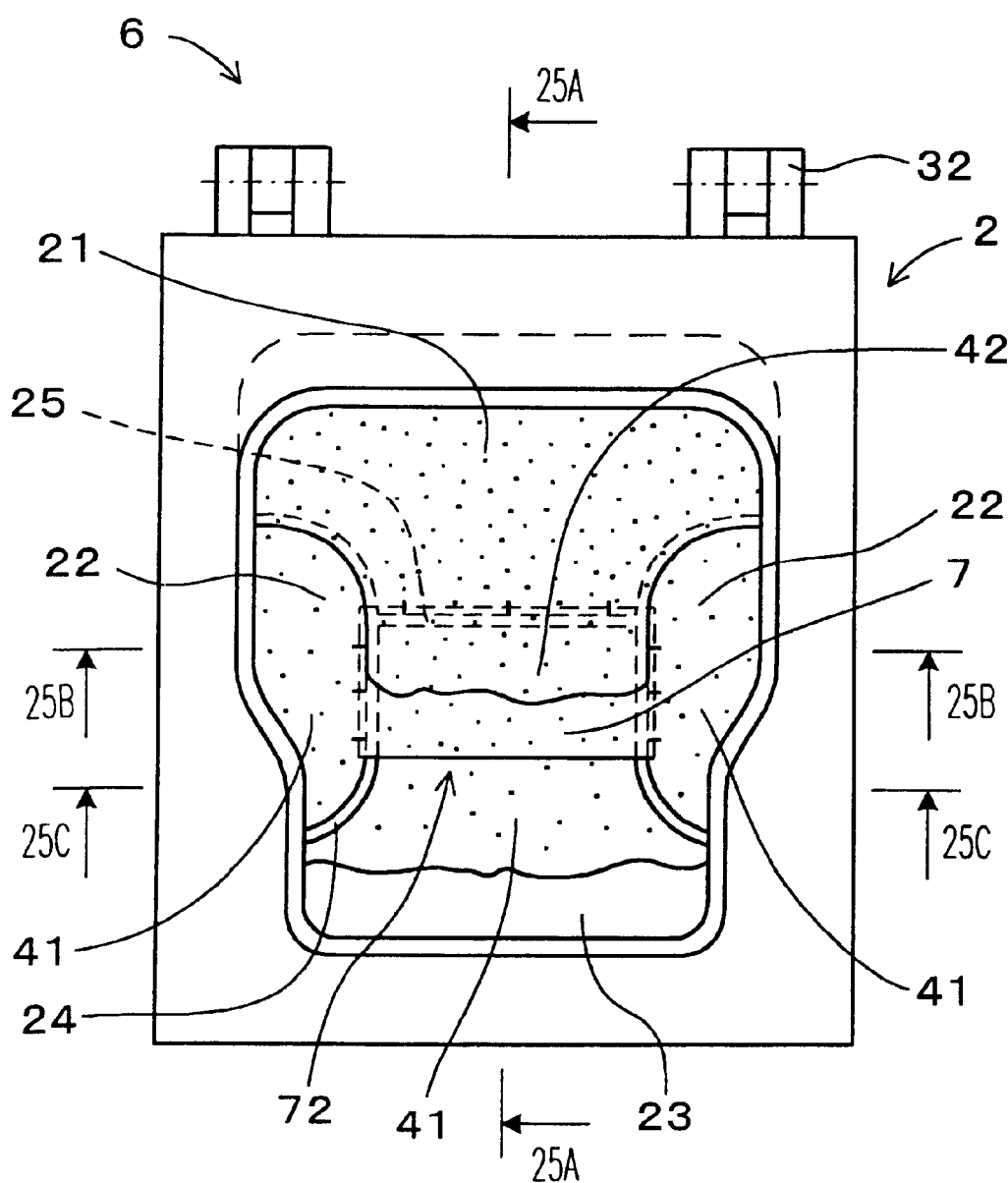
FIG. 24 is a plan view showing a molding die in a state of closing a lower die and an upper die, in accordance with the embodiment 3.
Figure 25A:
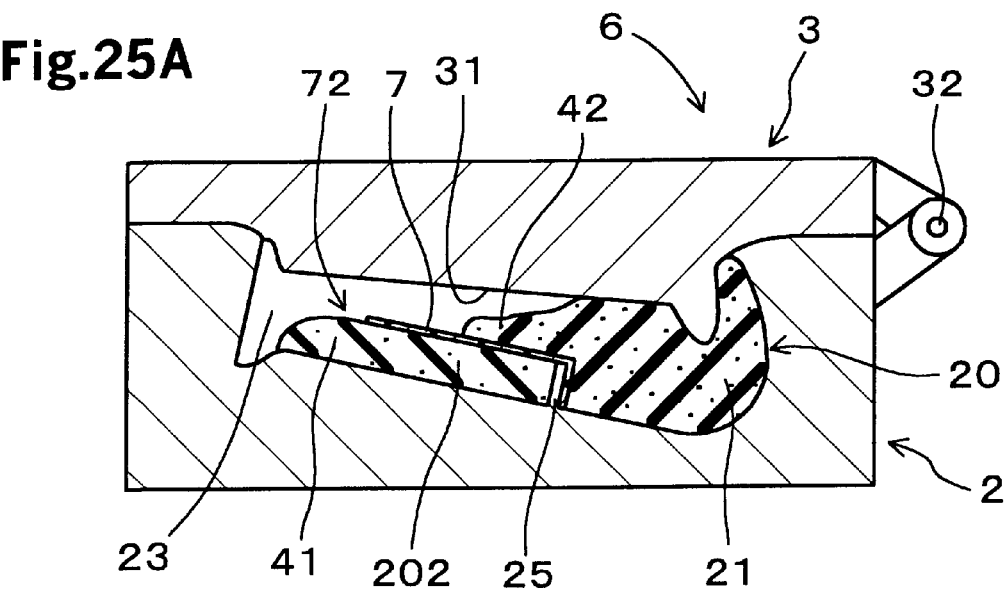
Figure 25B:
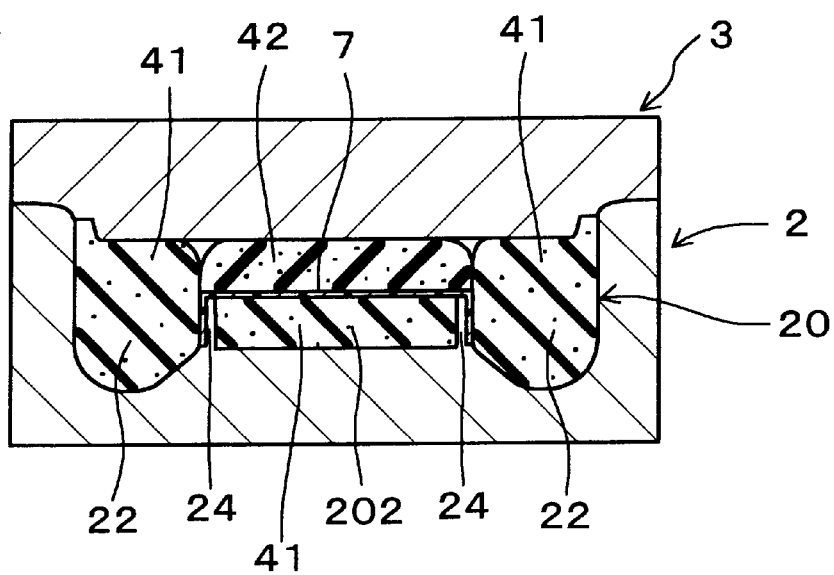
Figure 25C:
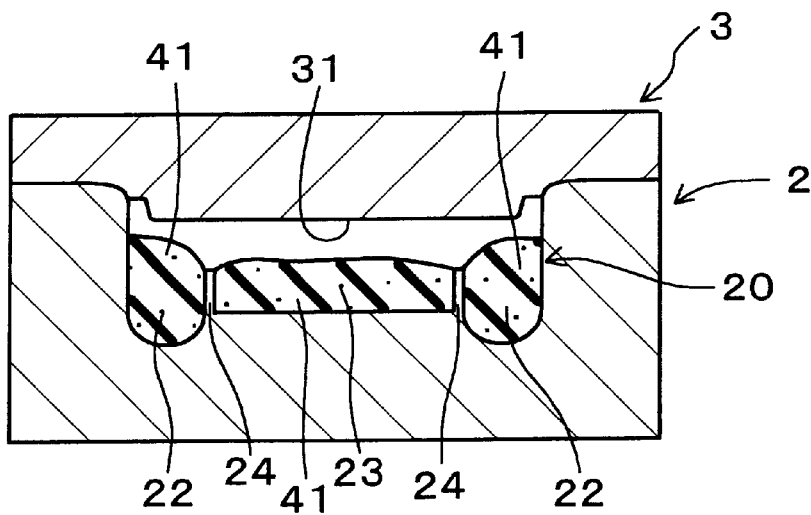
Figure 26:
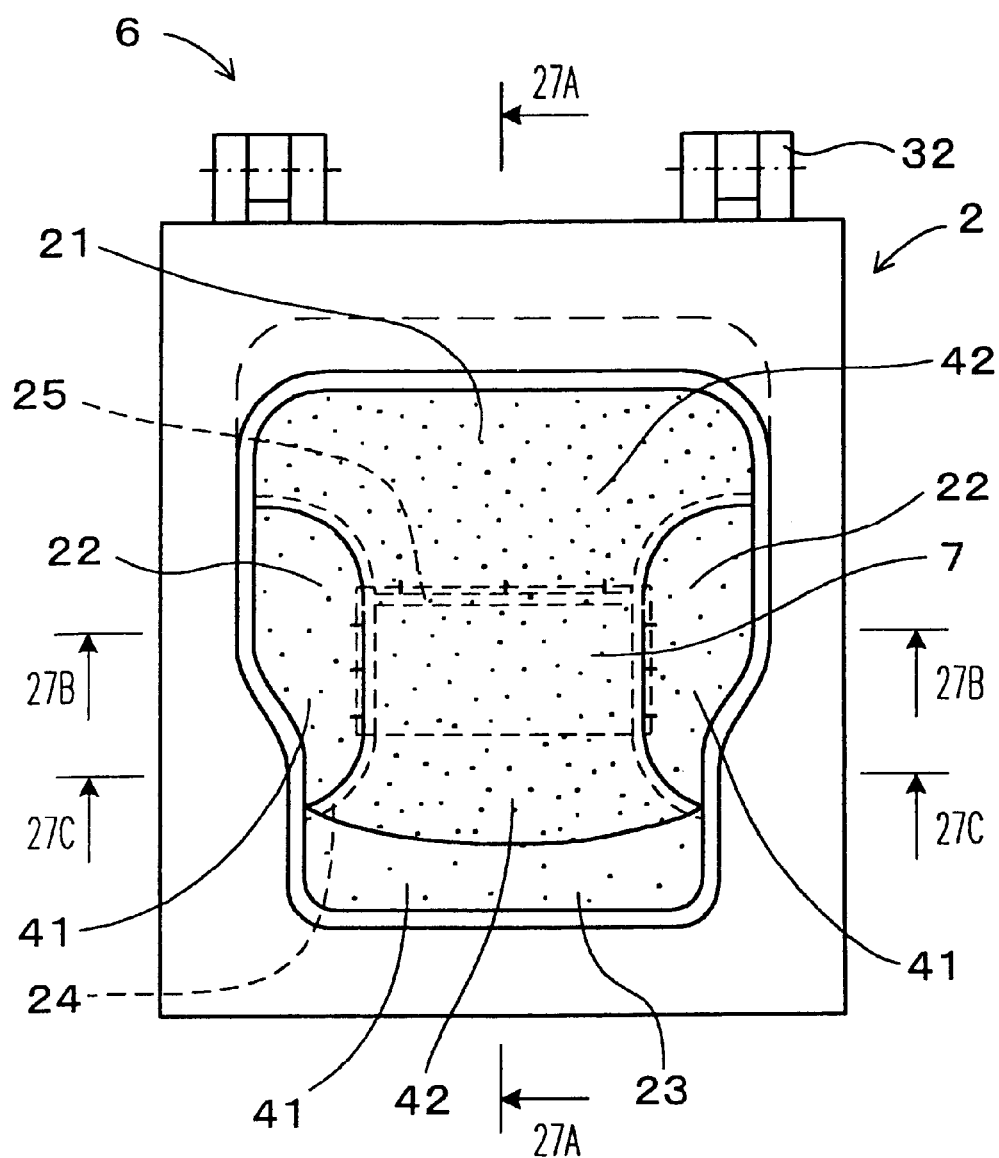
FIG. 26 is a plan view showing a molding die in a state that an expansion molding is almost executed after closing the upper die and the lower die, in accordance with the embodiment 3.
Figure 27A:
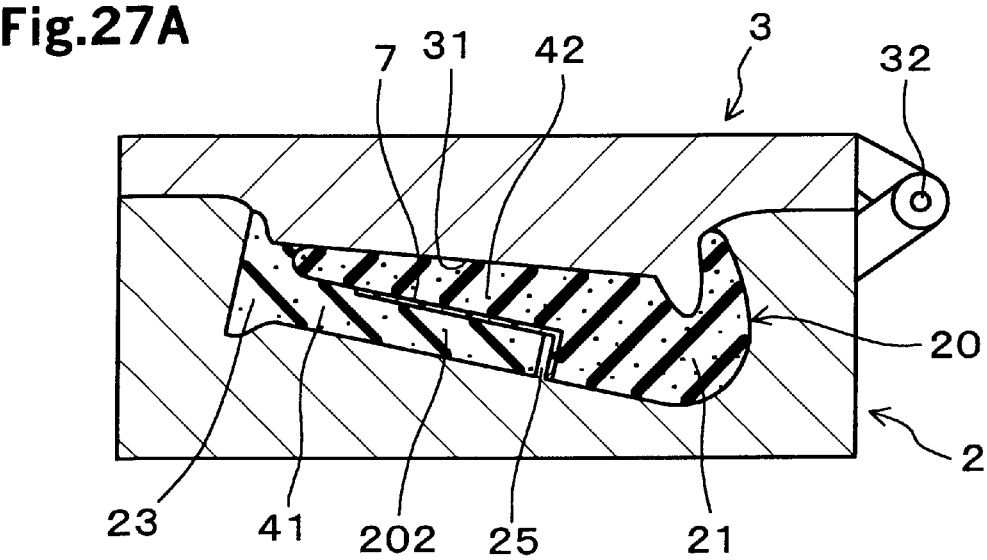
Figure 27B:
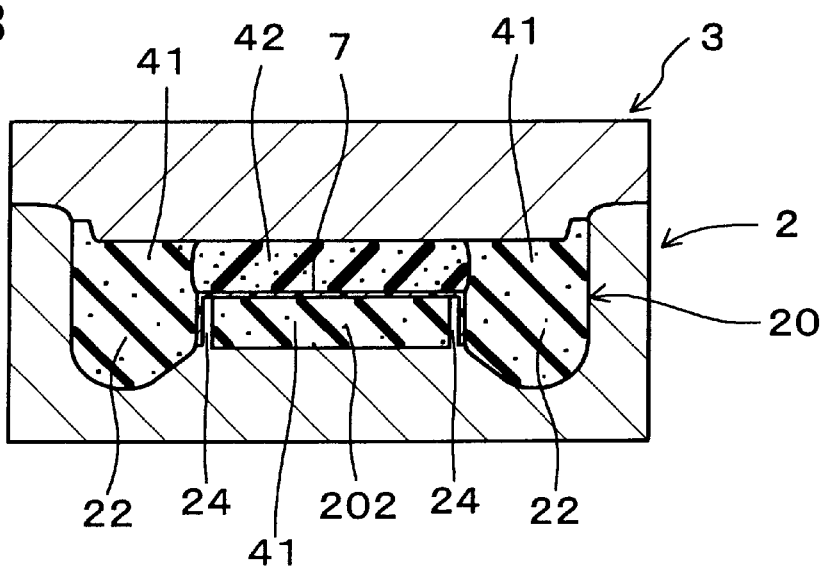
Figure 27C:
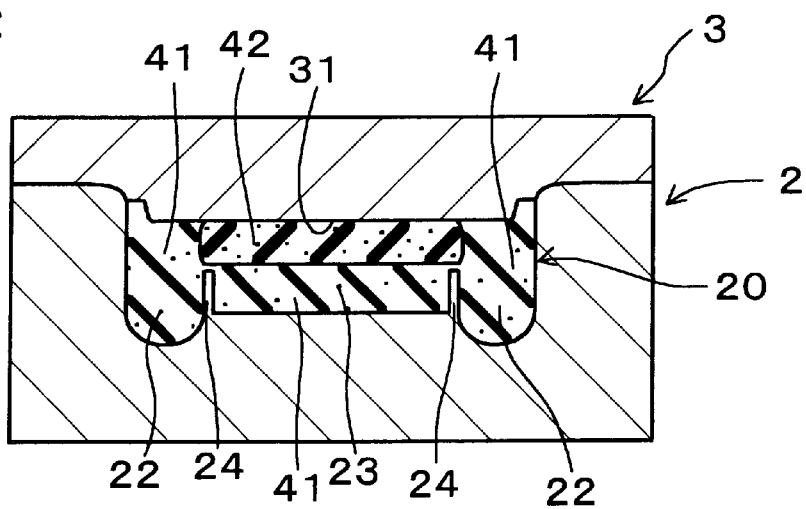

As shown in FIG. 21A, at a time of foaming, at first, the flexible film 7 is arranged in the rear cavity 23 in the cavity 20 of the lower die 2. At this time, the flexible film 7 forms a bag-like cavity 202 having the opening portion 72 by being bridged over the front and rear partition plate 25 and a pair of side partition plates 24.

In this case, the bag-like cavity 202 is a cavity which is surrounded by the flexible film 7, the partition plates 201 such as the side partition plates 24, the front and rear partition plate 25 and the like, and an inner wall surface 200 of the lower die 2, and has the opening portion 72.

Figure 28B:
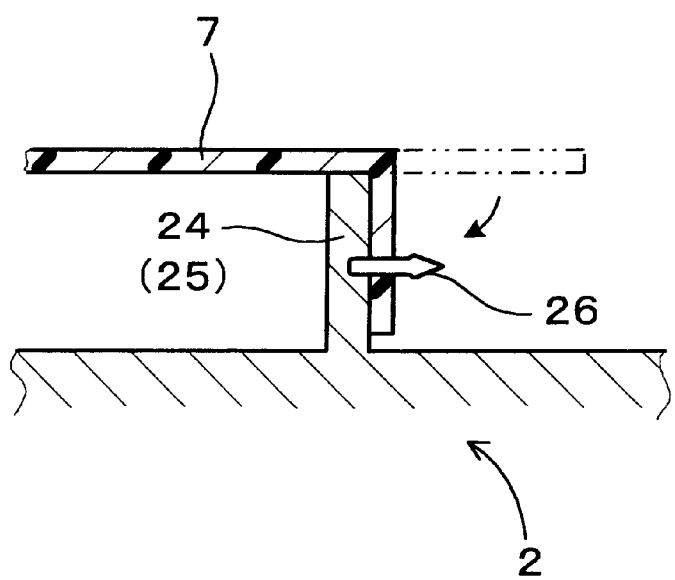
FIG. 28B is a schematic view showing a state that an end portion of a flexible film is bent so as to stick into the fixing device.

As shown in FIG. 28B, the flexible film 7 is arranged by sticking it into the fixing device 26 provided in the front and rear partition plate 25 and the side partition plates 24. Since the flexible film 7 is made of an easily deforming material, it is possible to bend an end portion of the flexible film 7 so as to stick into the fixing device 26. Further, the flexible film 7 is mounted in a taut state so as to prevent it from being loosened.

In the present embodiment, a bottom wall surface 203 of the lower die 2 is formed in a state that the cushion member 1 is formed in an inclined manner with respect to a bottom surface 205 of the lower die 2. Further, since the height of the side partition plate 24 is constant, it is possible to easily open the opening portion 72 obliquely upward only by arranging the flexible film 7 in the lower die 2.

As another method, the bottom wall surface 203 of the lower die 2 is formed in a state that the cushion member 1 is parallel to the bottom surface 205 of the lower die 2 and a whole of the lower die 2 is inclined, whereby the opening portion 72 may be obliquely upward opened. Further, as another method, the whole of the lower die 2 is intentionally inclined when the forming materials of the first raw material 41 and the second raw material 42 foam and flow.

Next, as shown in FIGS. 20, 21A, 21B and 21C, after arranging the flexible film 7, the second raw material 42 is injected to the rear side of the front cavity 21 from the injection nozzle 511 of the injection head 51. At this time, when injecting the second raw material 42 while moving the injection head 51 in the lateral direction, it is possible to easily inject the second raw material 42 to the front cavity 21 in a uniform manner.

The second raw material 42 can easily reach the forward side of the front cavity 21 due to the incline of the bottom wall surface 203 after being injected. That is, since the second raw material 42 can easily expand to the front cavity 21, it is possible to prevent an air reserve or the like, which may be generated when the raw material is not filled locally, from being generated.

Next, as shown in FIGS. 22, 23A, 23B and 23C, the first raw material 41 is injected to a position close to the forward side of the side cavities 22 and the rear cavity 23. Then, the first raw material 41 injected to the rear cavity 23 flows toward the forward side of the baglike cavity 202 from the opening portion 72. Further, the first raw material 41 injected to the side cavities 22 foams and flows rearward from the forward side of the side cavities 22 so as to fill the side cavities 22.

In this case, since the first raw material 41 flowing from the opening portion 72 of the bag-like cavity 202 foams toward the opening portion 72 from a back portion of the baglike cavity 202 after flowing to the back of the bag-like cavity 202, it is possible to prevent the air reserve or the like from being generated.

In this case, in some cushion members 1 to be obtained, the first raw material 41 may be injected from a different position in the cavity in which the bag-like cavity 202 is provided, from the position for flowing to the opening portion 72.

Next, as shown in FIGS. 24, 25A, 25B and 25C, after the injection of the first raw material 41 and the second raw material 42 is finished, the upper die 3 is closed onto the lower die 2.

It is preferable that the lower die 2 and the upper die 3 are closed immediately after injecting the first raw material 41 and the second raw material 42, however in an actual mass-production step, the lower die 2 and the upper die 3 may be closed at a time when the first raw material 41 and the second raw material 42 start foaming and a little capacity expansion is started.

The first raw material 41 flowed from the opening portion 72 foams and flows within the bag-like cavity 202 so as to fill the bag-like cavity 202. Further, the first raw material 41 flows out to the rear side from the opening portion 72 after filling the bag-like cavity 202.

On the other hand, the second raw material 42 injected to the front cavity 21 foams and flows above the flexible film 7 toward the rear side. At this time, since the bag-like cavity 202 is filled with the first raw material 41, it is possible to effectively support the weight of the second raw material 42 by the first raw material 41 within the bag-like cavity 202 in addition to the strength of the flexible film 7.

Further, since the second raw material 42 injected from places other than the opening portion 72 flows above the flexible film 7, a flow resistance is reduced and the second raw material 42 is smoothly flowed, in comparison with the case of flowing above the first raw material 41 having no film 7.

Next, as shown in FIGS. 26, 27A, 27B and 27C, as the first raw material 41 and the second raw material 42 foam and flow, the first raw material 41 and the second raw material 42 are in contact with each other above the side partition plate 24 and are chemically bonded in the contact boundary.

Then, finally, the second raw material 42 forms the front portion 11 in the front cavity 21 as the second foamed product, and the first raw material 41 respectively forms the side portions 12 and the rear portion 13 in the side cavities 22 and the rear cavity 23 as the first foamed product.

In the manner mentioned above, the cushion member 1 is formed, and the cushion member 1 after being formed is taken out from the lower die 2 while interposing the flexible film 7 between the first foamed product and the second foamed product.

The molding die 6 is previously heated to be the temperature between 50 and 60° C. before injecting the first raw material 41 and the second raw material 42. Accordingly, it is possible to effectively foam and flow the injected first and second raw materials 41 and 42. Then, after most of the first raw material 41 and the second raw material 42 are foamed, the foamed first and second raw materials 41 and 42 are hardened by being passed within the heating furnace having about 90 to 100° C. for 5 to 6 minutes.

Figure 29A:
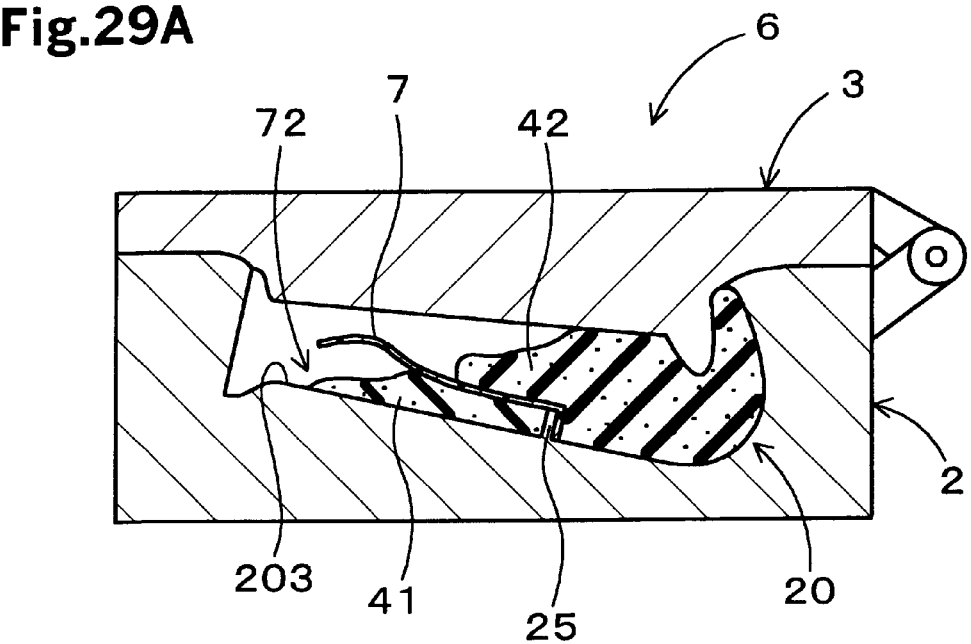
Figure 29B:
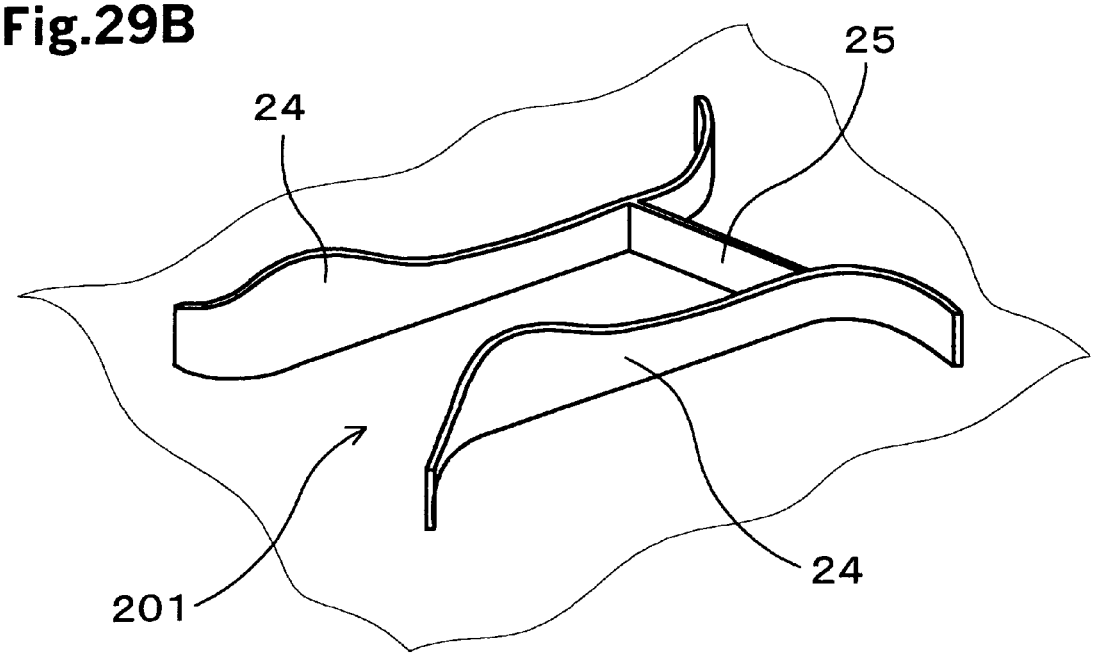

In the present embodiment, the flexible film 7 is arranged substantially parallel to the bottom wall surface 203 of the lower die 2. On the other hand, as shown in FIGS. 29A and 29B, by changing the shape of the side partition plate 24, it is possible to arrange the flexible film 7 to be non-parallel to the bottom wall surface 203 of the lower die 2. In this case, it is possible to form the cushion member 1 having various kind of shapes of two-layer structures in which the thickness of the first foamed product and the second foamed product is different in accordance with a desired position.

At a time of arranging the flexible film 7, it is possible to form the opening portion 72 at two portions without forming the bag-like cavity 202 so as to form the cushion member 1. Otherwise, the flexible film 7 may be arranged in a corner portion of the cavity 20, whereby the cushion member 1 having the two-layer structure at the corner portion may be formed.

In accordance with the manufacturing method of the present embodiment, the seat portion of the seat is formed, however the backrest portion of the seat can be formed in accordance with the same manufacturing method.

Next, a description of an operation and effect of the present invention will be given.

In the present embodiment, the flexible film 7 is arranged at an optional position of the cavity 20 in the lower die 2 so as to form the opening portion 72. The opening 72 is formed by sectioning a part of the cavity 20 in a state that the inner portion of the cavity 20 is continuously connected.

Next, the first raw material 41 is flowed from the opening portion 72, and on the other hand, the second raw material 42 is injected from the portions other than the opening portion 72. Then, the first raw material 41 and the second raw material 42 respectively flow below the flexible film 7 and above the flexible film 7 while foaming and separated from each other by the flexible film 7.

That is, in the cavity 20 of the lower die 2, at the portion where the flexible film 7 is arranged, the first raw material 41 and the second raw material 42 independently foam and flow without giving influence to each other. Accordingly, at the portion where the flexible film 7 is arranged, it is possible to prevent the first raw material 41 and the second raw material 42 from being mixed with each other, so that it is possible to form the cushion member 1 in which the thickness of the first foamed product and the second foamed product is stable.

The flexible film 7 has flexibility and can be arranged at an optional position of the cavity 20 in the lower die 2. That is, the flexible film 7 can be easily changed by changing the arranging state of the flexible film 7 in the case that it is desired to change the shape of the two-layer structure of the cushion member 1. Accordingly, it is possible to easily form the cushion member 1 having an optional two-layer structure shape.

The flexible film 7 is arranged in a state having the opening portion 72, and does not completely separate two layers by the boundary member as in the conventional manner. Accordingly, it is not necessary to limit the order of injecting the molding material such that the second raw material 42 is injected after the injection of the first raw material 41 is finished, at a time of forming, and it is not necessary to previously form the hole for injection in the boundary member for the purpose of avoiding the order limitation. Therefore, it is easy to inject the molding material including the first raw material 41 and the second raw material 42, it is possible to inject at an optional time and it is possible to easily form the cushion member 1.

In the cushion member 1 after being formed, the flexible film 7 is interposed between the first raw material and the second raw material. The flexible film 7 is excellent in elastic deformation, and hardly has an influence on a characteristic such as an impact reduction property and the like in the cushion member 1 made of the combination of the first foamed product and the second foamed product. Accordingly, it is possible to form the cushion member 1 having an excellent characteristic.

The cushion member 1 is taken out while interposing the flexible film 7 therebetween after being formed. Accordingly, it is easy to take out the cushion member 1.

In accordance with the present embodiment, it is possible to form the cushion member 1 having various kinds of shapes of two-layer structure by changing the arrangement of the side partition plate 24, the front and rear partition plate 25 or the flexible film 7.

Figure 30A:
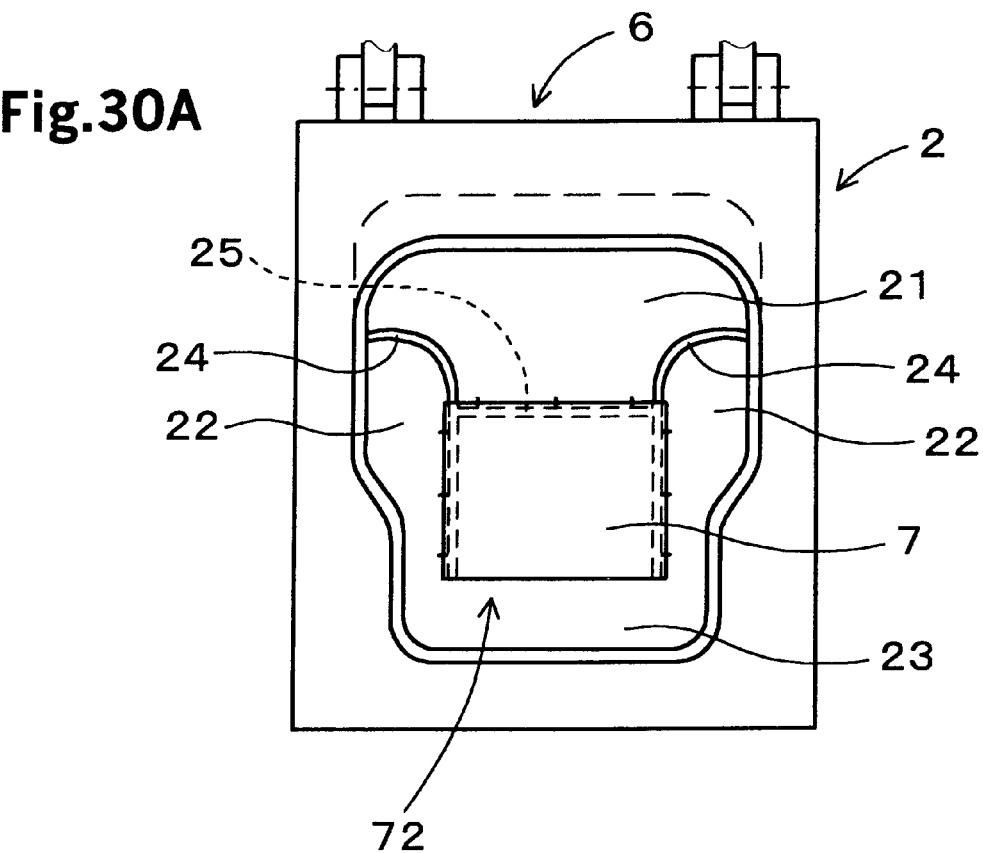

For example, as shown in FIG. 30A, by using the lower die 2 in which the side cavities 22 and the rear cavity 23 are not completely partitioned by the side partition plates 24, it is possible to form the cushion member 1 in which the side portions 12 and the rear portion 13 are not completely partitioned by the side slits 14.

Figure 30B:
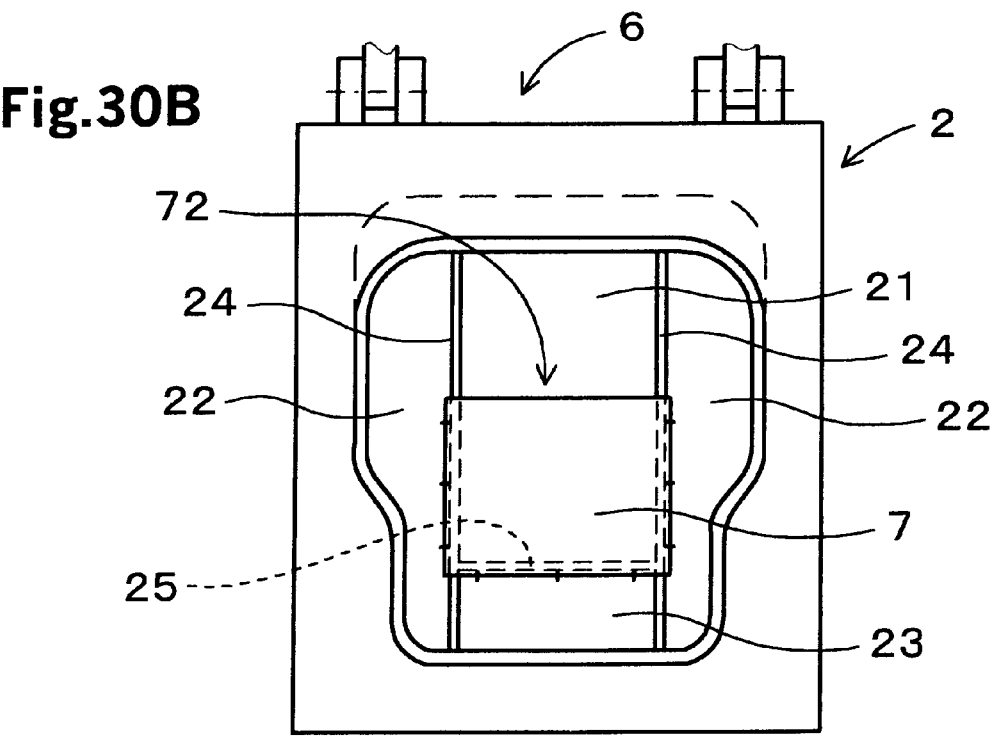

Further, as shown in FIG. 30B, the side cavities 22 are provided so as to linearly arrange the side partition plates 24 in a forward side and a backward side, whereby it is possible to form the cushion member 1 in which the side portions 12 are continuously provided from the forward side to the backward side.

Embodiment 4

The present embodiment is an embodiment in which the flexible film 7 in the embodiment 3 has a plurality of through holes. An area of one of the through holes is set to be 1 mm$^2$.

A structure constituted by a net-like body may be employed for the flexible film 7.

The other structures are the same as those of the embodiment 3.

In the present embodiment, during the formation of the cushion member 1, the first raw material 41 and the second raw material 42 can be chemically bonded through a plurality of through holes. Accordingly, a general degree of bond of the cushion member 1 can be improved.

For the reason mentioned above, the flexible film 7 can employ a structure having a poor adhesive property with the first foamed product made of the first raw material 41 or the second foamed product made of the second raw material 42.

In addition, the same operations and effects as those of the embodiment 3 can be obtained.

Embodiments 5

Figure 31A:
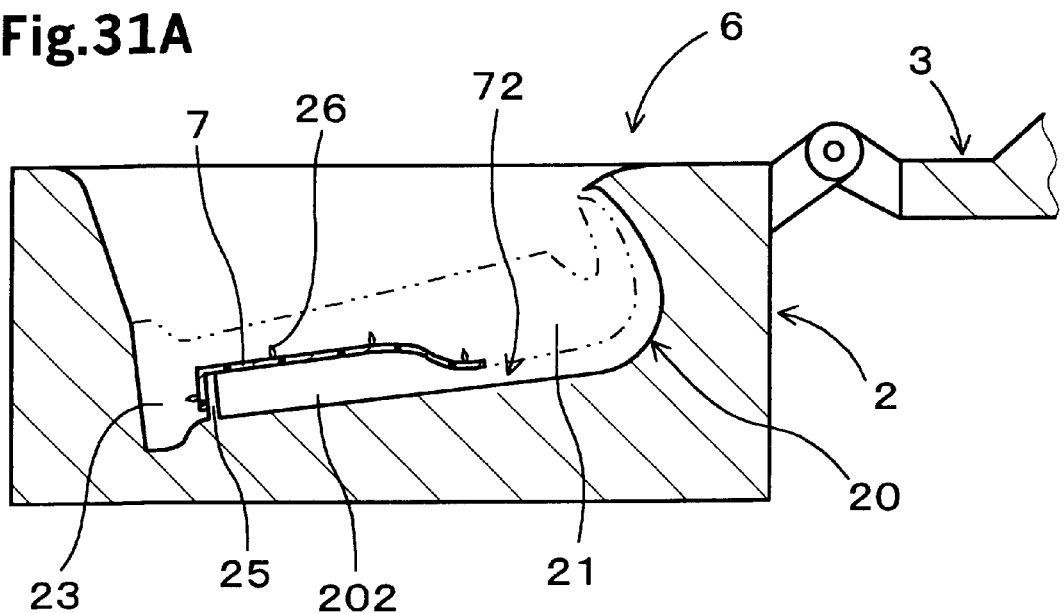
FIG. 31A is a cross sectional view showing a molding die in which a front and rear partition plate is arranged close to a rear side and a flexible film is arranges so as to form an opening portion in a front side, in accordance with an embodiment 5.

The present embodiment is an embodiment in which the front and rear partition plate 25 is arranged close to the rear side of the cushion member 1 and the flexible film 7 is arranged in the front cavity 21 so that the opening portion 72 is formed in the forward side of the cushion member 1, as shown in FIG. 31A. Further, the lower die 2 is formed so that the forward side of the cushion member 1 is positioned above the rear side.

Figure 31B:
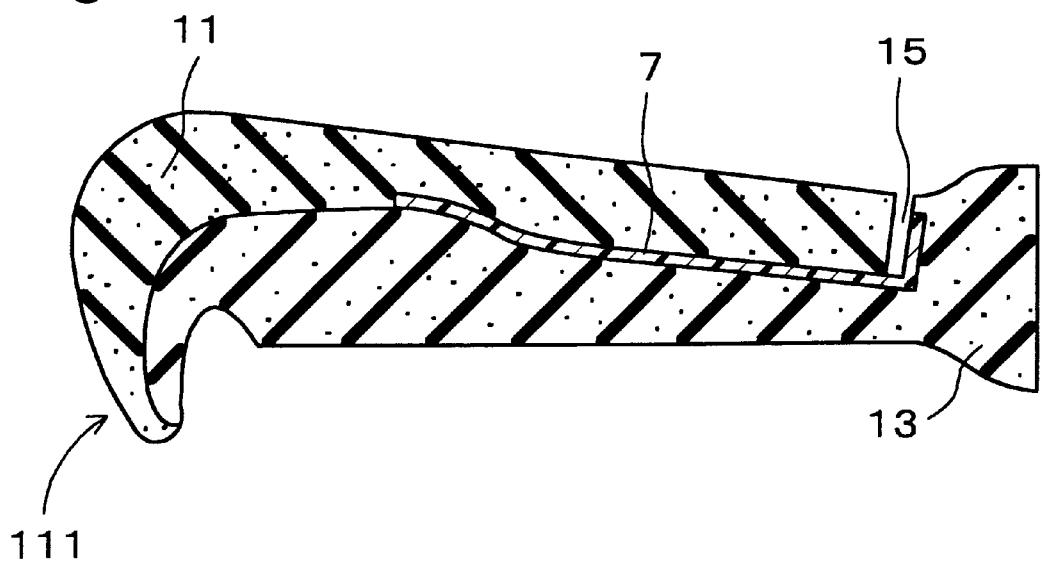
FIG. 31B is a cross sectional view corresponding to the view along the line 31—31 in FIG. 17, showing a cushion member in which a front edge portion in a front portion has a two-layer structure made of a first raw material and a second raw material, in accordance with the embodiment 5.

As shown in FIG. 31B, the cushion member 1 in the present embodiment is formed so that the front edge portion 111 in the front portion 11 also has a two-layer structure made of the first raw material 41 and the second raw material 42.

The other structures are the same as those of the embodiment 3 mentioned above.

As shown in the present embodiment, in the cushion member 1 having the two-layer structure, it is possible to form a cushion member 1 having various shapes of two-layer structures by changing an angle forming the cavity 20 and an arrangement of the front and rear partition plate 25 and the flexible film 7.

In addition, it is possible to obtain the same operations and effects as those of the embodiment 3.

Embodiment 6

Figure 33A:
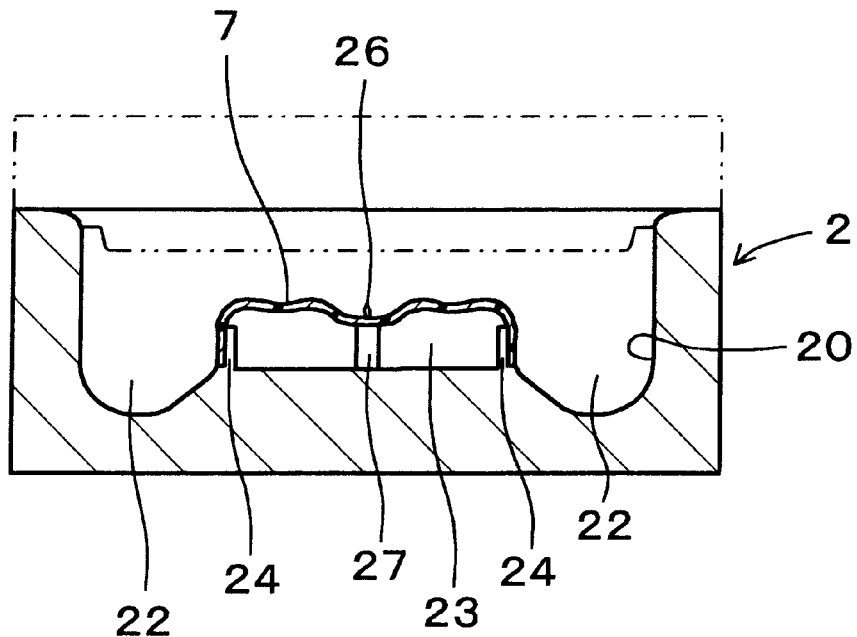

The present embodiment is an embodiment in which the flexible film 7 is arranged in a loosened state at a time of fixing the flexible film 7 to the side partition plates 24 and the front and rear partition plate 25 in the lower die 2, as shown in FIG. 33A.

Figure 32:
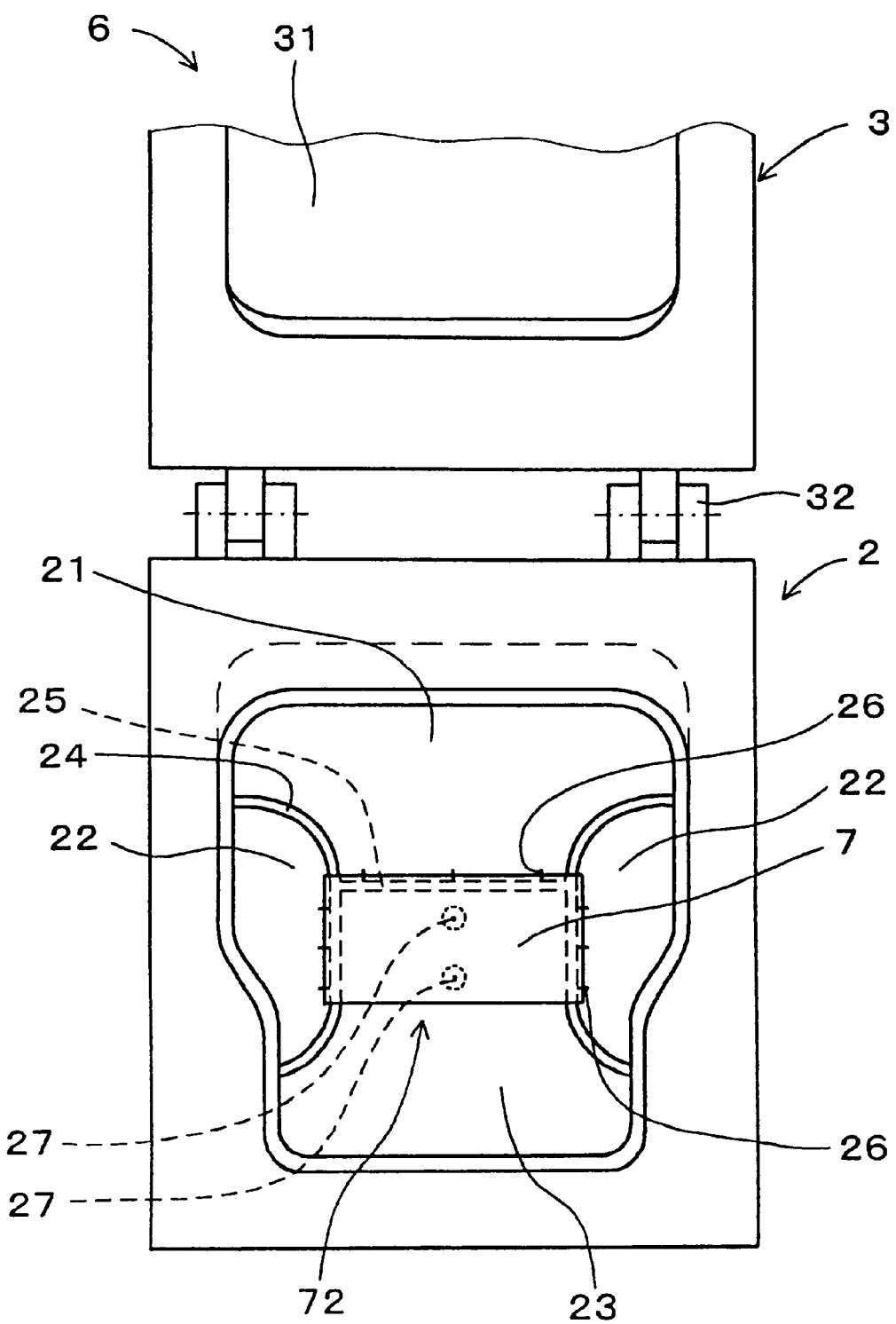
FIG. 32 is a plan view showing a molding die, in accordance with an embodiment 6.

As shown in FIG. 32, in the lower die 2, a rod-like supporting device 27 for supporting the flexible film 7 is provided between a pair of side partition plates 24, and the fixing device 26 is also provided in the supporting device 27, thereby fixing the flexible film 7.

The other structures are the same as those of the embodiment 3.

Figure 33B:
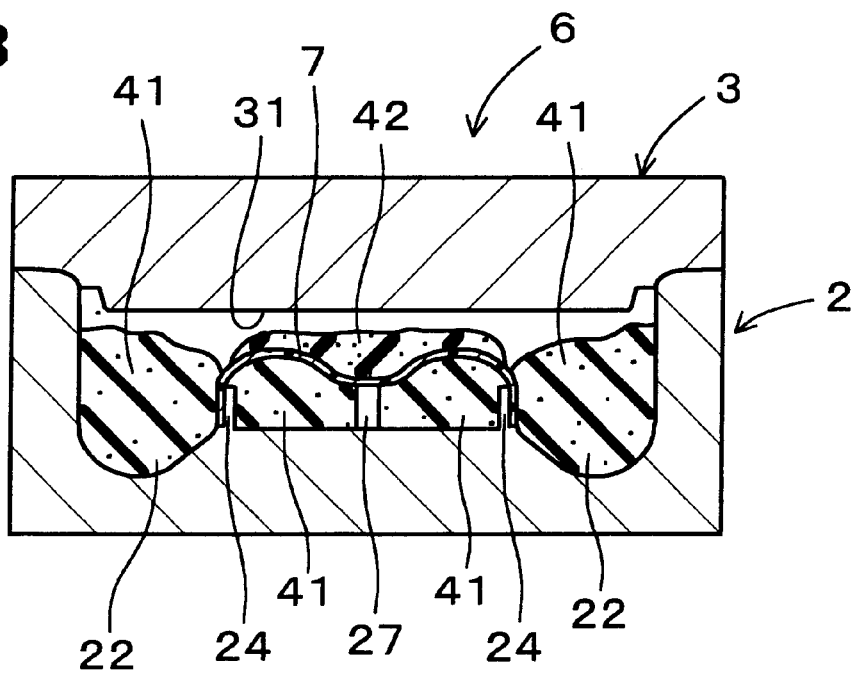

As shown in FIG. 33B, according to the present embodiment, it is possible to increase a thickness of the first foamed product made of the first raw material 41 by expanding the bag-like cavity 202 formed by the flexible film 7 at a time of flowing the first raw material 41 from the opening portion 72. Accordingly, it is possible to give optional variation to the thickness of the first foamed product.

In addition, it is possible to obtain the same operations and effects as those of the embodiment 3.

Obviously, numerous modifications and variations of the present invention are possible in light of the above teachings. It is therefore to be understood that, within the scope of the appended claims, the invention may be practiced otherwise than as specifically described here.

What is claimed is:

1. A manufacturing method of a cushion member by expansion molding, comprising the steps of:
   providing an upper die and a lower die, in which in said lower die, a first cavity for forming a first center portion having an obverse layer portion positioned in an obverse side of said cushion member and a reverse layer portion positioned in a reverse side of said cushion member, and a second cavity for forming a second center portion arranged at the rear of said first center portion are formed, and a front and rear partition is provided between said first cavity and said second cavity, and said upper die has a bottom portion forming surface for forming a bottom portion of said cushion member;
   injecting a first raw material having a foaming property into said first cavity;
   injecting a second raw material having a foaming property and forming a foamed product having a different physical property from that of a foamed product formed of said first raw material at a time when the foaming process is completed into said second cavity,
   thereafter closing said lower die and said upper die so as to form a flow port between said bottom portion forming surface in said upper die and an upper end of said front and rear partition,
   permitting said second raw material to flow within said first cavity while being limited a flow amount by said flow port and to flow forward so as to follow the flow of a flow front end portion of said first raw material while covering over said first raw material so as to restrict an upward foam flow of said first raw material, and
   permitting said first raw material to form said obverse layer portion at a lower side of said first cavity, and to form a front edge portion in a forward end portion of said first cavity, and permitting said second raw material to form said reverse layer portion at an upper side of said first cavity, and to form said second center portion in said second cavity.

2. A manufacturing method of a cushion member as claimed in claim 1, wherein the lower die has side cavities for forming side portions in both of right and left sides of the first center portion, and a side partition having first side partition portions provided between the side cavity and said first cavity and second side partition portions provided between said side cavity and said second cavity,
   said flow port is also formed between said bottom portion forming surface in said upper die and an upper end of said side partitions, and
   said second raw material is caused to form said reverse layer portion above said first cavity, and also to form said second center portion and said side portions in said second cavity and said side cavities respectively.

3. A manufacturing method of a cushion member as claimed in claim 1, wherein said first raw material is injected before injecting said second raw material.

4. A manufacturing method of a cushion member as claimed in claim 2, wherein a height of said second side partition is made lower than a height of said front and rear partition,
   and said second raw material rides over an upper end of said second side partition so as to start foaming and flowing within said side cavity before riding over an upper end of said front and rear partition so as to start foaming and flowing in said first cavity.

5. A manufacturing method of a cushion member as claimed in claim 2, wherein a capacity of said second cavity surrounded by said front and rear partition and said second side partitions is set to be larger than an injection amount of said second raw material before foaming, whereby a predetermined time is required before said second raw material rides over the upper end of said side partitions or said front and rear partition so as to start foaming and flowing in said side cavities or said first cavity.

6. A manufacturing method of a cushion member as claimed in claim 2, wherein said side partition is configured so that a width of said first cavity becomes larger in the lateral direction in the front portion.

7. A manufacturing method of a cushion member as claimed in claim 2, wherein said first raw material and said second raw material are both a mixed raw material of a polyol group raw material and an isocyanate group raw material, wherein a weight mixing ratio of said polyol group raw material is higher than that of said isocyanate group raw material and a weight mixing ratio of said polyol group raw material of said first raw material is higher than that of said second raw material,
   and said cushion member is formed so that a hardness of said obverse layer portion made of said first raw material is relatively lower than a hardness of said reverse layer portion, said side portions and said second center portion made of said second raw material or a hardness of said reverse layer portion and said second center portion of said second raw material.

8. A manufacturing method of a cushion member as claimed in claim 2, wherein said first raw material is made by mixing a polyol group raw material having a relatively smaller molecular weight than that of said second raw material with an isocyanate group raw material, whereby an impact resilience of said obverse layer portion made of said first raw material becomes relatively lower than an impact resilience of said reverse layer portion, said side portions and said second center portion made of said second raw material, or an impact resilience of said reverse layer portion and said second center portion made of said second raw material.

9. A manufacturing method of a cushion member as claimed in claim 1, wherein said first raw material is injected at a weight obtained by multiplying an amount proportional to a rate occupied by the obverse layer portion with respect to a capacity of a whole of said cushion member by a density of the foamed product of said first raw material, and said second raw material is injected at a weight obtained by multiplying an amount proportional to a rate occupied by said reverse layer portion, said side portions and said second center portion with respect to the capacity of the whole of said cushion member or an amount proportional to a rate occupied by said reverse layer portion and said second center portion by a density of the foamed product of said second raw material, respectively.

10. A manufacturing method of a cushion member as claimed in claim 1, wherein said first raw material and said second raw material are constituted by materials respectively showing different colors after finishing foaming.

11. A manufacturing method of a cushion member as claimed in claim 1, wherein said first raw material and said second raw material are both a mixed raw material of a polyol group raw material and an isocyanate group raw material, wherein a weight mixing ratio of said polyol group raw material is higher than that of said isocyanate group raw material and a weight mixing ratio of said polyol group raw material of said first raw material is higher than that of said second raw material, and said cushion member is formed so that a hardness of said obverse layer portion made of said first raw material is relatively lower than a hardness of said reverse layer portion and said second center portion of said second raw material.

12. A manufacturing method of a cushion member as claimed in claim 1, wherein said first raw material is made by mixing a polyol group raw material having a relatively smaller molecular weight than that of said second raw material with an isocyanate group raw material, whereby an impact resilience of said obverse layer portion made of said first raw material becomes relatively lower than an impact resilience of said reverse layer portion and said second center portion made of said second raw material.

13. A manufacturing method of a cushion member by an expansion molding using an upper die and a lower die, comprising the steps of:

arranging a flexible film in a cavity in said lower die, and supporting said film by a projection protruding from the lower die, so that an opening portion to which a first raw material having a foaming property flows is formed between an end portion of said flexible film and a wall of said cavity, permitting said first raw material to flow from said opening portion, injecting a second raw material having a foaming property and forming a foamed product having a different physical property from that of a foamed product formed of said first raw material at a time when the foaming process is completed from a portion other than said opening portion, and thereafter closing said lower die and said upper die so as to integrally expansion mold said first raw material and said second raw material by setting said flexible film to be a boundary layer, thereby forming a cushion member having a two-layer structure comprising a first foamed product made of said first raw material and a second foamed product made of said second raw material and interposing said flexible film therebetween.

14. A manufacturing method of a cushion member as claimed in claim 13, including a step of forming a bag-like cavity having said opening portion between said flexible film and said cavity.

15. A manufacturing method of a cushion member as claimed in claim 13, including a step of providing a partition plate arranged so as to section a part of said cavity in said lower die, and said flexible film is bridged over at least any one of said cavity and said partition plate, thereby forming a bag-like cavity having said opening portion.

16. A manufacturing method of a cushion member as claimed in claim 15, wherein said partition plate is at least any one of a front and rear partition plate sectioning said cavity into a front cavity and a rear cavity in a front and rear direction and a pair of side partition plates sectioning said cavity into both right and left side cavities and a center cavity disposed therebetween.

17. A manufacturing method of a cushion member as claimed in claim 13, including the step of fixing an end portion of said flexible film to said lower die by a fixing device.

18. A manufacturing method of a cushion member as claimed in claim 13, wherein said flexible film has a plurality of through holes.

19. A manufacturing method of a cushion member as claimed in claim 13, wherein said flexible film is constituted by a net body.

20. A manufacturing method of a cushion member as claimed in claim 13, wherein said flexible film is arranged substantially in parallel to a bottom wall surface of said cavity.

21. A manufacturing method of a cushion member as claimed in claim 13, wherein said flexible film is arranged non-parallel to the bottom wall surface of said cavity.

22. A manufacturing method of a cushion member as claimed in claim 13, wherein said flexible film is arranged in a loosened state at a time of being fixed to the cavity of said lower die.

23. A manufacturing method of a cushion member as claimed in claim 13, wherein said opening portion is opened obliquely upward.

* * * * *